(12) United States Patent
Matsumura et al.

(10) Patent No.: US 12,705,909 B2
(45) Date of Patent: Aug. 11, 2026

(54) COLONY COUNTING DEVICE, AND CONTROL METHOD

(71) Applicant: Keyence Corporation, Osaka (JP)

(72) Inventors: Shingo Matsumura, Osaka (JP); Suguru Sekiya, Osaka (JP); Kenta To, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 393 days.

(21) Appl. No.: 18/221,408

(22) Filed: Jul. 13, 2023

(65) Prior Publication Data

US 2024/0054798 A1 Feb. 15, 2024

(30) Foreign Application Priority Data

Aug. 9, 2022 (JP) ................................ 2022-127158

(51) Int. Cl.

*G06V 20/69* (2022.01)
*G06T 7/00* (2017.01)
*G06V 10/141* (2022.01)

(52) U.S. Cl.

CPC .......... *G06V 20/693* (2022.01); *G06T 7/0014* (2013.01); *G06V 10/141* (2022.01); *G06T 2207/30242* (2013.01)

(58) Field of Classification Search

CPC .. G06V 20/693; G06V 10/141; G06V 10/764; G06T 7/0014; G06T 2207/30242; G06T 2207/30024; G06T 7/0002; G06T 2207/10056; C12M 41/36; G06F 3/1237; G06F 40/18

See application file for complete search history.

(56) References Cited

U.S. PATENT DOCUMENTS

| | | | | |
|---|---|---|---|---|
| 9,726,602 | B2 * | 8/2017 | Dupoy | C12M 41/36 |
| 2016/0203605 | A1 * | 7/2016 | Hayashi | C12M 41/46 382/128 |
| 2018/0112173 | A1 * | 4/2018 | Wiles | G06V 20/698 |
| 2020/0401787 | A1 * | 12/2020 | Robinson | G06V 20/698 |

(Continued)

FOREIGN PATENT DOCUMENTS

| | | | |
|---|---|---|---|
| JP | 2003195173 A | * | 7/2003 |
| JP | 2014178284 A | * | 9/2014 |

(Continued)

OTHER PUBLICATIONS

U.S. Appl. No. 18/221,407, filed Jul. 13, 2023 (121 pages).

*Primary Examiner* — Henok Shiferaw
(74) *Attorney, Agent, or Firm* — Kilyk & Bowersox, P.L.L.C.

(57) ABSTRACT

Counting accuracy of colonies is improved. A colony counting device captures a test individual to generate an image of the test individual, registers the image of the test individual in an initial state as a reference image, identifies a residue included in the reference image and identifies a position of the residue in a test image corresponding to the residue included in the reference image based on a displacement of each of two or more common characteristic portions between the reference image and the test image that is an image of the test individual after culturing, and counts the number of colonies while excluding the residue from a count as a colony based on the position of the residue.

17 Claims, 62 Drawing Sheets

(56) References Cited

U.S. PATENT DOCUMENTS

| | | | | |
|---|---|---|---|---|
| 2021/0192730 | A1* | 6/2021 | Raciti | G06T 7/0012 |
| 2022/0325225 | A1* | 10/2022 | Marcelpoil | C12M 41/36 |
| 2022/0375240 | A1* | 11/2022 | Lu | G06V 20/695 |
| 2023/0111370 | A1* | 4/2023 | Tran | C12M 41/36<br>382/133 |

FOREIGN PATENT DOCUMENTS

| | | | | | |
|---|---|---|---|---|---|
| JP | 2014209861 | A | * | 11/2014 | |
| JP | 2016015944 | A | | 2/2016 | |
| JP | 2022069610 | A | * | 5/2022 | |
| WO | WO-2016136915 | A1 | * | 9/2016 | C12M 41/36 |
| WO | WO-2021180376 | A1 | * | 9/2021 | C12Q 1/06 |

* cited by examiner

1b
PC
31
30
32
KEYBOARD
33
POINTING DEVICE
INPUT/OUTPUT CIRCUIT
38
PRINTER
36
MCU
37
DISPLAY DEVICE
DISPLAY CONTROL SECTION
34
COMMUNICATION CIRCUIT
35
STORAGE DEVICE
39
APPLICATION PROGRAM
1c
28
TEST CONDITION
29
TEST IMAGE
40
SAMPLE DB
55
COUNT TABLE

50
COUNTER
FILE
SETTING
65
SEARCH:
66
ALL
61
64
SAMPLE DATABASE
62
63
CHICKEN CHILI
CHICKEN SALAD
OHAGI
KIMCHI
67
SANDWICH
MIXED JUICE
52
TITLE
53
COUNT REVERSAL
54
ADD COLUMN
56
AVERAGING 1 REPEAT
51
BACTERIAL SPECIES
GENERAL VIABLE BACTERIA
GENERAL VIABLE BACTERIA
ESCHERICHIA COLI
DILUTION FACTOR
10^2
10^3
10^2
CULTURE TIME
48h
48h
24h
55
1
SANDWICH
NO TEST
2
KIMCHI
NO TEST
3
MIX
57
CANDIDATE: MIXED JUICE
58

50
COUNTER
FILE
SETTING
SEARCH:
65
ALL
66
SAMPLE DATABASE
61
CHICKEN CHILI
CHICKEN SALAD
OHAGI
KIMCHI
SANDWICH
MIXED JUICE
64
62
63
67
51
TITLE
52
SAMPLE NAME
ID
COUNT REVERSAL
53
ADD COLUMN
54
AVERAGING 1▼ REPEAT
56

50
COUNTER
FILE
SETTING
65
66
SEARCH:
ALL
61
64
62
63
67
SAMPLE DATABASE
CHICKEN CHILI
CHICKEN SALAD
OHAGI
KIMCHI
SANDWICH
MIXED JUICE
52
53
54
56
51
TITLE
COUNT REVERSAL
ADD COLUMN
AVERAGING 1 REPEAT
ID
SAMPLE NAME
70
BACTERIAL SPECIES
GENERAL VIABLE BACTERIA
GENERAL VIABLE BACTERIA
ESCHERICHIA COLI
DILUTION FACTOR
10^2
10^3
10^2
CULTURE TIME
48h
48h
24h
1
SANDWICH
NO TEST
2
KIMCHI
NO TEST

| | | | ESCHERICHIA COLI | GENERAL VIABLE BACTERIA |
|---|---|---|---|---|
| ID | SAMPLE NAME | REPEAT | 10^1 | 10^2 |
| 1 | OHAGI | 1 | 100 | 10 |
| | | 2 | NO TEST | NO TEST |
| | | AVERAGE | 100 | 10 |
| 2 | CHICKEN CHILI | 1 | 250 | NO TEST |
| | | 2 | 150 | NO TEST |
| | | AVERAGE | 200 | NO TEST |
| 3 | APPLE | 1 | 120 | 12 |
| | | 2 | 80 | 8 |
| | | AVERAGE | 100 | 10 |

50
COUNTER
FILE
SETTING
65
66
SEARCH:
ALL
61
64
62
63
SAMPLE DATABASE
CHICKEN CHILI
CHICKEN SALAD
OHAGI
KIMCHI
67
SANDWICH
MIXED JUICE
51
52
53
54
56
TITLE
COUNT REVERSAL
ADD COLUMN
AVERAGING 1 REPEAT
55
ESCHERICHIA COLI
GENERAL VIABLE BACTERIA
ID
SAMPLE NAME
10^1
10^2
1
OHAGI
2
CHICKEN CHILI
NO TEST
3
APPLE

50
COUNTER
FILE
SETTING
65
66
SEARCH:
ALL
61
64
62
SAMPLE DATABASE
CHICKEN CHILI
CHICKEN SALAD
OHAGI
KIMCHI
67
SANDWICH
63
HAM
LETTUCE
MIXED JUICE
52
53
54
56
51
TITLE
COUNT REVERSAL
ADD COLUMN
AVERAGING 1 REPEAT
BACTERIAL SPECIES
GENERAL VIABLE BACTERIA
GENERAL VIABLE BACTERIA
DILUTION FACTOR
10^2
10^3
CULTURE TIME
48h
48h
55
1
SANDWICH

FIG. 18

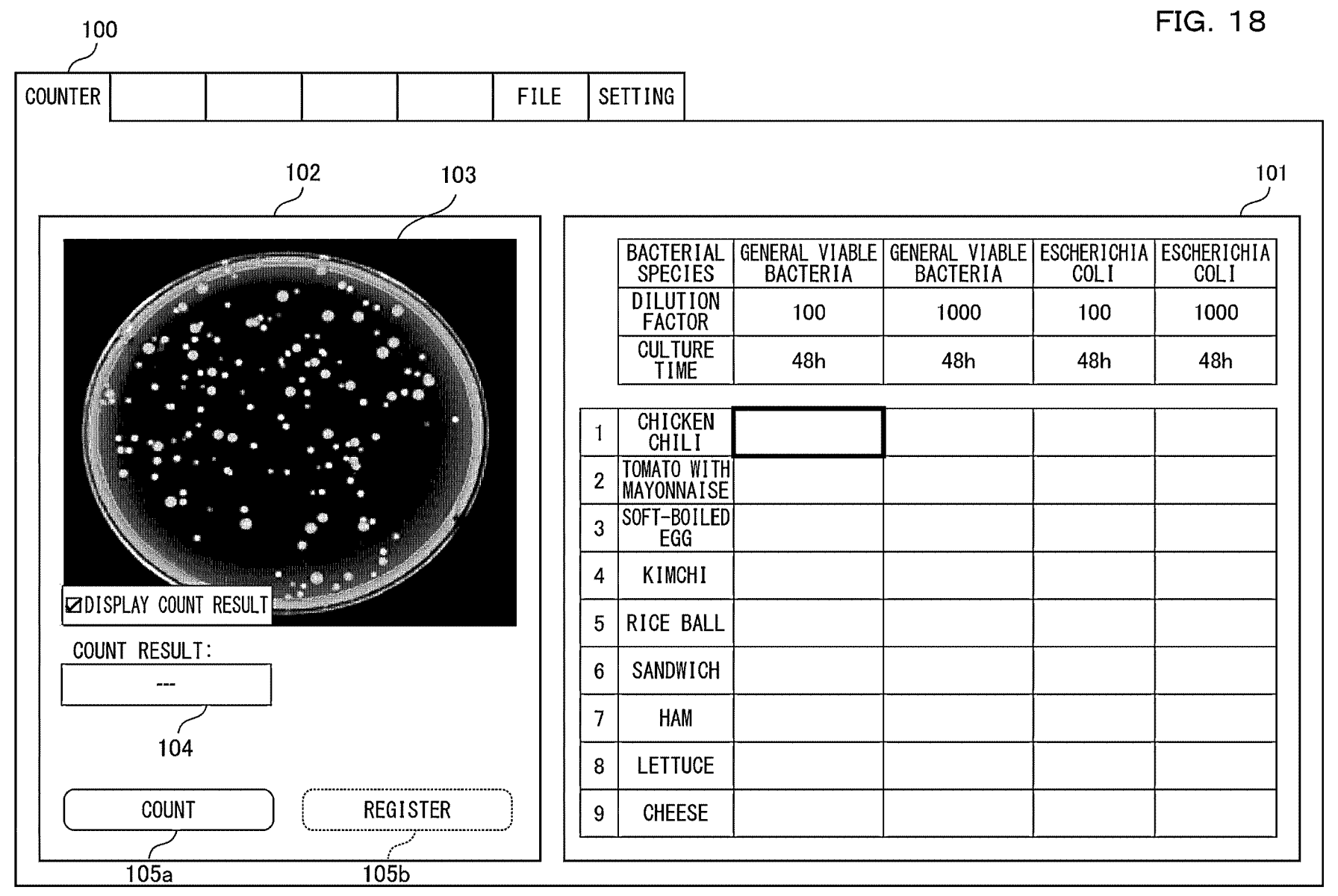

100
COUNTER | | | | | FILE | SETTING 102
103
☑DISPLAY COUNT RESULT
COUNT RESULT:
---
104
COUNT
105a
REGISTER
105b

101

| BACTERIAL SPECIES | GENERAL VIABLE BACTERIA | GENERAL VIABLE BACTERIA | ESCHERICHIA COLI | ESCHERICHIA COLI |
|---|---|---|---|---|
| DILUTION FACTOR | 100 | 1000 | 100 | 1000 |
| CULTURE TIME | 48h | 48h | 48h | 48h |

| | | | | | |
|---|---|---|---|---|---|
| 1 | CHICKEN CHILI | | | | |
| 2 | TOMATO WITH MAYONNAISE | | | | |
| 3 | SOFT-BOILED EGG | | | | |
| 4 | KIMCHI | | | | |
| 5 | RICE BALL | | | | |
| 6 | SANDWICH | | | | |
| 7 | HAM | | | | |
| 8 | LETTUCE | | | | |
| 9 | CHEESE | | | | |

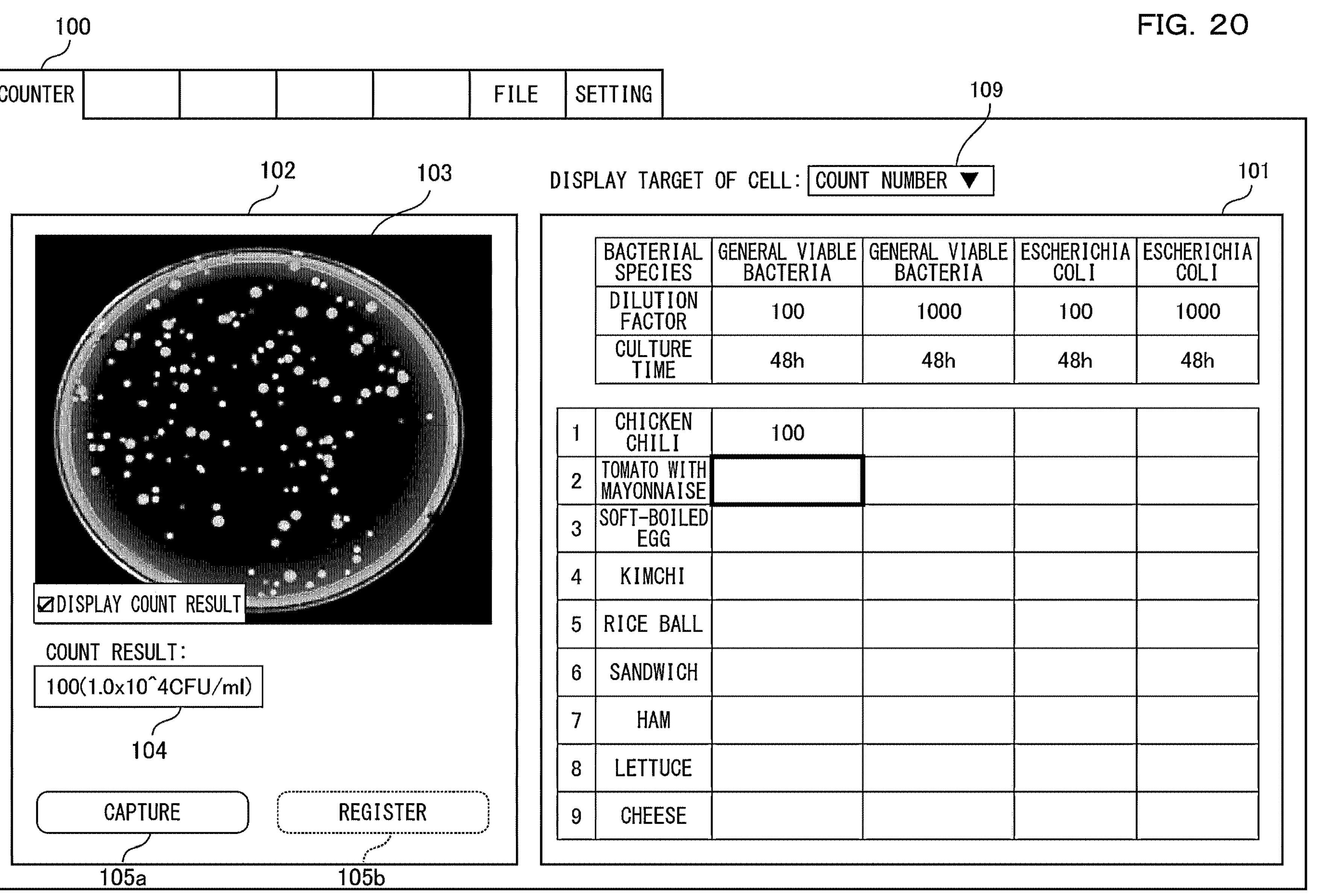
FIG. 20
100
COUNTER
FILE
SETTING
109
DISPLAY TARGET OF CELL: COUNT NUMBER
101
102
103
BACTERIAL SPECIES
GENERAL VIABLE BACTERIA
GENERAL VIABLE BACTERIA
ESCHERICHIA COLI
ESCHERICHIA COLI
DILUTION FACTOR
100
1000
100
1000
CULTURE TIME
48h
48h
48h
48h
1 CHICKEN CHILI 100
2 TOMATO WITH MAYONNAISE
3 SOFT-BOILED EGG
4 KIMCHI
5 RICE BALL
6 SANDWICH
7 HAM
8 LETTUCE
9 CHEESE
DISPLAY COUNT RESULT
COUNT RESULT:
100(1.0x10^4CFU/ml)
104
CAPTURE
105a
REGISTER
105b 100
COUNTER
FILE
SETTING
109
DISPLAY TARGET OF CELL:
CFU/mL
101
102
103
BACTERIAL SPECIES
GENERAL VIABLE BACTERIA
GENERAL VIABLE BACTERIA
ESCHERICHIA COLI
ESCHERICHIA COLI
DILUTION FACTOR
100
1000
100
1000
CULTURE TIME
48h
48h
48h
48h
1 CHICKEN CHILI
1.0x10^4
2 TOMATO WITH MAYONNAISE
3 SOFT-BOILED EGG
4 KIMCHI
5 RICE BALL
6 SANDWICH
7 HAM
8 LETTUCE
9 CHEESE
DISPLAY COUNT RESULT
COUNT RESULT:
100(1.0x10^4CFU/ml)
104
CAPTURE
105a
REGISTER
105b

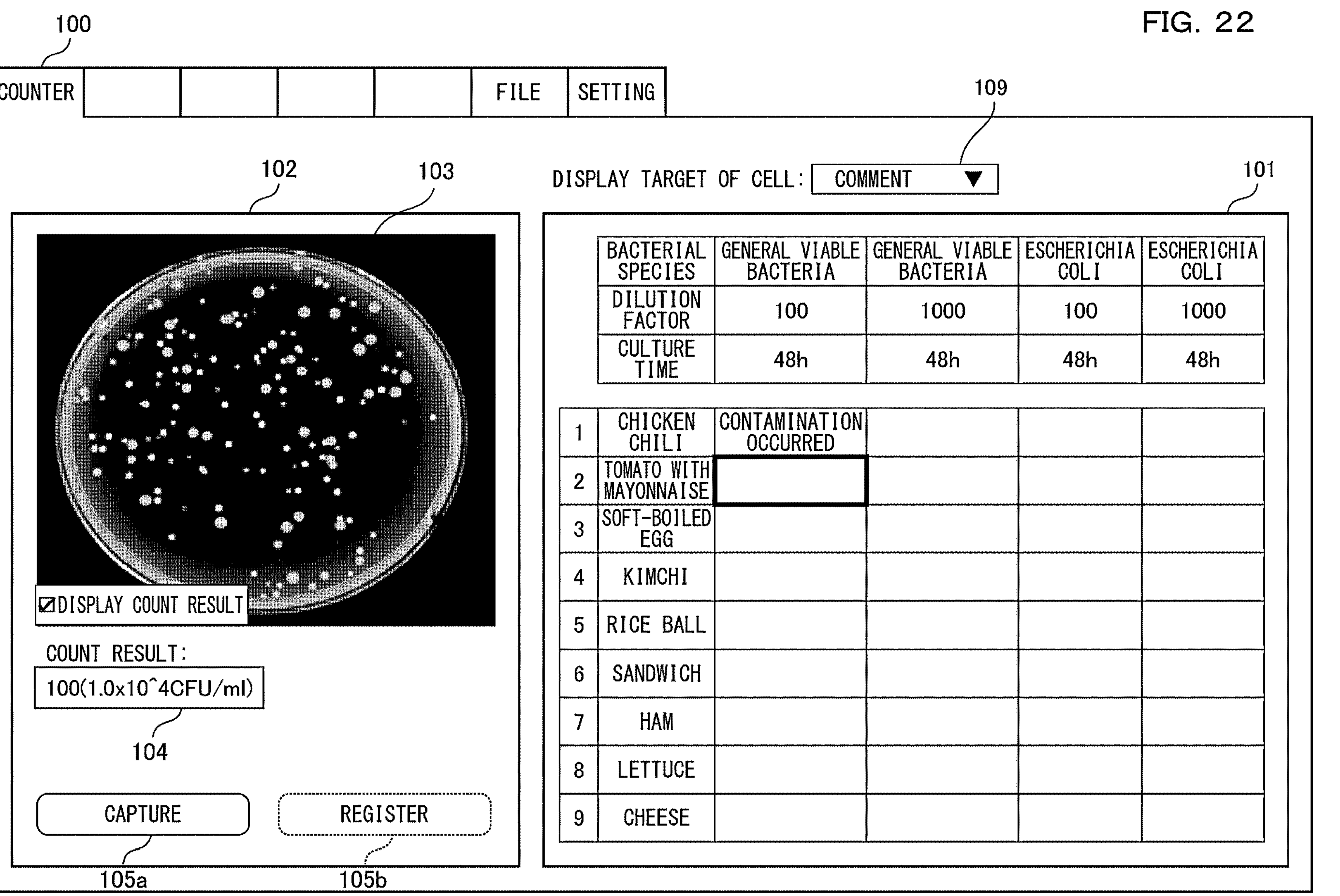
FIG. 22
100
COUNTER
FILE
SETTING
109
DISPLAY TARGET OF CELL:
COMMENT
101
102
103
BACTERIAL SPECIES
GENERAL VIABLE BACTERIA
GENERAL VIABLE BACTERIA
ESCHERICHIA COLI
ESCHERICHIA COLI
DILUTION FACTOR
100
1000
100
1000
CULTURE TIME
48h
48h
48h
48h
1
CHICKEN CHILI
CONTAMINATION OCCURRED
2
TOMATO WITH MAYONNAISE
3
SOFT-BOILED EGG
4
KIMCHI
5
RICE BALL
6
SANDWICH
7
HAM
8
LETTUCE
9
CHEESE
DISPLAY COUNT RESULT
COUNT RESULT:
100(1.0x10^4CFU/ml)
104
CAPTURE
REGISTER
105a
105b

FIG. 24

| | | STATE OF ACTIVE CELL | |
|---|---|---|---|
| STATE OF COUNT TABLE | STATE OF IMAGE | NO COUNT RESULT HAS BEEN INPUT | COUNT RESULT HAS BEEN INPUT |
| COUNT TABLE IS DISPLAYED | MOVING IMAGE | COUNT REGISTER | COUNT REGISTER |
| | STILL IMAGE | CAPTURING REGISTER | CAPTURING REGISTER |
| COUNT TABLE IS NOT DISPLAYED | MOVING IMAGE | COUNT REGISTER | COUNT REGISTER |
| | STILL IMAGE | CAPTURING REGISTER | |
| | STILL IMAGE | | CAPTURING RE-REGISTER |

200
COUNTER
FILE
SETTING
210
COUNT TABLE
SAMPLE PRODUCT
211
213
214
215
DELETE
SEARCH
FRONT CAMERA
OPEN
ID
TITLE
LAST UPDATE DATE
COUNT
OTHERS
01
20221225_ROUTINE TEST
2022/12/26
COMPLETION
02
20221226_ROUTINE TEST
2022/11/10
COMPLETION
03
REQUEST HAND WASH TEST
2022/12/27
NON-EXECUTION
212

TEST LIST

221

2022/12/31

| ID | SAMPLE NAME | DILUTION FACTOR | BACTERIAL NAME | PETRI DISH NUMBER | COMMENT |
|---|---|---|---|---|---|
| 1 | CHICKEN CHILI | 100 | GENERAL VIABLE BACTERIA | 1-S-2 | |
| 2 | CHICKEN CHILI | 100 | ESCHERICHIA COLI | 1-E-2 | |
| 3 | CHICKEN CHILI | 1000 | GENERAL VIABLE BACTERIA | 1-S-3 | |
| 4 | TOMATO WITH MAYONNAISE | 100 | GENERAL VIABLE BACTERIA | 2-S-2 | |
| 5 | TOMATO WITH MAYONNAISE | 100 | ESCHERICHIA COLI | 2-E-2 | |
| 6 | TOMATO WITH MAYONNAISE | 1000 | GENERAL VIABLE BACTERIA | 2-S-3 | |
| 7 | TOMATO WITH MAYONNAISE | 1000 | ESCHERICHIA COLI | 2-E-3 | |
| 8 | | | | | |
| 9 | | | | | |

260

| SAMPLE NAME | COUNT VALUE | PETRI DISH IMAGE | EXTERNAL APPEARANCE IMAGE | BARCODE |
|---|---|---|---|---|
| FRIED FOOD | 100 | | | 123456789 |

FIG. 34
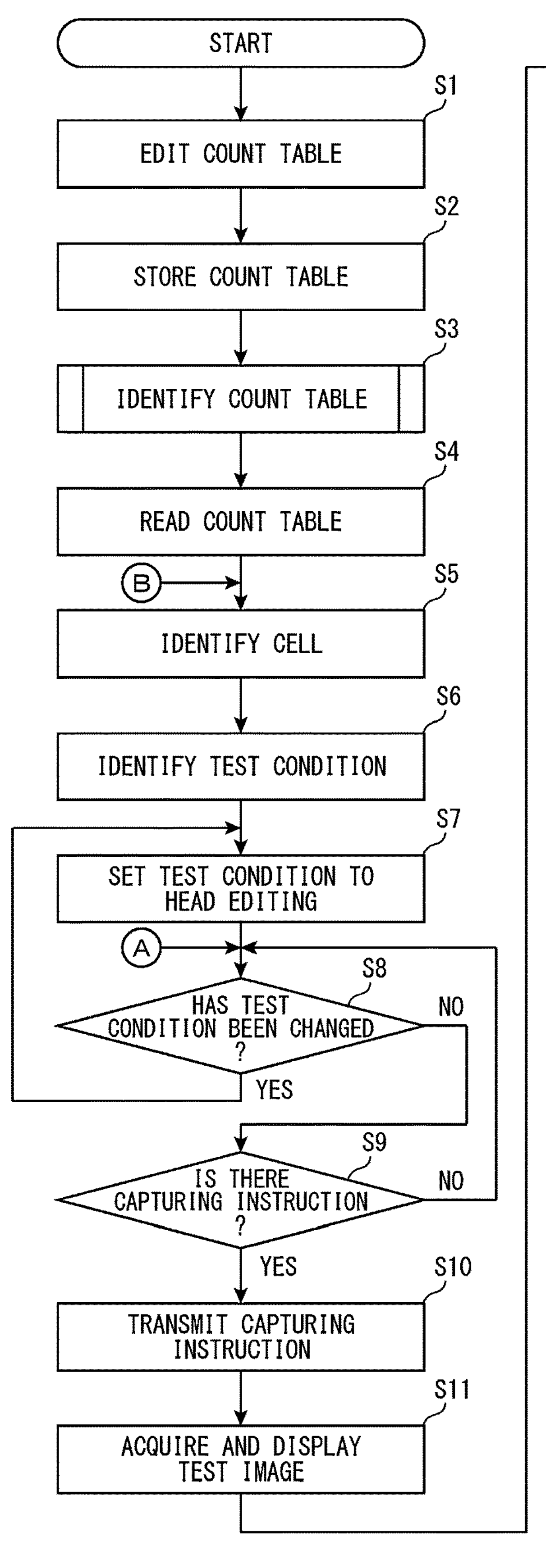
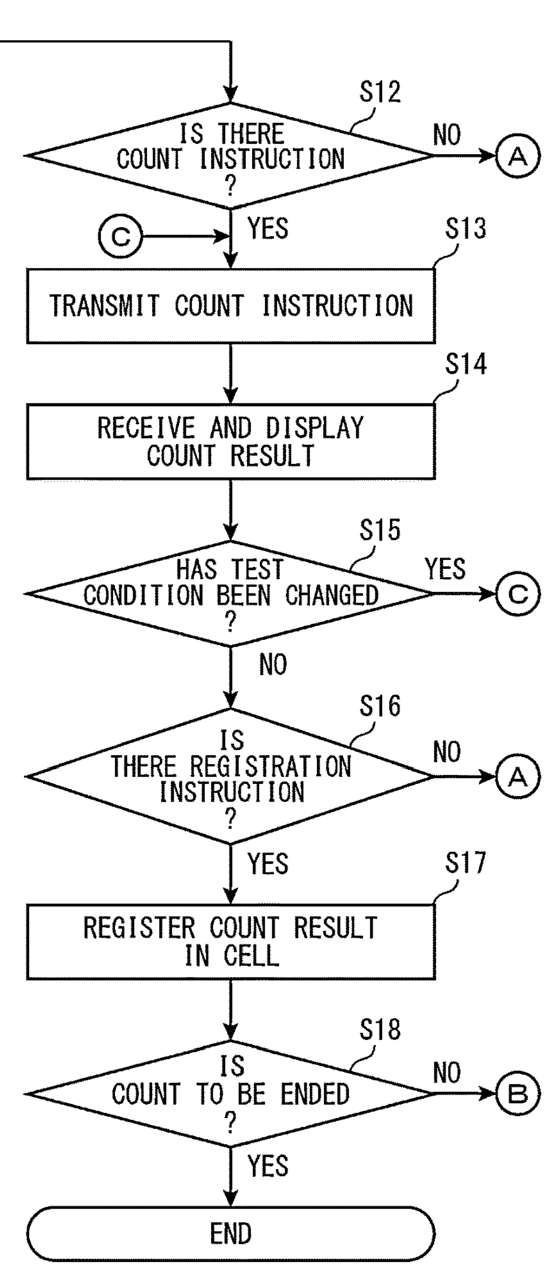

50
COUNTER
FILE
SETTING
65
66
SEARCH:
ALL
61
64
62
63
SAMPLE DATABASE
CHICKEN CHILI
CHICKEN SALAD
OHAGI
KIMCHI
SANDWICH
MIXED JUICE
52
53
54
59
56
51
TITLE
COUNT REVERSAL
ADD COLUMN
RESIDUE REDUCTION
AVERAGING
1▼ REPEAT
ID
BACTERIAL SPECIES
GENERAL VIABLE BACTERIA
GENERAL VIABLE BACTERIA
DILUTION FACTOR
10^2
10^3
CULTURE TIME
48h
48h
1
SANDWICH
2
57
55
290

50
COUNTER
FILE
SETTING
65
SEARCH:
66
ALL
61
64
SAMPLE DATABASE
62
63
CHICKEN CHILI
CHICKEN SALAD
OHAGI
KIMCHI
SANDWICH
MIXED JUICE
51
52
TITLE
53
COUNT REVERSAL
54
ADD COLUMN
59
RESIDUE REDUCTION
57
56
AVERAGING
1
REPEAT
ID
BACTERIAL SPECIES
GENERAL VIABLE BACTERIA
GENERAL VIABLE BACTERIA
DILUTION FACTOR
10^2
10^3
CULTURE TIME
0h
48h
0h
48h
55
1
SANDWICH
CAPTURED
CAPTURED
2
293
291
292

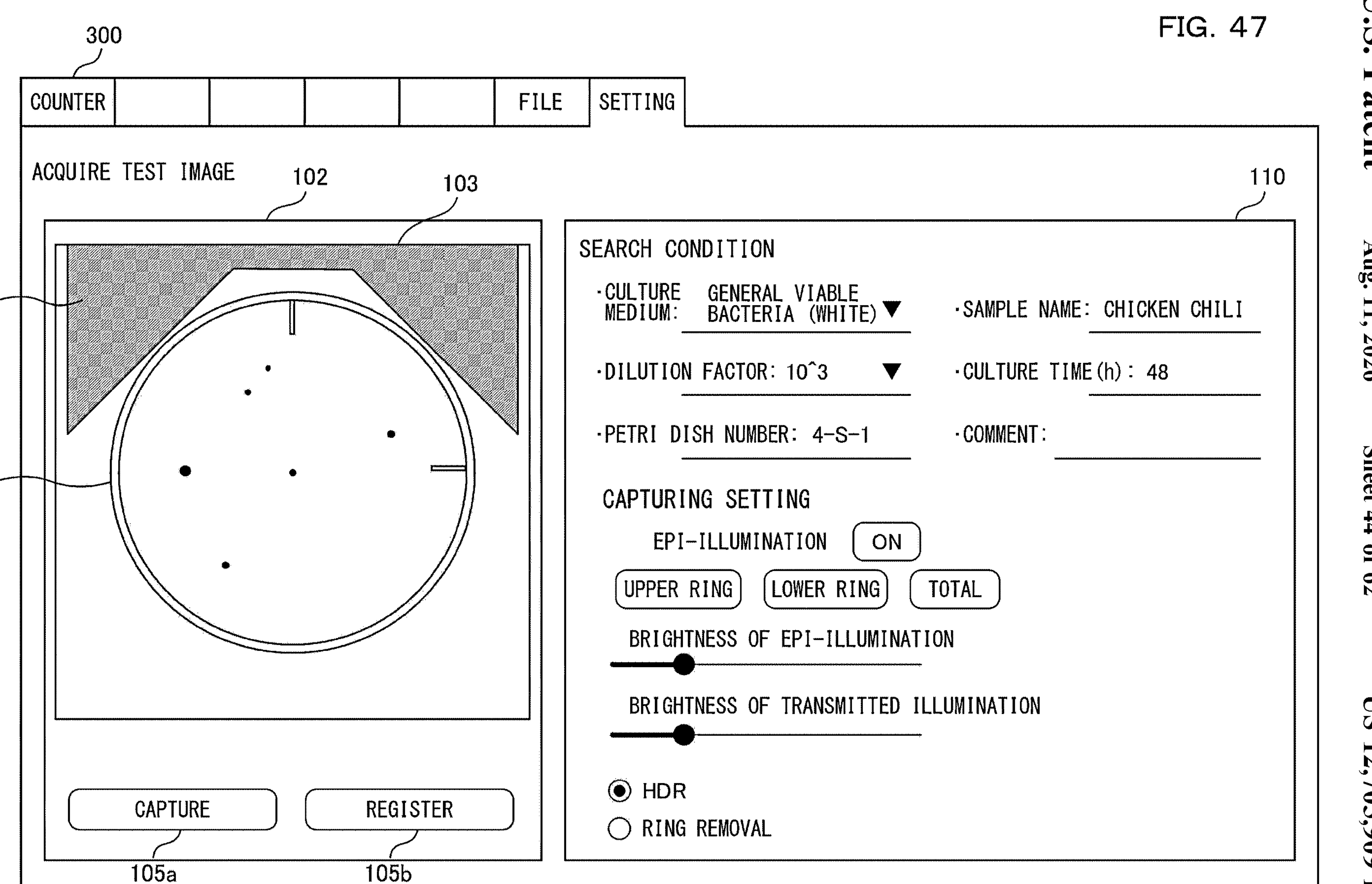
FIG. 47
300
COUNTER
FILE
SETTING
ACQUIRE TEST IMAGE
102
103
110
7
15
SEARCH CONDITION
·CULTURE MEDIUM: GENERAL VIABLE BACTERIA (WHITE)
·SAMPLE NAME: CHICKEN CHILI
·DILUTION FACTOR: 10^3
·CULTURE TIME (h): 48
·PETRI DISH NUMBER: 4-S-1
·COMMENT:
CAPTURING SETTING
EPI-ILLUMINATION
ON
UPPER RING
LOWER RING
TOTAL
BRIGHTNESS OF EPI-ILLUMINATION
BRIGHTNESS OF TRANSMITTED ILLUMINATION
HDR
RING REMOVAL
CAPTURE
REGISTER
105a
105b 100
COUNTER
FILE
SETTING
ACQUIRE TEST IMAGE
102
103
110
55
57
ID
BACTERIAL SPECIES
GENERAL VIABLE BACTERIA
GENERAL VIABLE BACTERIA
DILUTION FACTOR
10^2
10^3
CULTURE TIME
0h
48h
0h
48h
1
SANDWICH
CAPTURED
CAPTURED
2
293
291
292
COUNT RESULT:
---
COUNT
REGISTER
105a
105b 100
COUNTER
FILE
SETTING
ACQUIRE TEST IMAGE
102
103
110
15c
15f
103b
103a
55
57
ID
BACTERIAL SPECIES
GENERAL VIABLE BACTERIA
GENERAL VIABLE BACTERIA
DILUTION FACTOR
10^2
10^3
CULTURE TIME
0h
48h
0h
48h
1
SANDWICH
CAPTURED
CAPTURED
2
COUNT RESULT:
---
COUNT
REGISTER
105a
105b

COLONY COUNTING DEVICE, AND CONTROL METHOD

CROSS-REFERENCE TO RELATED APPLICATIONS

The present application claims foreign priority based on Japanese Patent Application No. 2022-127158, filed Aug. 9, 2022, the contents of which are incorporated herein by reference.

BACKGROUND OF THE INVENTION

1. Field of the Invention

The invention relates to a colony counting device, a control method, and a program.

2. Description of Related Art

In a factory that produces food, a colony counter is used to test whether or not bacteria are mixed in a product. An inspector forms a culture medium in a Petri dish, puts a food sample into the culture medium, and stores the food sample in an incubator or the like for a predetermined period. Thereafter, the inspector takes out the Petri dish from the incubator, and counts colonies (bacterial colonies) with the colony counter. In this manner, the counting accuracy of the colony counter is important for food hygiene management.

Meanwhile, when a residue such as dust is attached to the Petri dish, the residue is sometimes erroneously counted as a colony.

JP 2016-015944 A proposes to store a characteristic color of a colony in advance, and to count the colonies based on the characteristic color.

The invention of JP 2016-015944 A is effective in a case where the color of the colony is different from a color of a residue. However, in a case where the color of the colony is the same as the color of the residue, the residue is counted as the colony.

SUMMARY OF THE INVENTION

Therefore, an object of the invention is to improve counting accuracy of colonies.

According to one embodiment of the invention, provided is a colony counting device including:

- an imaging section that captures a test individual and generates an image of the test individual;
- a registration section that registers the image of the test individual in an initial state generated by the imaging section as a reference image;
- a residue identifying section that identifies a residue included in the reference image registered by the registration section and identifies a position of the residue in a test image corresponding to the residue included in the reference image based on a displacement of each of two or more common characteristic portions between the reference image and the test image that is generated by the imaging section and is an image of the test individual after culturing; and
- a counting section that counts the number of colonies included in the test image while excluding the residue from a count as a colony based on the position of the residue identified by the residue identifying section.

According to the invention, the burden on the user regarding the counting of colonies is mitigated.

BRIEF DESCRIPTION OF THE DRAWINGS

FIG. 17 is a view for describing a UI changing a test condition and the like;

FIG. 18 is a view for describing a UI at the time of instructing counting;

FIG. 20 is a view for describing a UI showing automatic identification of a target cell;

FIG. 22 is a view for describing a UI for switching information to be displayed in a cell;

FIG. 24 is a view for describing a transition of assignment of functions to buttons;

FIG. 25 is a view for describing a UI for changing the test condition and the like;

FIG. 27 is a view for describing a test list;

FIG. 34 is a flowchart illustrating processing executed by a PC;

FIG. 47 is a view for describing a UI for acquiring the reference image;

FIG. 50 is a view for describing a UI for reading the reference image and the like;

DETAILED DESCRIPTION OF PREFERRED EMBODIMENTS

Figure 1:
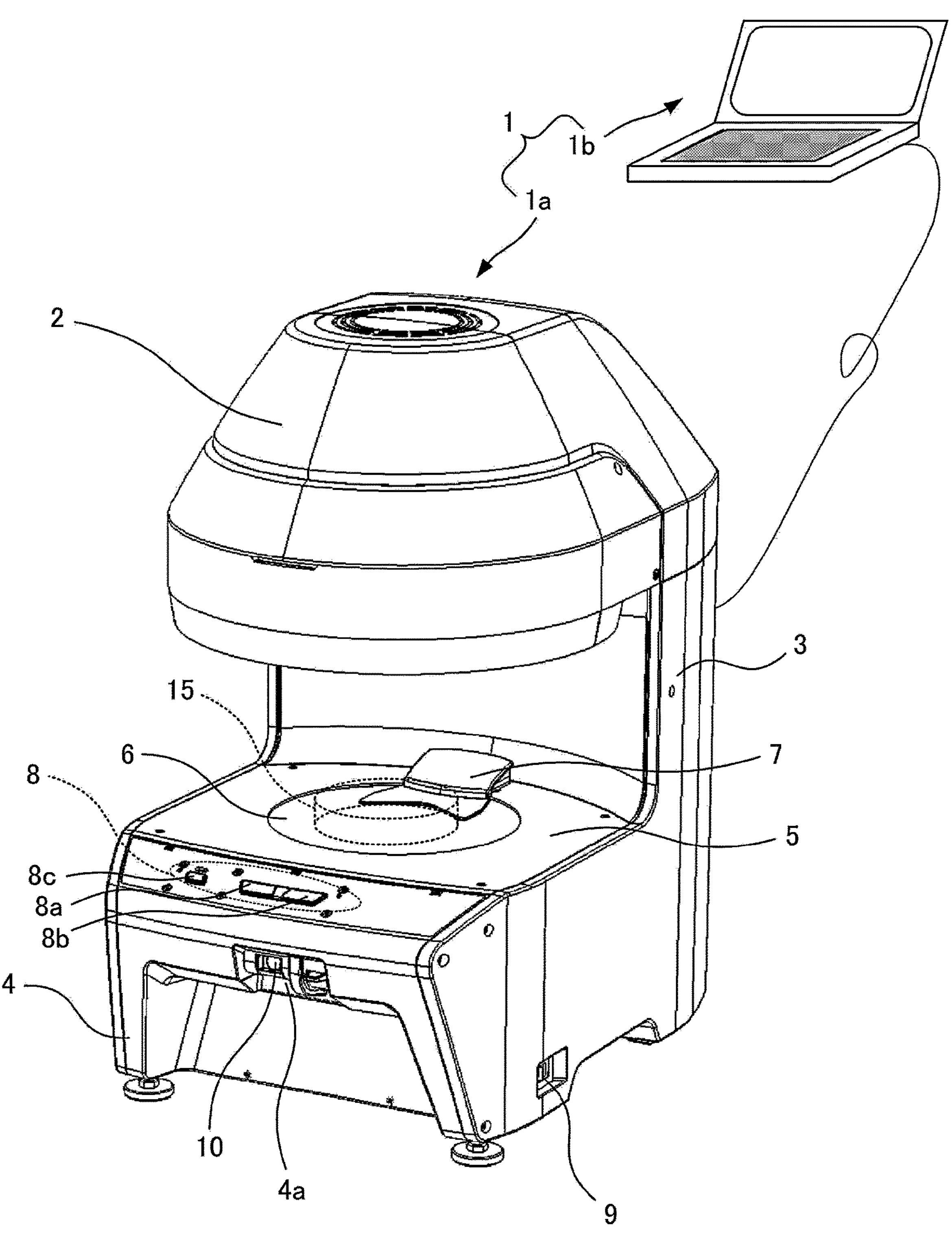
FIG. 1 is a view illustrating a colony counting device.

Hereinafter, an embodiment will be described in detail with reference to the accompanying drawings. Note that the following embodiment does not limit the invention according to the claims, and all combinations of characteristics described in the embodiment are not necessarily essential for the invention. Two or more characteristics of the plurality of characteristics described in the embodiment may be arbitrarily combined. Further, the same or similar configurations are denoted by the same reference numerals, and redundant description will be omitted.

[Colony Counting Device]

FIG. 1 illustrates a colony counting device 1. Note that the colony counting device 1 includes a head device 1*a* and a control device (personal computer (PC)) 1*b* to be described later. For example, the head device 1*a* and the PC 1*b* may be connected to each other in a wired manner by a universal serial bus (USB) cable, or may be connected to each other in a wireless manner.

The head device 1*a* includes an upper unit 2, a support unit 3, and a lower unit 4. A camera and an illumination device are provided inside the head device 1*a*. The support unit 3 exists between the upper unit 2 and the lower unit 4, and supports the upper unit 2. A stage 5 is provided on a top surface of the lower unit 4. The stage 5 is provided with a transmission window 6 on which a Petri dish 15 is placed and an alignment member 7 configured to position the Petri dish 15 at the center of the transmission window 6. An operation section 8 and a front camera 10 are provided in front of the lower unit 4. The operation section 8 includes a plurality of switches (for example, a first hardware button 8*a*, a second hardware button 8*b*, and a third hardware button 8*c*) configured for a user to input instructions. The front camera 10 is optional, and reads, for example, a two-dimensional symbol (barcode) and the like. The front camera 10 is arranged in a recess 4*a* provided in a front surface of a housing of the head device 1*a*. A power switch 9 is provided on a side surface of the lower unit 4.

Figure 2:
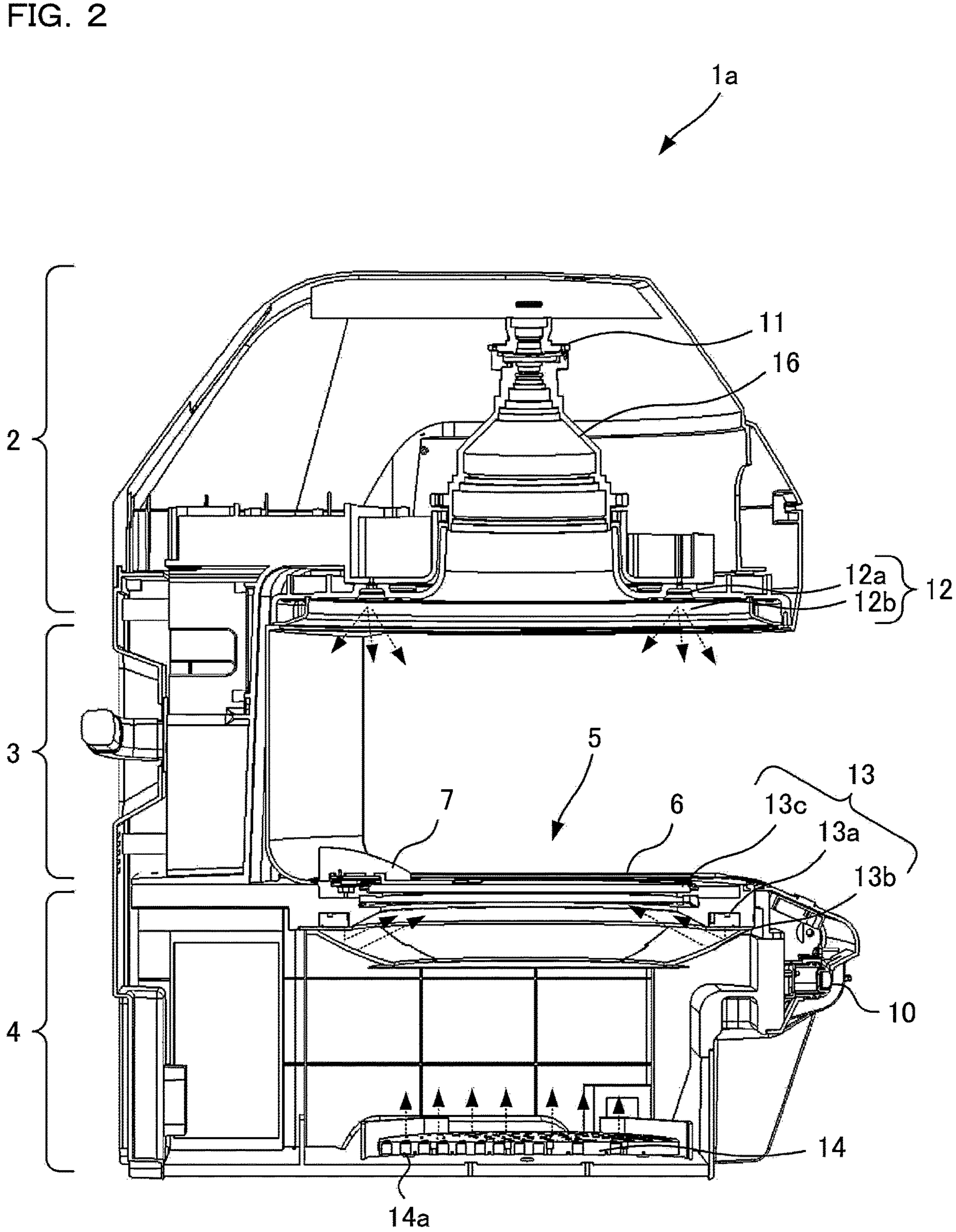
FIG. 2 is a view for describing a structure of a head device.

FIG. 2 is a cross-sectional view of the head device 1*a*. A ring illumination device 12 configured to perform epi-illumination is arranged near a lower surface of the upper unit 2. The epi-illumination is an illumination technique for observing a test individual by receiving light reflected by the test individual. A main camera 11 and an optical system 16 are arranged above the ring illumination device 12. A ring illumination device 13 is also arranged below the transmission window 6. A coaxial illumination device 14 that performs coaxial illumination (total illumination) is arranged below the ring illumination device 13. The coaxial illumination (total illumination) is also called transmitted illumination, and is used in a technique for observing a test individual by receiving light transmitted through the test individual. The ring illumination device 12 includes a plurality of light emitting elements 12*a* arranged in a ring shape, and a diffusion plate 12*b* that diffuses light output from the plurality of light emitting elements 12*a*. An illumination direction can be freely changed by selecting the light emitting elements 12*a* to be simultaneously turned on. This may be useful in combining a plurality of test images acquired by capturing images of a test individual (food sample) illuminated from different directions. The ring illumination device 13 includes a plurality of light emitting elements 13*a* arranged in a ring shape, a reflection plate 13*b*, and a diffusion plate 13*c*. The reflection plate 13*b* reflects light output from the plurality of light emitting elements 13*a* toward the diffusion plate 13*c*. The diffusion plate 13*c* uniformly diffuses the light from the reflection plate 13*b*. An illumination direction is freely changed by selecting the light emitting elements 13*a* to be simultaneously turned on among the plurality of light emitting elements 13*a*. The coaxial illumination device 14 includes a plurality of light emitting elements 14*a* arranged concentrically or in an array. As a plurality of types of the illumination devices are provided in this manner and an appropriate illumination device is selected for each combination of a food sample and a culture medium, the number of colonies may be accurately countable.

Figure 3:
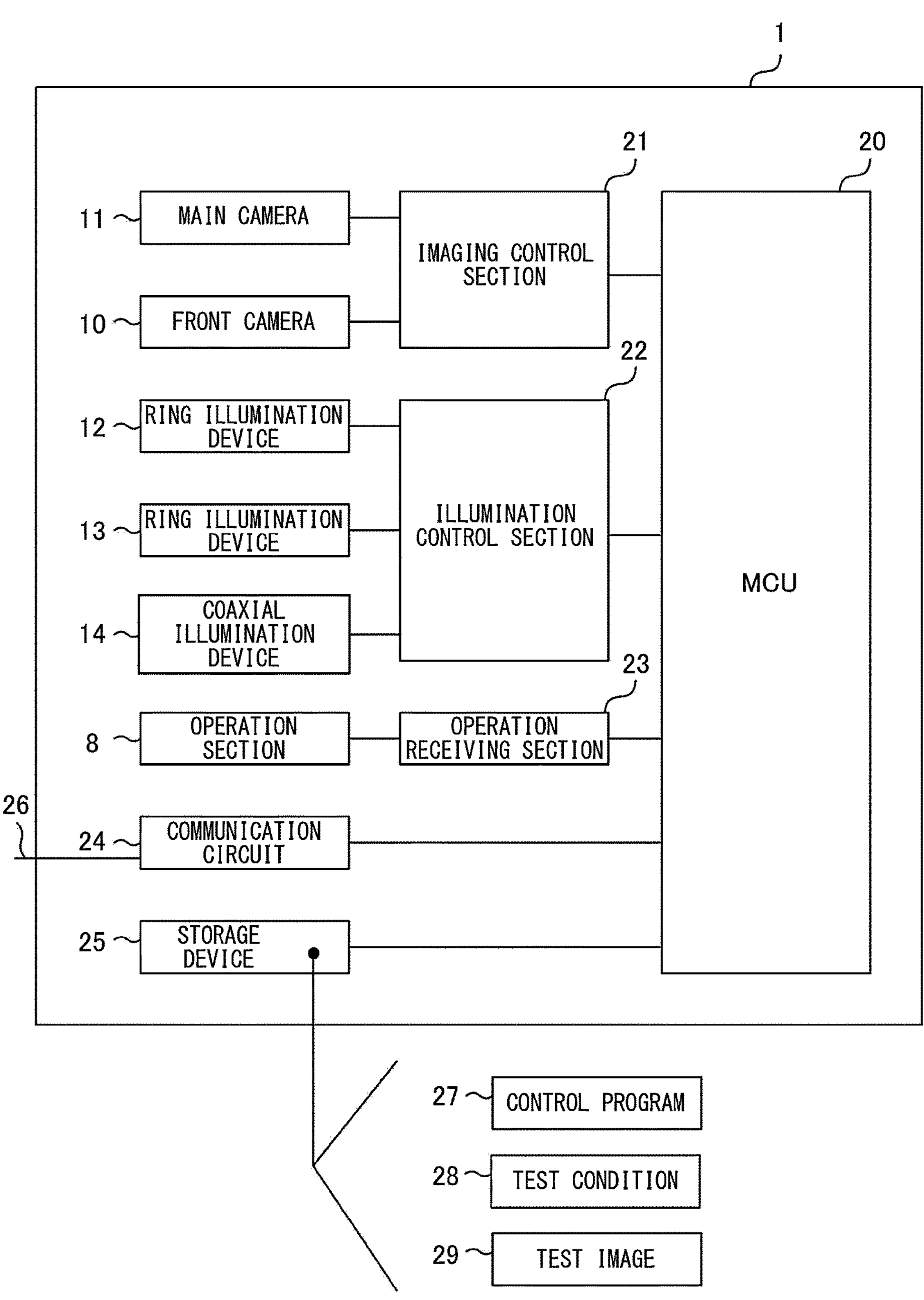
FIG. 3 is a diagram for describing an electrical configuration of the head device.

FIG. 3 illustrates an electrical configuration of the head device 1*a*. An MCU 20 is a processor that executes a control program 27 stored in a storage device 25 and controls the head device 1*a* according to the control program 27. Note that MCU is an abbreviation for micro-controller unit. The MCU 20 controls the main camera 11 and the front camera 10 via an imaging control section 21 to acquire various types of image data. The imaging control section 21 controls, for example, an exposure time of the main camera 11. The MCU 20 turns on or off the ring illumination devices 12 and 13 and the coaxial illumination device 14 via an illumination control section 22. The illumination control section 22 controls driving power to be supplied to the ring illumination devices 12 and 13 and the coaxial illumination device 14. The MCU 20 receives a user input that is input from the operation section 8 via an operation receiving section 23. The operation receiving section 23 includes an input circuit or the like that generates a signal indicating a state of a switch section of the operation section 8. A communication circuit 24 is a circuit that communicates with the PC 1*b* illustrated in FIG. 4 via a communication cable 26. The communication circuit 24 may include a wireless communication circuit and a LAN interface circuit. LAN is an abbreviation for local area network. The communication cable 26 may be, for example, a USB cable. The storage device 25 includes, for example, a read-only memory (ROM) that stores the control program 27 and a random access memory (RAM) used as a work area. The storage device 25 may store, for example, a test condition 28 set by the PC 1*b*, a test image 29 acquired by the main camera 11, and the like. The test condition 28 can include, for example, an illumination condition, an imaging condition, a count condition, and the like. The test image 29 is an image of the Petri dish 15 including a culture medium and a sample.

Figure 4:
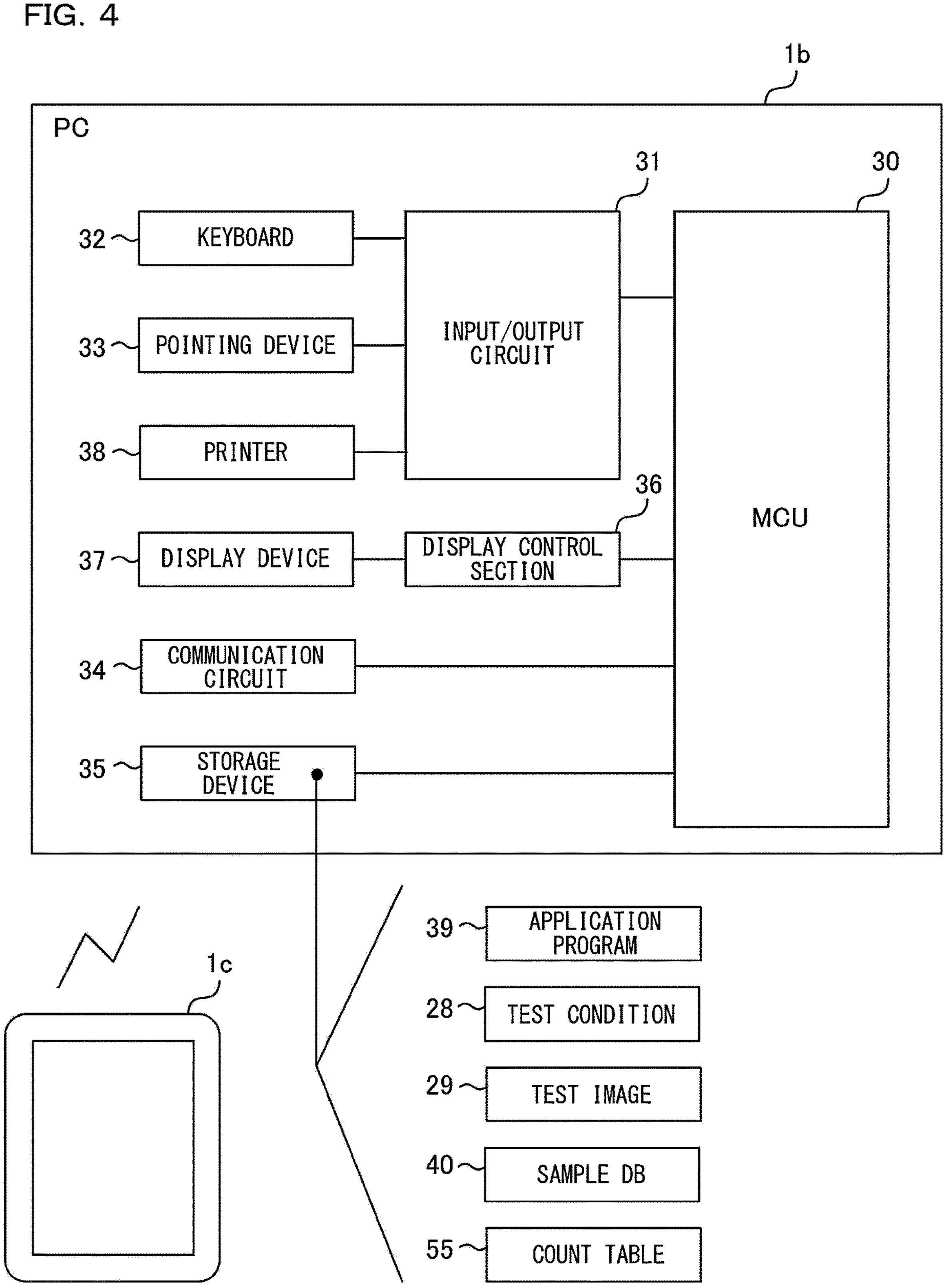
FIG. 4 is a diagram for describing an electrical configuration of a control device.

FIG. 4 illustrates the PC 1*b* that controls the head device 1*a*. An MCU 30 is a processor that executes a program stored in a storage device 35 and controls the PC 1*b* and the head device 1*a* according to the program. The MCU 30 receives a user instruction from a keyboard 32 and a pointing device 33 connected to an input/output circuit 31. The MCU 30 controls a printer 38 connected to the input/output circuit 31 to print a table or the like on paper. The MCU 30 displays various types of information on a display device 37 via a display control section 36 such as a graphics board. A communication circuit 34 is a circuit that communicates with the head device 1*a* via the communication cable 26. The communication circuit 34 may include a wireless communication circuit and a LAN interface circuit. The storage device 35 includes, for example, a read-only memory (ROM) that stores a program and a random access memory (RAM) used as a work area. Moreover, the storage device 35 may include a hard disk drive (HDD) and a solid state drive (SSD). The storage device 35 may store an application program 39, the test condition 28, the test image 29, a sample DB 40, a count table 55, and the like. DB is an abbreviation for database. The application program 39 is in charge of, for example, creation and editing of the sample DB 40 and the count table 55, control of the head device 1*a*, and the like. The test condition 28 is set by the MCU 30 according to the application program 39. The test image 29 is received from the head device 1*a*. The sample DB 40 is a database referred to when the count table 55 is created. The count table 55 is a table in which a plurality of cells are arranged in an array, and includes a row element and a column element.

In the PC 1*b*, the communication circuit 34 may execute wireless communication with a terminal device 1*c* such as a smartphone or a tablet terminal. The terminal device 1*c* may display the count table 55 or may display a test list created from the count table 55. The test list includes a Petri dish number, a sample name, a bacterial species, a culture medium, a dilution factor, a culture time, and the like, and is referred to when the user prepares a test individual in the Petri dish 15.

[Test Procedure]

A general test procedure is as follows. (1) A user creates a test list by handwriting. The test list includes a plurality of rows, and a Petri dish number, a bacterial species, a dilution factor, a count number, and a comment (a sample product name and the like) can be written in each of the rows. Note that the Petri dish number referred to here is identification information assigned in advance according to a predetermined rule in order to specify a culture condition such as a type of a culture medium or a dilution factor. (2) The user writes numbers onto lids of Petri dishes according to the test list, or writes numbers written in advance in the Petri dishes into the test list. (3) The user creates a culture medium according to the dilution factor written in the test list. If the dilution factor is not written in the test list, the user writes an actual dilution factor in the test list. (4) The user inputs (mixes) a sample into the culture medium of each of the Petri dishes. The user writes a name of the sample in a field of the comment of the test list. (5) The user puts the Petri dishes into a culture vessel. (6) When the predetermined time has elapsed, the user takes out the Petri dishes from the culture vessel and counts the number of colonies. For example, the user gives a counted mark with an oil-based pen to a position of a colony while looking through the colony from a bottom surface side of the Petri dish. The number of colonies is written in the test list. Note that the user may count the number of colonies for each bacterial species while visually confirming the bacterial species. In this case, the user writes the number of colonies for each bacterial species into the test list for each of the Petri dishes. (7) The user activates the PC, and inputs reads numerical values and characters written in the test list to spreadsheet software while reading the numerical values and the characters. The number of colonies is aggregated using a macro function of the spreadsheet software or the like.

In this manner, the test list is created by handwriting in the conventional test procedure, which is extremely troublesome work for the user. Further, if there is an erroneous input when the numerical values or the like written in the test list are transcribed to a sheet of the spreadsheet software, there is a possibility that an aggregation result is also erroneous. Even if the number of colonies can be automatically acquired by a colony counter, there is still a possibility of erroneous writing and erroneous input since all of the creation of the test list, the writing of the number of colonies into the test list, and the transcription from the test list to the sheet of the spreadsheet software are handwritten in the conventional technique.

Therefore, in the present embodiment, it is proposed that an electronic test list is created by the PC 1*b*, colonies are counted according to an electronic test list, a counting result is directly input to the electronic test list, and input numbers are aggregated. As a result, burden on the user regarding post-processing on colony counting results may be mitigated. Further, the erroneous input may also be reduced, and test accuracy may be improved since handwriting or manual input by the user is reduced.

[Creation of Test List (Count Table)]

Figure 5:
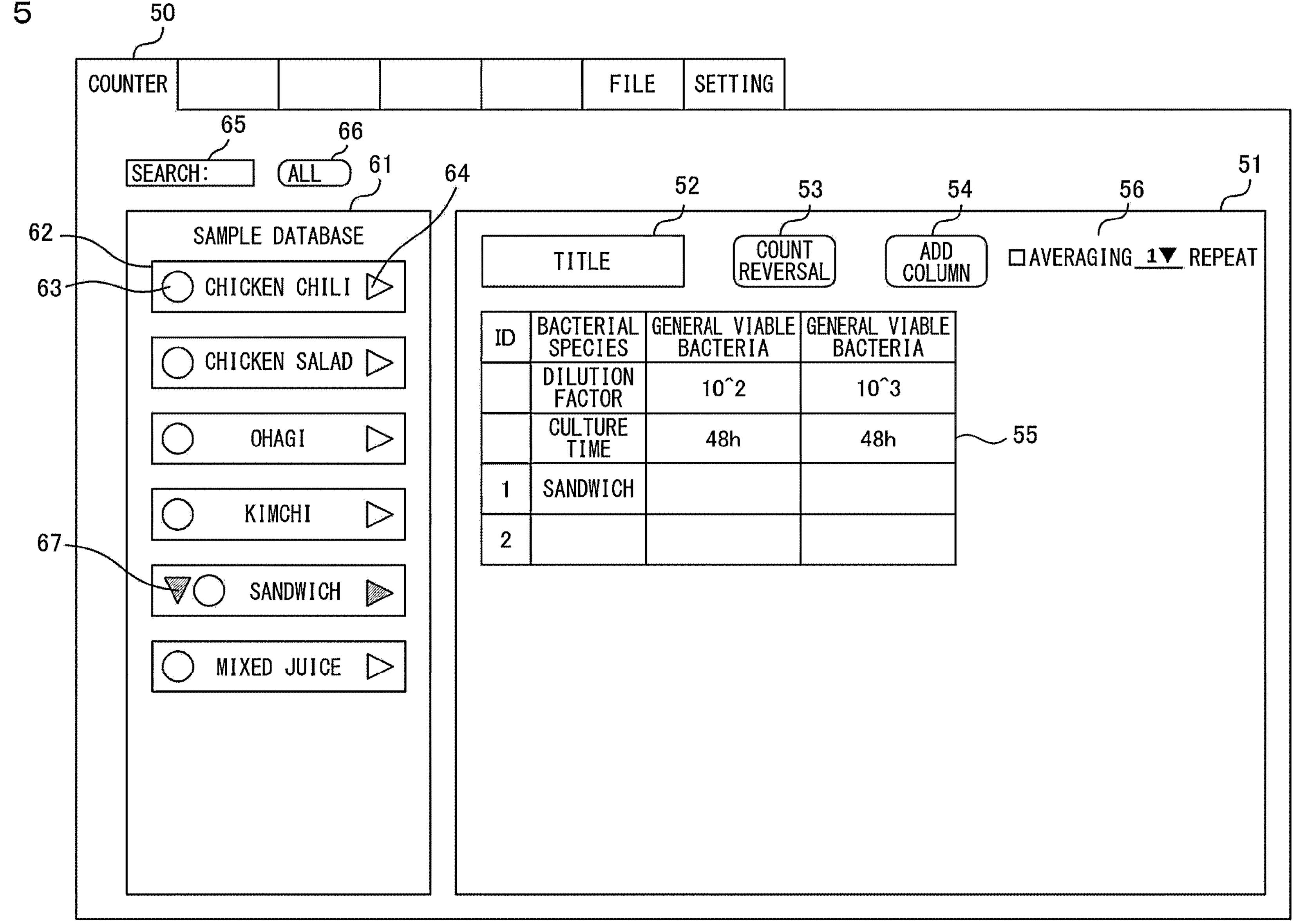
FIG. 5 is a view for describing a user interface (UI)

FIG. 5 illustrates an UI 50 of a count application program displayed on the display device 37 of the PC 1*b*. The count application program is stored in the storage device 35 and executed by the MCU 30. The UI 50 includes a button, a link, a tab, and the like for switching a plurality of functions included in the count application program.

The UI 50 includes a table creation area 51 and a DB display area 61. DB is an abbreviation for database. The table creation area 51 displays at least the count table 55. A title display section 52 receives and displays an input of a title (name) given to the count table 55 from the keyboard 32. A button 53 is a button for switching execution/non-execution of a count of each cell. A button 54 is a button for instructing addition of a column to the count table 55. The averaging setting section 56 includes a check box for instructing whether or not to execute averaging of count results, and a selection section of the number of count values to be averaged (=the number of iterations of the count).

The DB display area 61 displays a list of templates (for example, the sample DB 40) of count items registered in advance. Here, the count item corresponds to one row in the count table 55. The count item is typically distinguished by a name (sample name) of a test target object. A name display section 62 displays a name (sample name) of a template registered in advance. An indicator 63 is an object that visually displays a classification tag associated with the sample name. The classification tag is a tag indicating a classification (for example, a staple, a side dish, or a dessert) defined by a user. For example, the indicator 63 may represent a difference in the classification tag using a difference in a color. The indicator 63 may represent a difference in the classification tag using a difference in a shape of the indicator 63. A button 67 is a button for expanding and displaying one or more sub-items having a parent-child relationship with respect to a certain sample name. The parent-child relationship refers to a relationship between a sample and a plurality of ingredients constituting the sample. For example, when a sandwich is used as a parent, ingredients (for example, ham, lettuce, and egg) constituting the sandwich are children. A button 64 is a button for instructing addition of a corresponding template to the count table 55. Since the sample DB 40 is prepared in advance in this manner, the user can easily create the count table 55.

In a case illustrated in FIG. 5, when the user presses the button 64 associated with a sandwich, the MCU 30 adds a row to the count table 55, displays "1" as an ID in an ID display cell of the added row, and displays "Sandwich" in a cell displaying a sample name in the added row. The ID is an abbreviation for identification information. That is, the ID and the sample name are set on a row-basis, and are "settings for the row". Moreover, the MCU 30 reads a test condition of the sandwich registered in the sample DB 40 from the storage device 35, adds a new column to the count table 55, and displays the read test condition in the new column. In this example, the test condition includes a bacterial species (for example, general viable bacteria or *Escherichia coli*), a dilution factor of a culture medium, a culture time of a sample, and the like. Each column includes, for example, a cell for a bacterial species, a cell for a dilution factor, a cell for a culture time, and a cell for a count value. That is, the bacterial species, the dilution factor, and the culture time are set on a column-basis, and are "settings for the column". In this example, nothing is input to the cell for the count value since a test has not been executed yet and the count value has not been obtained. The first test item for the sandwich is that a culture medium having a dilution factor of 100 times is used for general viable bacteria and a culture time of 48 hours is applied. The second test item for the sandwich is that a culture medium having a dilution factor of 1000 times is used for general viable bacteria and a culture time of 48 hours is applied. In this manner, the MCU 30 adds columns in accordance with the number of the test items.

Figure 6:
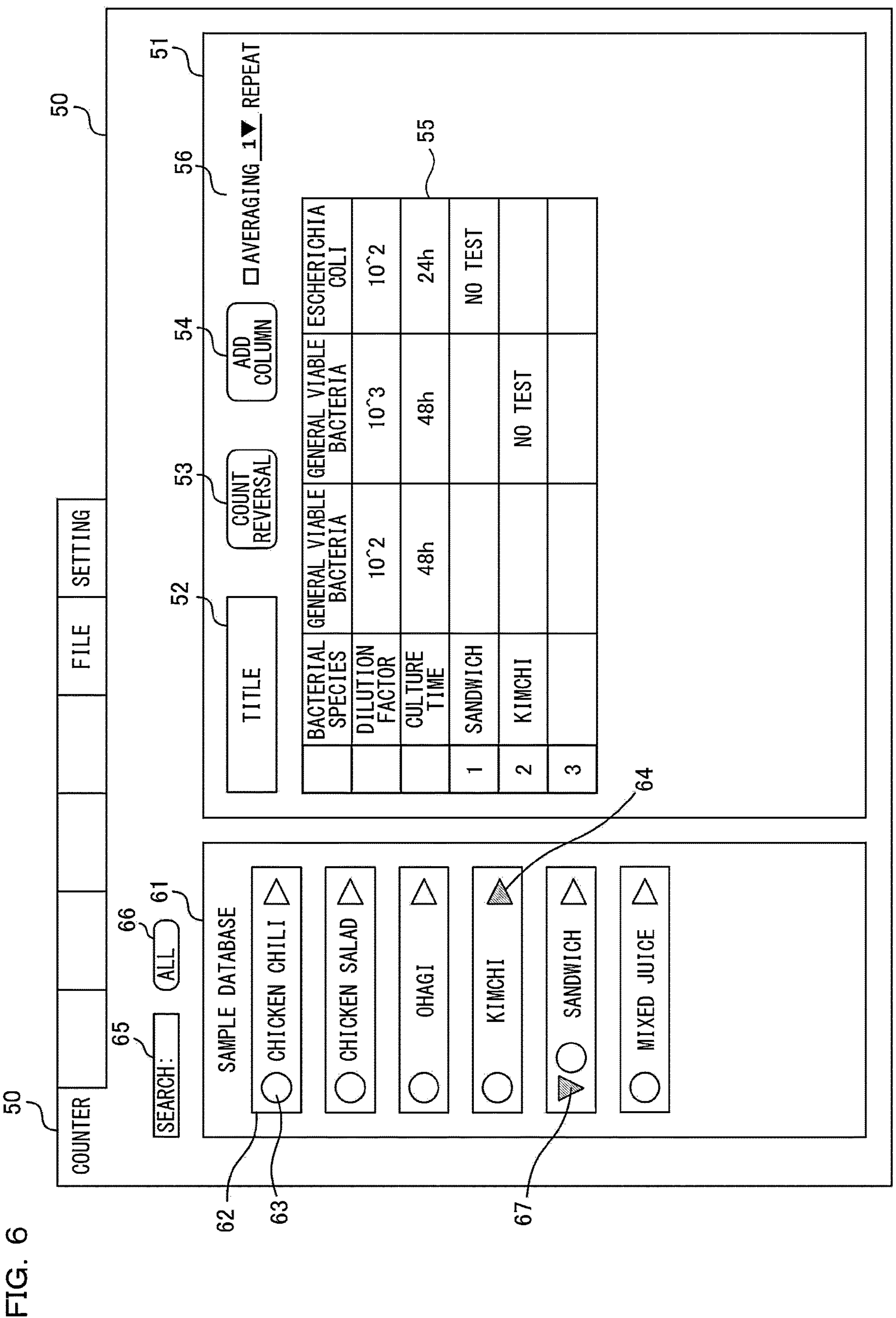
FIG. 6 is a view for describing a UI for creating a count table from a sample database.

In FIG. 6, when the user presses the button 64 associated with Kimchi, the MCU 30 reads a test condition of the Kimchi registered in the sample DB 40 from the storage device 35, and adds a row and a column corresponding to the read test condition to the count table 55.

In this example, the Kimchi has two test items. The first test item for the Kimchi is that a culture medium having a dilution factor of 100 times is used for general viable bacteria and a culture time of 48 hours is applied. This is common to the first test item for the sandwich. Therefore, the MCU 30 discards the first test item included in a template of the Kimchi and does not add the test item as a new column. The second test item for the Kimchi is that a culture medium having a dilution factor of 100 times is used for *Escherichia coli*, and a culture time of 24 hours is applied. The MCU 30 adds this as a new column to the count table 55.

Note that a test for *Escherichia coli* is not performed for the sandwich. Therefore, characters or an image indicating "No test" may be displayed in the cell for the count value. Similarly, a test using the culture medium having the dilution factor of 1000 for general viable bacteria is not performed for the Kimchi. Therefore, the characters or the image indicating "No test" may be displayed in the cell for the count value.

Note that the execution/non-execution of a count can also be executed by operating a count reversal button 53. For the sandwich, when the count reversal button 53 is operated in a state in which the cell corresponding to *Escherichia coli* is selected, the MCU 30 may be capable of switching between displaying the characters or the image indicating "No test" and leaving a blank to input a count result.

As illustrated in FIGS. 5 and 6, a search box 65 and a tag search narrowing button 66 may be added. When the number of templates registered in the sample DB 40 increases, it becomes difficult for the DB display area 61 to display all the templates at a time. Therefore, the MCU 30 may search the storage device 35 based on characters input to the search box 65 to extract a template, and display a search result in the DB display area 61. Further, when the tag search narrowing button 66 is pressed, the MCU 30 may display only a sample product filtered by a designated classification tag. For example, the same classification tag may be given to a plurality of sample products. In this case, a plurality of sample products given with the selected classification tag are added to the count table 55.

Figure 7:
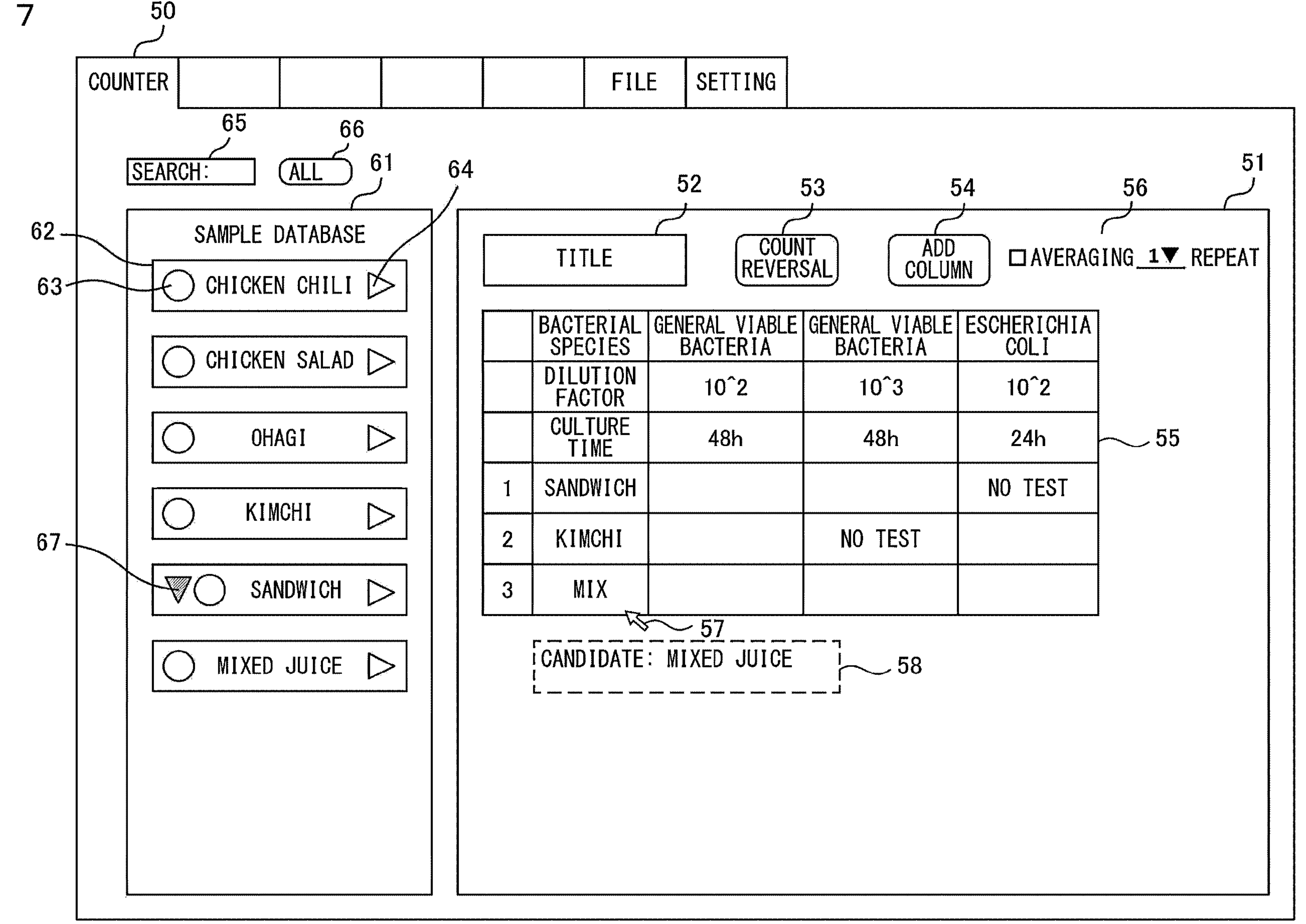
FIG. 7 is a view for describing a UI related to input assistance of a sample name.

FIG. 7 illustrates another procedure of adding a new row. The user selects a sample name display cell in the new row with a pointer 57, and sequentially inputs a sample name from the first character through the keyboard 32. The MCU 30 searches the sample DB 40 with one or more input characters, and displays sample names as input candidates on a candidate display section 58. In this example, since "Mix" is input in the sample name display cell, the MCU 30 searches for a template including "Mix" as a sample name, finds "Mixed juice", and displays "Mixed juice" on the candidate display section 58. Here, when the user selects "Mixed juice" displayed on the candidate display section 58 by the pointer 57, the MCU 30 reads a test condition of a mixed juice from the storage device 35 and adds a column according to the read test condition. As a result, the search condition is associated with a cell of the mixed juice.

Figure 8:
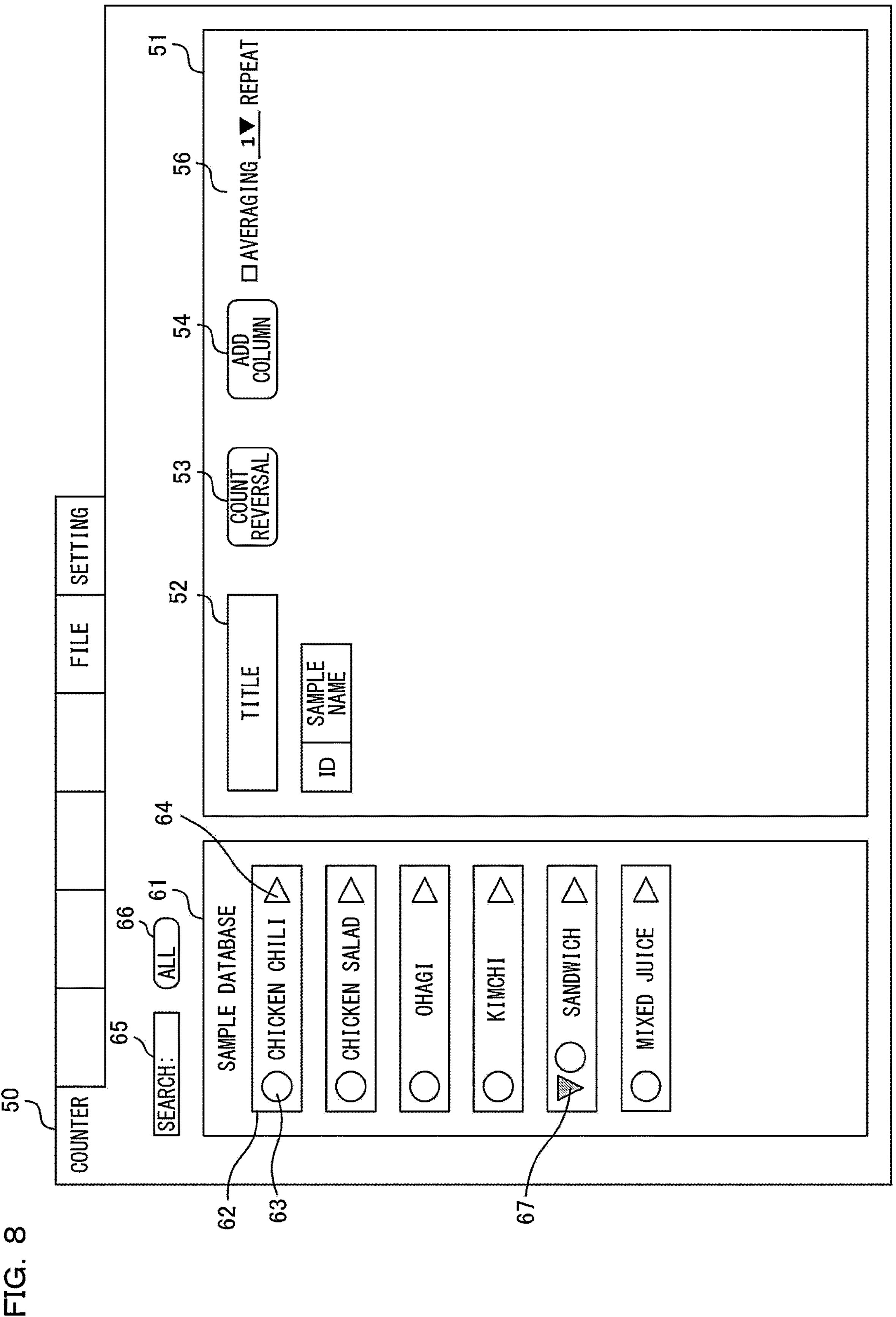
FIG. 8 is a view for describing a UI for newly creating a count table.

FIG. 8 illustrates the UI 50 in a case where a count table is newly created. For example, the MCU 30 can start spreadsheet software in parallel with the application program 39.

Figure 9:
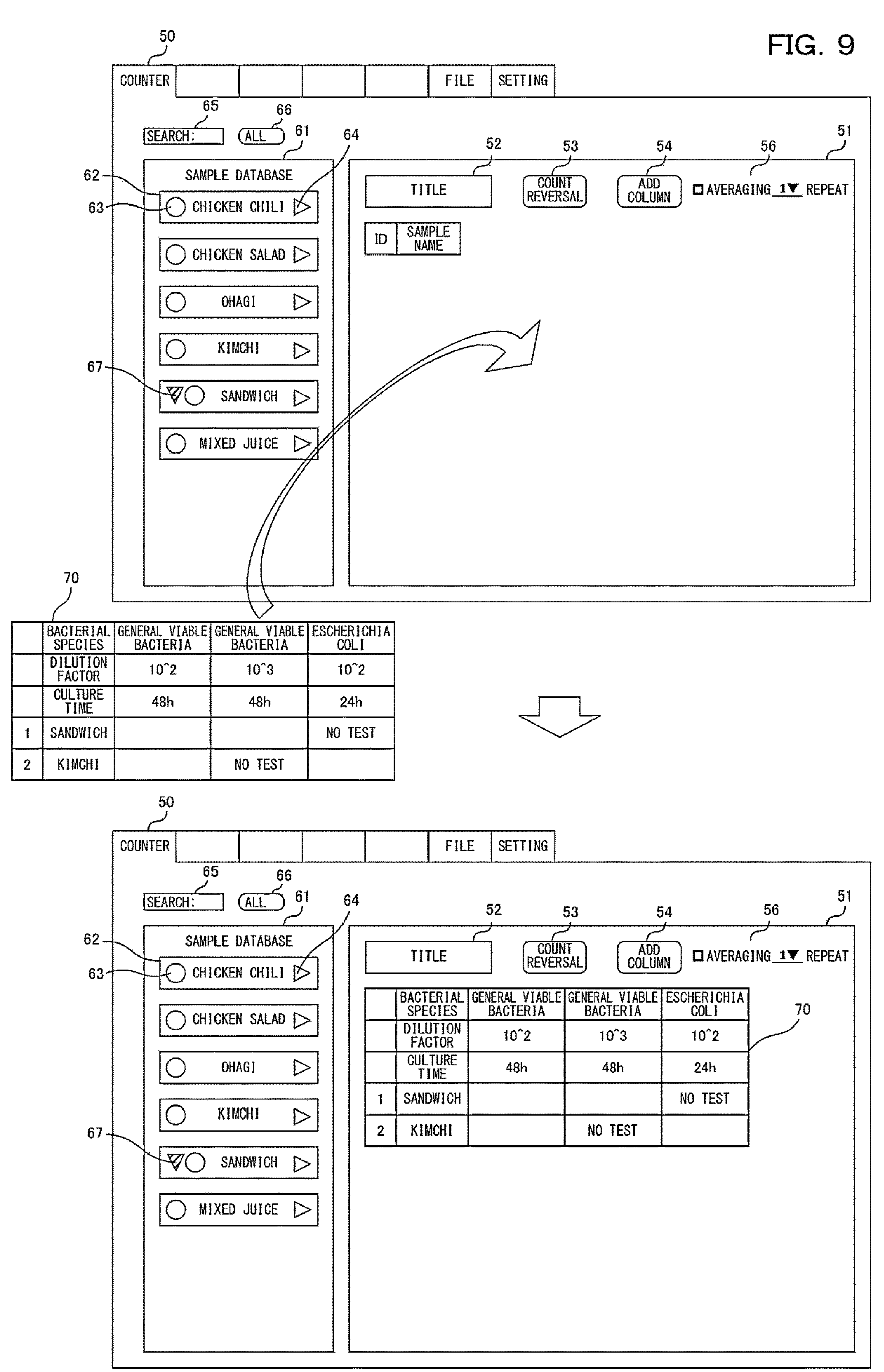
FIG. 9 is a view for describing a sheet of spreadsheet software.

FIG. 9 illustrates a sheet 70 of the spreadsheet software. The MCU 30 receives a copy and paste instruction to the UI 50 for the sheet 70 or a cell group selected in the spreadsheet software. As a result, the MCU 30 may create the count table 55 illustrated in FIG. 6.

Figure 10:
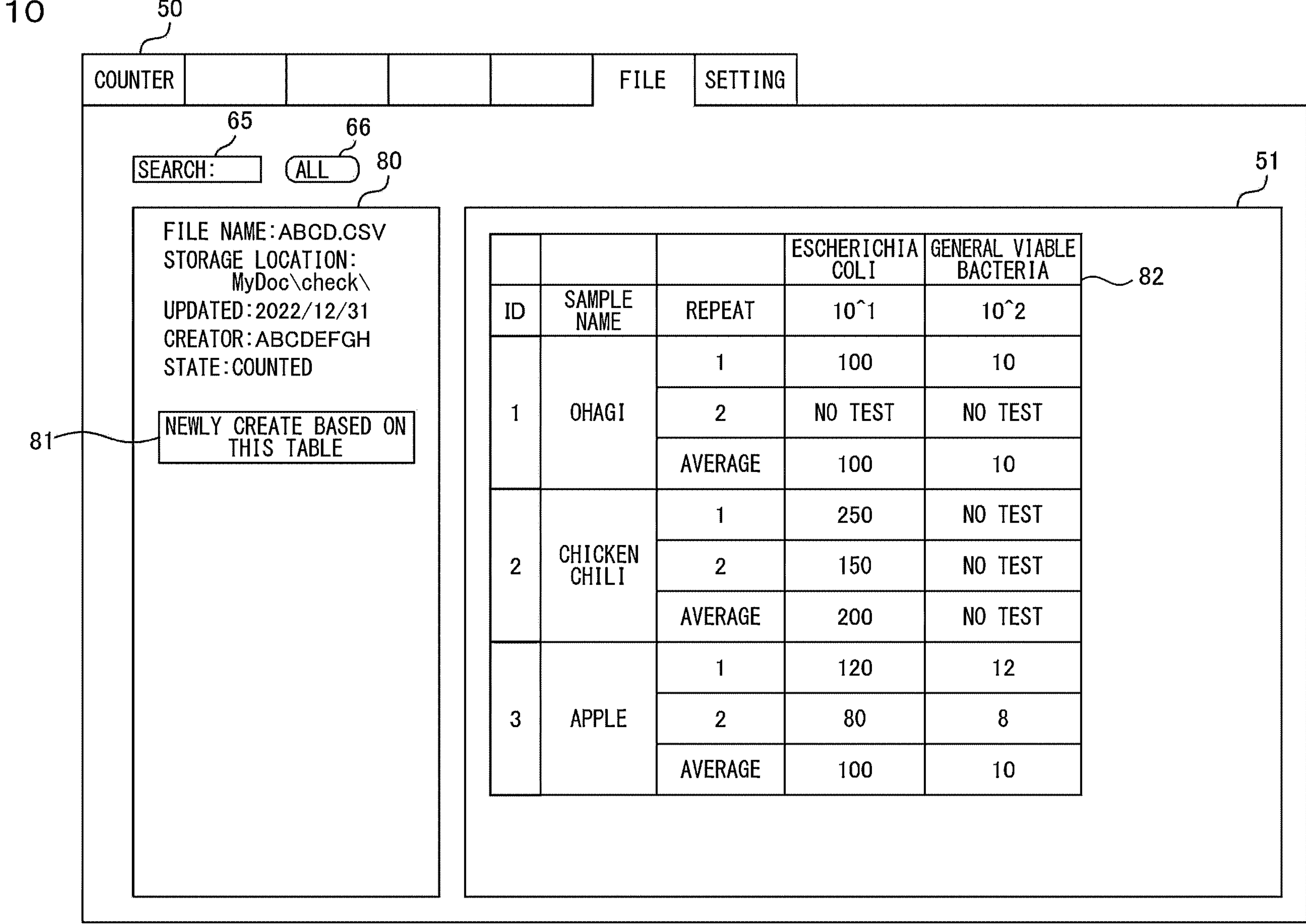
FIG. 10 is a view for describing a UI for diverting a past count table.
Figure 11:
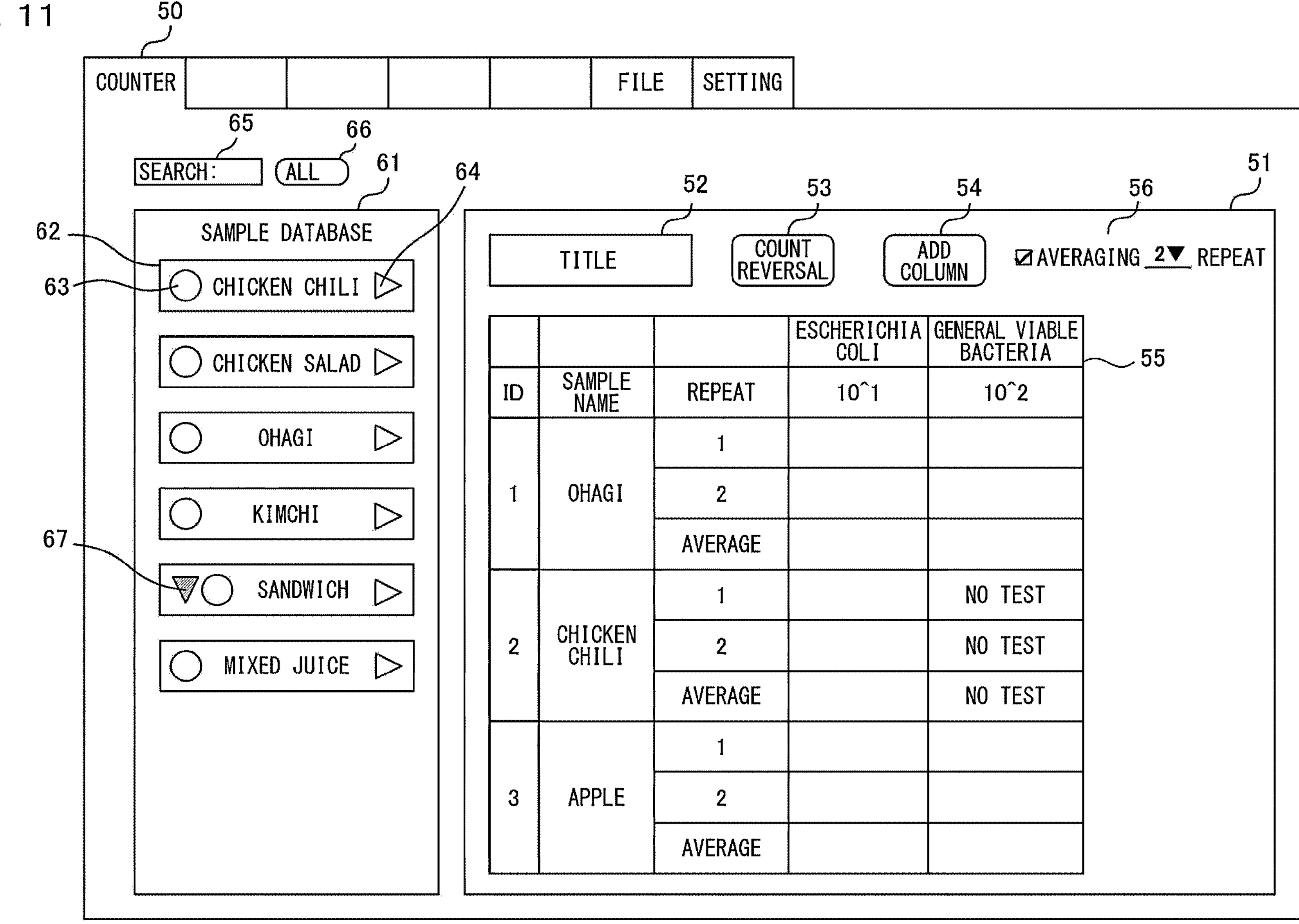
FIG. 11 is a view for describing a UI for facilitating settings of statistical processing.

FIG. 10 is a view for describing a procedure of calling a count table 82 to which count values have already been input and creating a new count table 55. The MCU 30 may read a file corresponding to a file name input to the search box 65 from the storage device 35 and display an attribute of the file on an attribute display section 80. The MCU 30 displays the read count table 82 in the table creation area 51. As illustrated in FIG. 10, the count values have already been input to the cells for the count values. When sensing that a new creation button 81 is pressed, the MCU 30 deletes all the count values input to the cells for the count values constituting the read count table 82 and creates the new count table 55. FIG. 11 illustrates the new count table 55 created from the count table 82 to which the count values have already been input. Instead of deleting the count values, the count values may be reset to zero.

Note that the MCU 30 may create one count table 55 by merging a plurality of count tables 82. In this case, the MCU 30 analyzes the plurality of count tables 82, deletes overlapping rows and columns, and creates the new count table 55.

Figure 12:
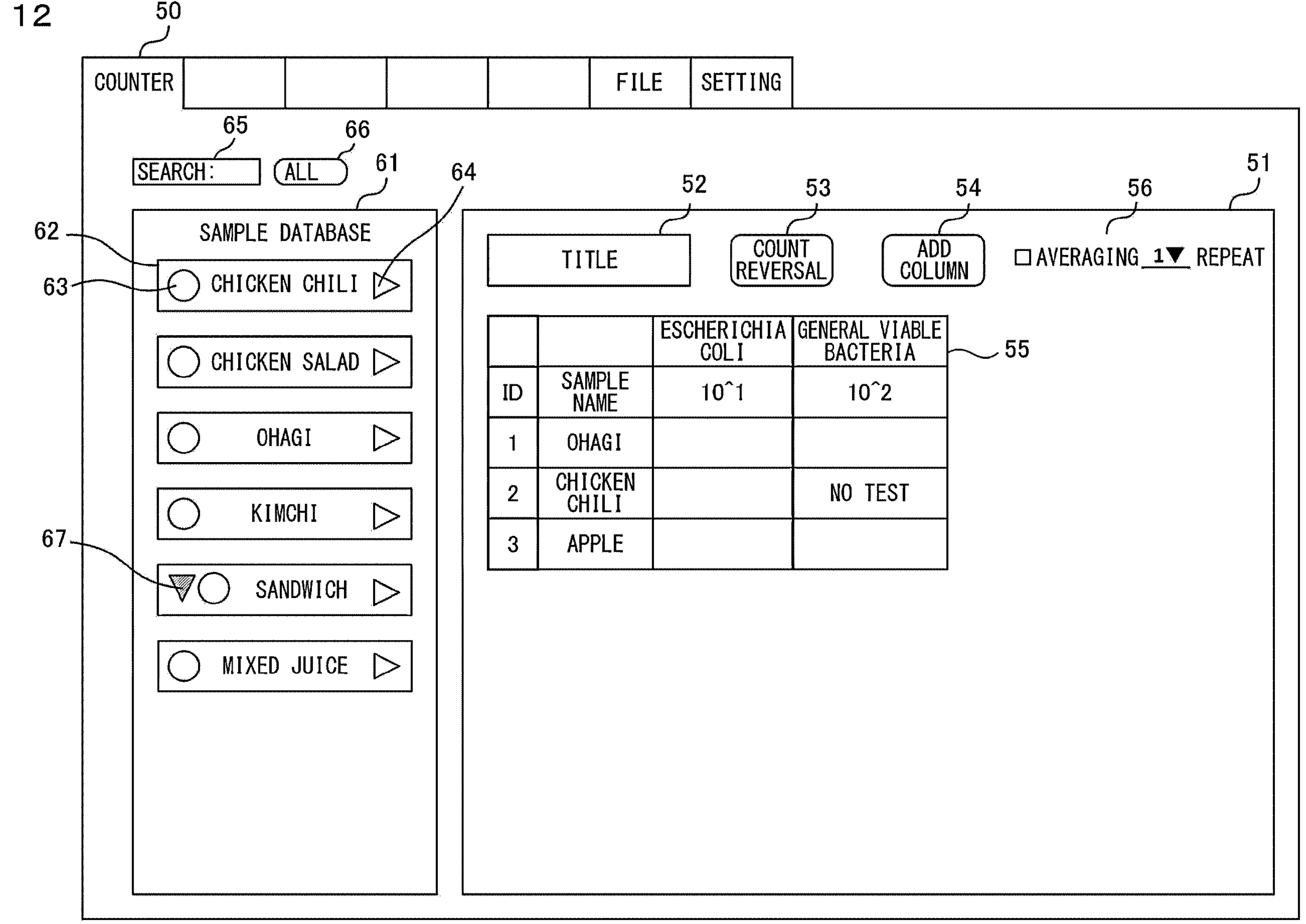
FIG. 12 is a view for describing a UI for facilitating the settings of statistical processing.

FIG. 12 is a view for describing a method of creating the count table 55 including averaging. In this example, since averaging has not yet been applied, one row is provided for one sample name. In this state, when the averaging setting section 56 is checked and "2" is selected as the number of iterations, the MCU 30 displays the UI 50 illustrated in FIG. 11. As illustrated in FIG. 11, since the number of iterations is "2", the MCU 30 divides an input row for a count value associated with each sample name into three rows, and adds a column indicating the number of iterations. In this example, among the three rows, the first row has a cell to which a count value acquired in the first test is input. The second row has a cell to which a count value acquired in the second test is input. The third row has a cell to which an average value of the count value acquired in the first test and the count value acquired in the second test is input. In this manner, the MCU 30 may add the cells to which the count values are input and the cell to which the average value is input to the count table 55 in accordance with the number of iterations.

Figure 13:
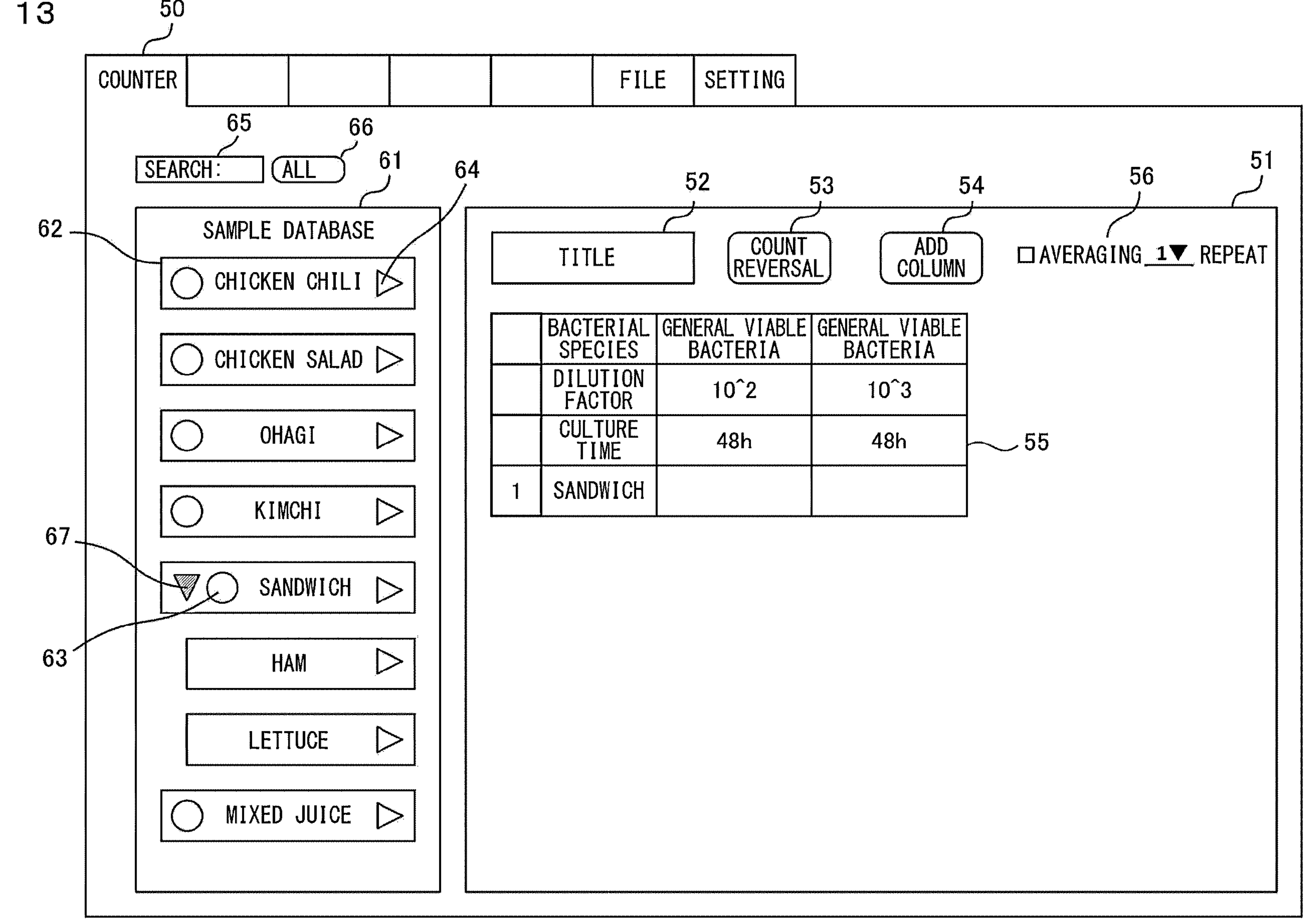
FIG. 13 is a view for describing a UI related to a parent-child relationship.
Figure 14:
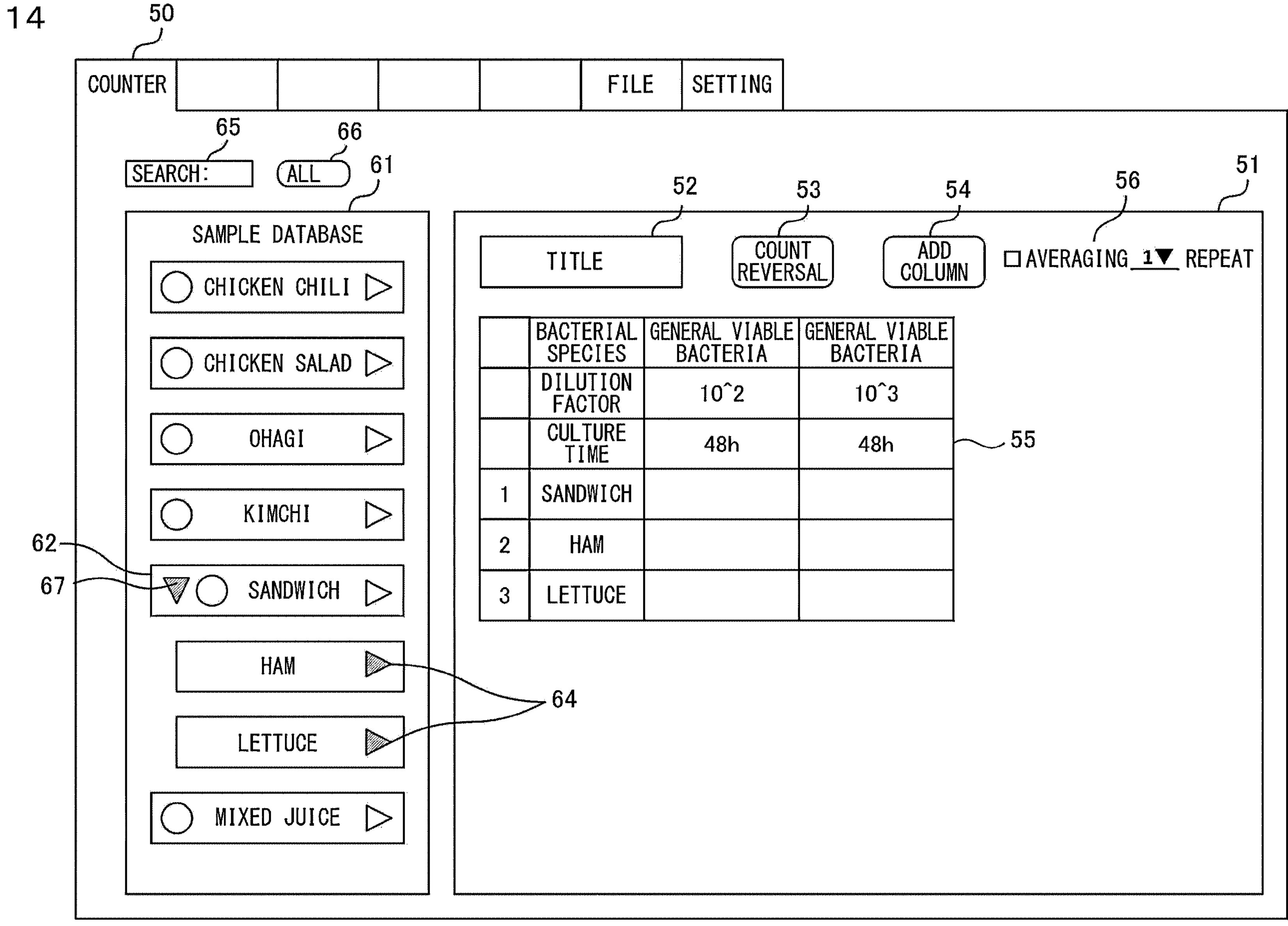
FIG. 14 is a view for describing a UI related to the parent-child relationship.

FIG. 13 illustrates an example of a parent-child relationship among a plurality of samples. In this example, when the indicator 63 of the sandwich is pressed, the MCU 30 selectively displays "ham" and "lettuce", which are ingredients having the parent-child relationship with the sandwich, in the DB display area 61. In this state, when the button 64 of "ham" or "lettuce" is pressed, the MCU 30 reads a test item of "ham" or "lettuce" from the storage device 35 and adds the test item to the count table 55. FIG. 14 illustrates that the respective test items "ham" and "lettuce" are read from the storage device 35 and added to the count table 55. The sandwich, the ham, and the lettuce having the parent-child relationship may be collectively registered. For example, when the button 64 associated with the sandwich is pressed, the sandwich, the ham, and the lettuce may be collectively registered in the count table 55.

Figure 15:
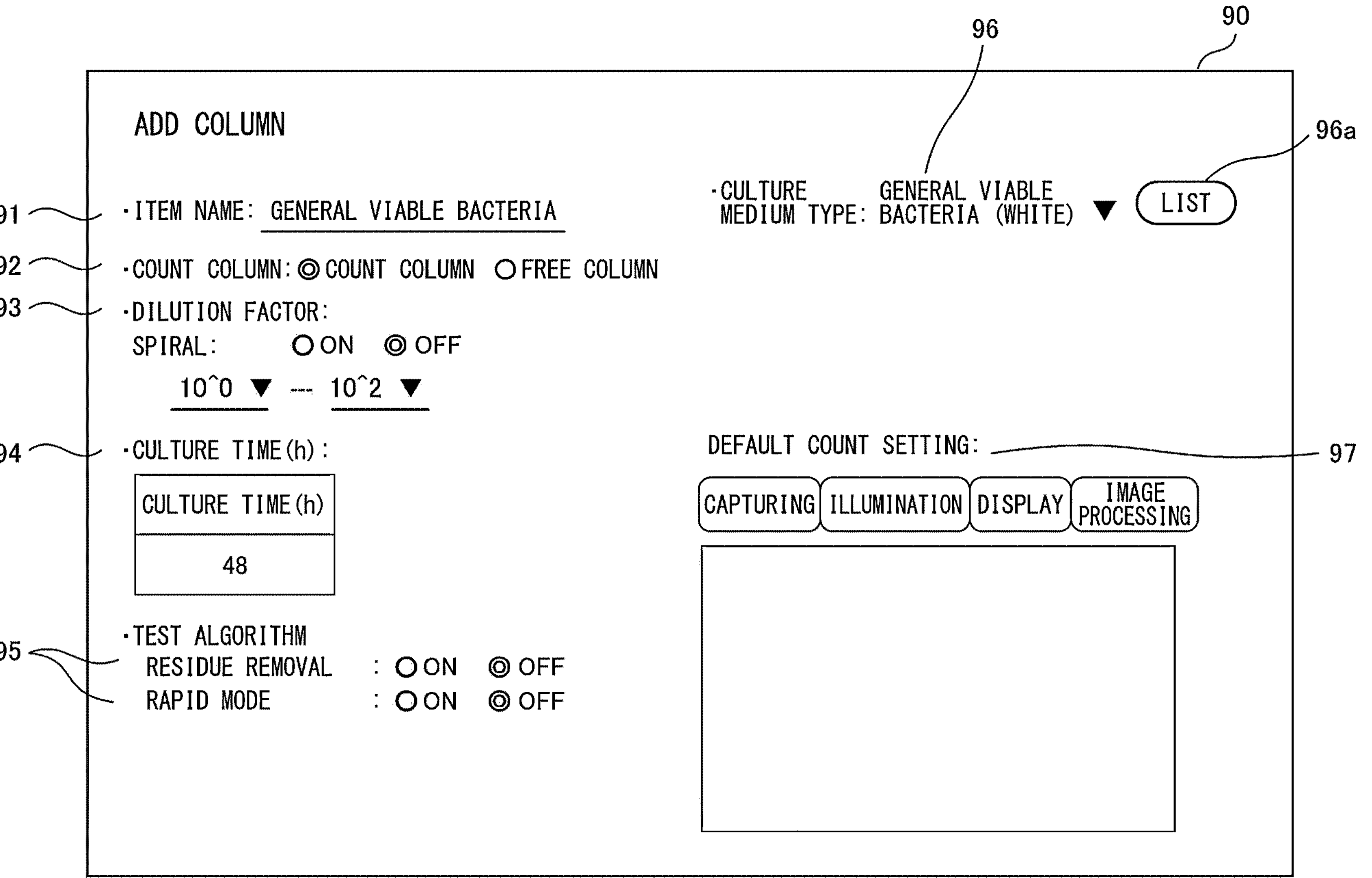
FIG. 15 is a view for describing a UI for adding a column element.

FIG. 15 illustrates a dialog 90 for adding a column. When the button 54 provided on the UI 50 is pressed, the MCU 30 displays the dialog 90 on the display device 37. The item name setting section 91 receives an input of a name of a bacterial species which is an item name of a column. A column type setting section 92 receives a setting as to whether or not a column type is a count column or a free column. The count column is a column including a cell to which a count value is input. The free column is a column in which the user can freely input text, an image, and other information such as a remark and a comment. A dilution factor setting section 93 receives an input of a dilution factor. A culture time setting section 94 receives an input of a culture time. An algorithm setting section 95 receives a setting of image processing to be applied to a test image. Residue removal is a mode in which residues (for example, dirt, stain, and handwriting) attached to the Petri dish 15 or the like are reduced by image processing. A rapid mode is a mode in which rapid result confirmation is emphasized, and is a mode in which the Petri dish 15 cultured in a culture time shorter than that in the related art is tested with higher sensitivity. A culture medium type setting section 96 receives selection of a culture medium type (for example, general viable bacteria (white) or a general viable bacteria (black)) and the like. Note that, when a list button 96*a* is pressed, the MCU 30 may read culture medium type candidates from the storage device 35 to create a list, and display the list on the display device 37. A count setting section 97 receives a setting of a capturing condition (for example, exposure time) of the main camera 11, a type of illumination (for example, brightness and an illumination device), a type of display processing, a type of image processing, and the like. That is, the bacterial species, the dilution factor, the culture time, the algorithm setting, the culture medium type, or the count setting that has been received in the dialog 90 are set for each column as default settings.

[Count Processing]

Figure 16:
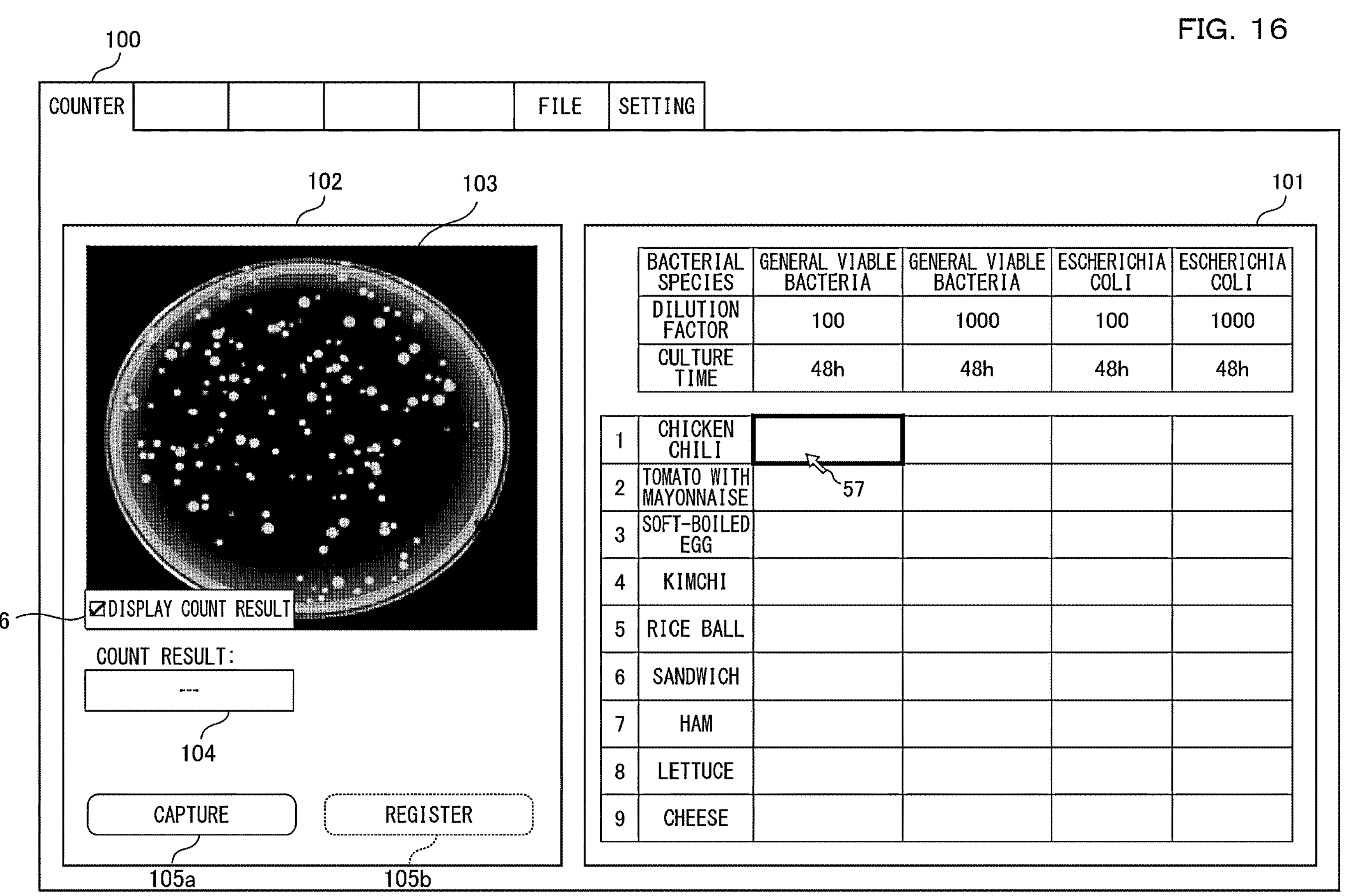
FIG. 16 is a view for describing a UI during a test.

FIG. 16 illustrates a UI 100 displayed on the display device 37 of the PC 1*b* during execution of count processing by controlling the head device 1*a* from the PC 1*b*. A count table area 101 is an area for displaying the count table 55 edited through the UI 50. The result area 102 is an area for displaying a test image 103 acquired by the main camera 11 of the head device 1*a*. Note that the test image 103 may be a moving image or a still image. In general, the MCU 30 acquires a moving image by the main camera 11 and displays the moving image in the result area 102 when adjustment of the exposure time of the main camera 11, the brightness adjustment of each of the ring illumination devices 12 and 13 and the coaxial illumination device 14, selection of light emitting elements to be turned on, selection of the image processing, and the like are executed. On the other hand, the MCU 30 acquires a still image by the main camera 11 and displays the acquired still image in the result area 102 when the count processing is executed.

A check box 106 is a control object for selecting whether or not to display a count result in the count value area 104. A first software button 105*a* is a button having the same function as the first hardware button 8*a*. A second software button 105*b* is a button having the same function as the second hardware button 8*b*. In this example, a capturing instruction (capture button) is assigned to the first software button 105*a*. A registration instruction (register button) is assigned to the second software button 105*b*. In FIG. 15, the second software button 105*b* is indicated by a broken line, which means being inoperable.

A user clicks and selects a cell corresponding to the Petri dish 15 set on the stage 5 among a plurality of cells included in a count table displayed in the count table area 101 with the pointer 57. As illustrated in FIG. 16, the cell selected by the pointer 57 may be displayed in an emphasized manner such that any cell that has been selected by the user can be recognized. Each cell is stored in the storage device 35 in association with a test condition (sensitivity when binarizing a colony, an illumination device type, brightness, and the like) in advance. The MCU 30 reads the test condition associated with the selected cell from the storage device 35 and transmits the test condition to the head device 1*a*. The MCU 20 of the head device 1*a* controls the main camera 11, the ring illumination devices 12 and 13, and the coaxial illumination device 14 according to the received test condition, acquires an image, and transmits the image to the PC 1*b*. Note that, when another cell is selected, the MCU 30 reads a test condition associated with the selected cell from the storage device 35 and transmits the test condition to the head device 1*a*. The MCU 20 of the head device 1*a* controls the main camera 11, the ring illumination devices 12 and 13, and the coaxial illumination device 14 according to the received test condition, acquires an image, and transmits the image to the PC 1*b*. In this manner, the user can change the test condition by selecting the cell.

Figure 17:
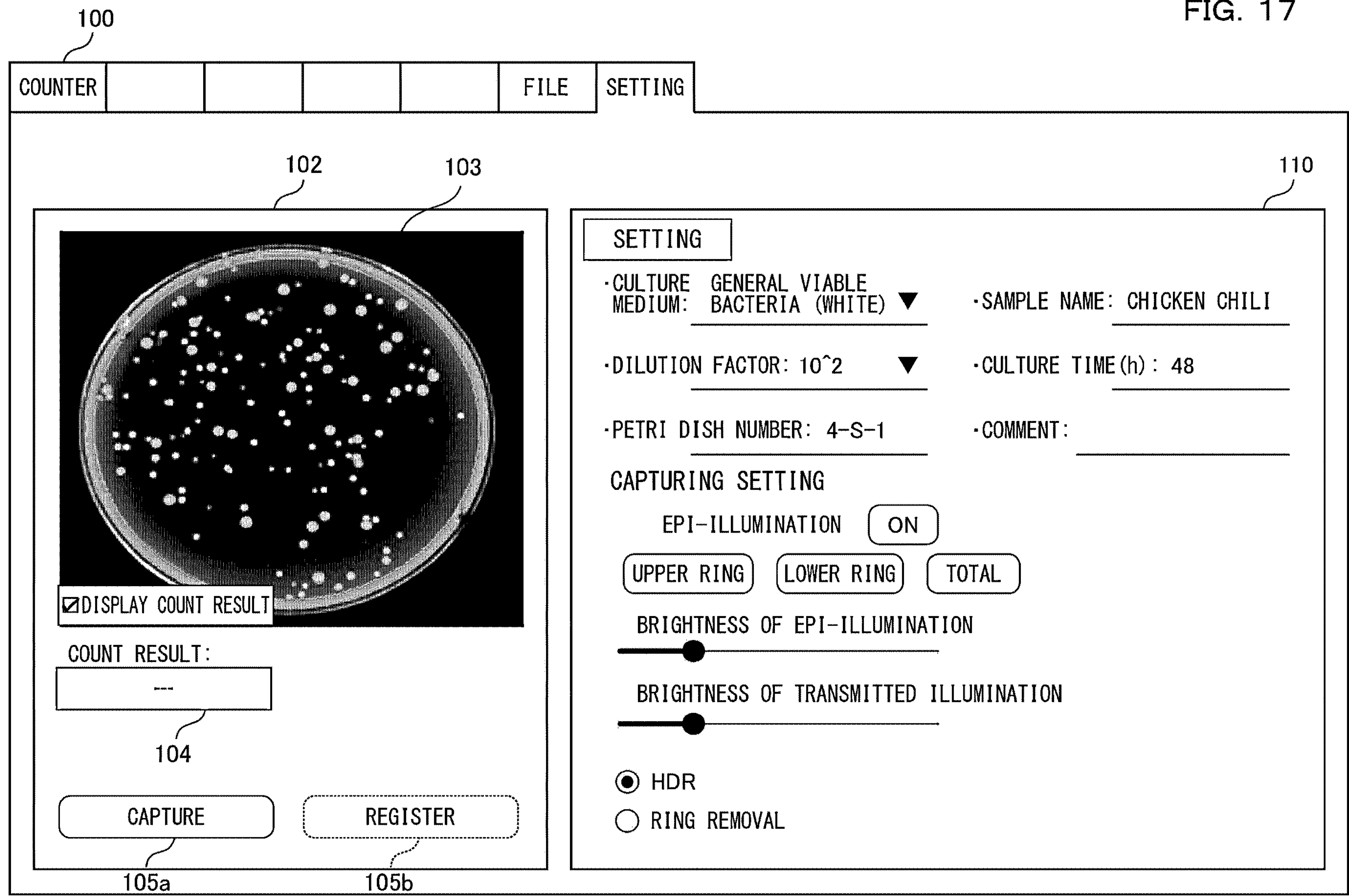

FIG. 17 illustrates a confirmation screen 110 for a test condition displayed by clicking a setting tab or a setting button on the pointer 57. As a result, the user can confirm the test condition for each cell. Note that the confirmation screen 110 may be displayed by right clicking a cell with the pointer 57. Examples of information displayed on the confirmation screen 110 include a sample name, a type of a culture medium, a dilution factor, a culture time, a Petri dish number, a comment, capturing settings (on/off of epi-illumination, an illumination device type, brightness of epi-illumination, brightness of transmitted illumination, image processing (count settings such as on/off of high dynamic range "HDR" and on/off of ring removal), and the like. In FIG. 17, "Upper ring" is an abbreviation for the ring illumination device 12. "Lower ring" is an abbreviation for the ring illumination device 13. "Total" is an abbreviation for the coaxial illumination device 14. Here, the MCU 30 sets default values on a column-basis on the dialog 90 illustrated in FIG. 15 for a bacterial species, the dilution factor, the culture time, an algorithm setting, the type of the culture medium, or the capturing settings (count settings), but may individually set a default value for each cell on the confirmation screen 110 of FIG. 17.

Note that the confirmation screen 110 displaying a list of settings corresponding to a cell may be displayed to be superimposed on the UI 100 by receiving a specific input such as a double click on the cell. Further, when a cell is selected by the pointer 57, the MCU 30 may display settings corresponding to the cell on the UI 100.

FIG. 18 illustrates the UI 100 displayed on the display device 37 by the MCU 30 when the first software button 105*a* or the first hardware button 8*a*, which is the capture button, is pressed. The image 103 (still image) of the Petri dish 15 is displayed in the result area 102. The MCU 30 assigns the first software button 105*a* from the capture button to a button (count button) for instructing a count.

Figure 19:
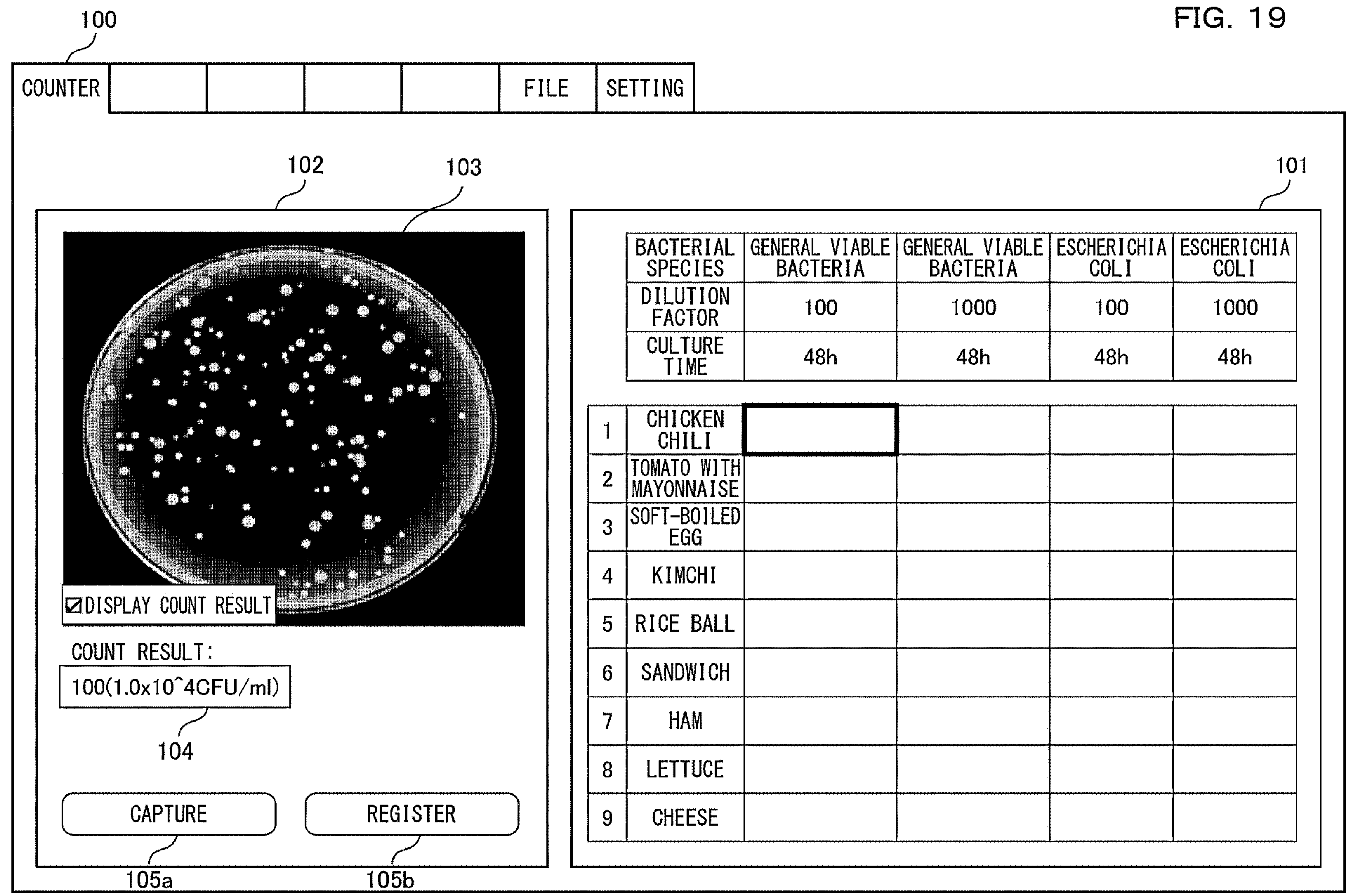
FIG. 19 is a view illustrating a UI at the time of registering a count result in a cell.

FIG. 19 illustrates the UI 100 displayed on the display device 37 by the MCU 30 when the first software button 105*a* or the first hardware button 8*a*, which is the count button, is pressed. When the count button is pressed, the MCU 30 instructs the head device 1*a* to count colonies. The MCU 20 of the head device 1*a* counts colonies in response to a count instruction and transmits a count value to the PC 1*b*. Note that the count processing may be executed by the MCU 30. The MCU 30 displays the count value in the count value area 104. At this time, the MCU 30 may convert the count value into CFU/mL (the number of colonies per section volume (milliliter)) and display CFU/mL in the count value area 104. For example, every time the count value area 104 is clicked with the pointer 57, the MCU 30 may switch display in order of only the count value, only CFU/mL, and the count value+CFU/mL. Note that CFU is an abbreviation for colony forming unit. Further, when the count value is acquired, the MCU 30 re-assigns the first software button 105*a* from the count button to the capture button. Moreover, the MCU 30 changes the second software button 105*b* and the second hardware button 8*b* assigned to the register button from an inoperable state to an operable state.

FIG. 20 illustrates a state in which the register button is pressed. The MCU 30 may write a count value to a currently selected cell and change the next cell to a state of being selected (cell of interest). In this example, the cell of interest (active cell) is changed from the cell of the first row to the cell of the second row. In this manner, the MCU 30 automatically selects the next cell, whereby burden on the user is mitigated. Note that the MCU 30 returns the second software button 105*b* and the second hardware button 8*b*, assigned to the register button, from the operable state to the inoperable state.

The UI 100 illustrated in FIG. 20 includes a cell display target change menu 109. In FIG. 20, "100" is displayed in a cell since "Count number" is selected in the change menu 109.

Figure 21:
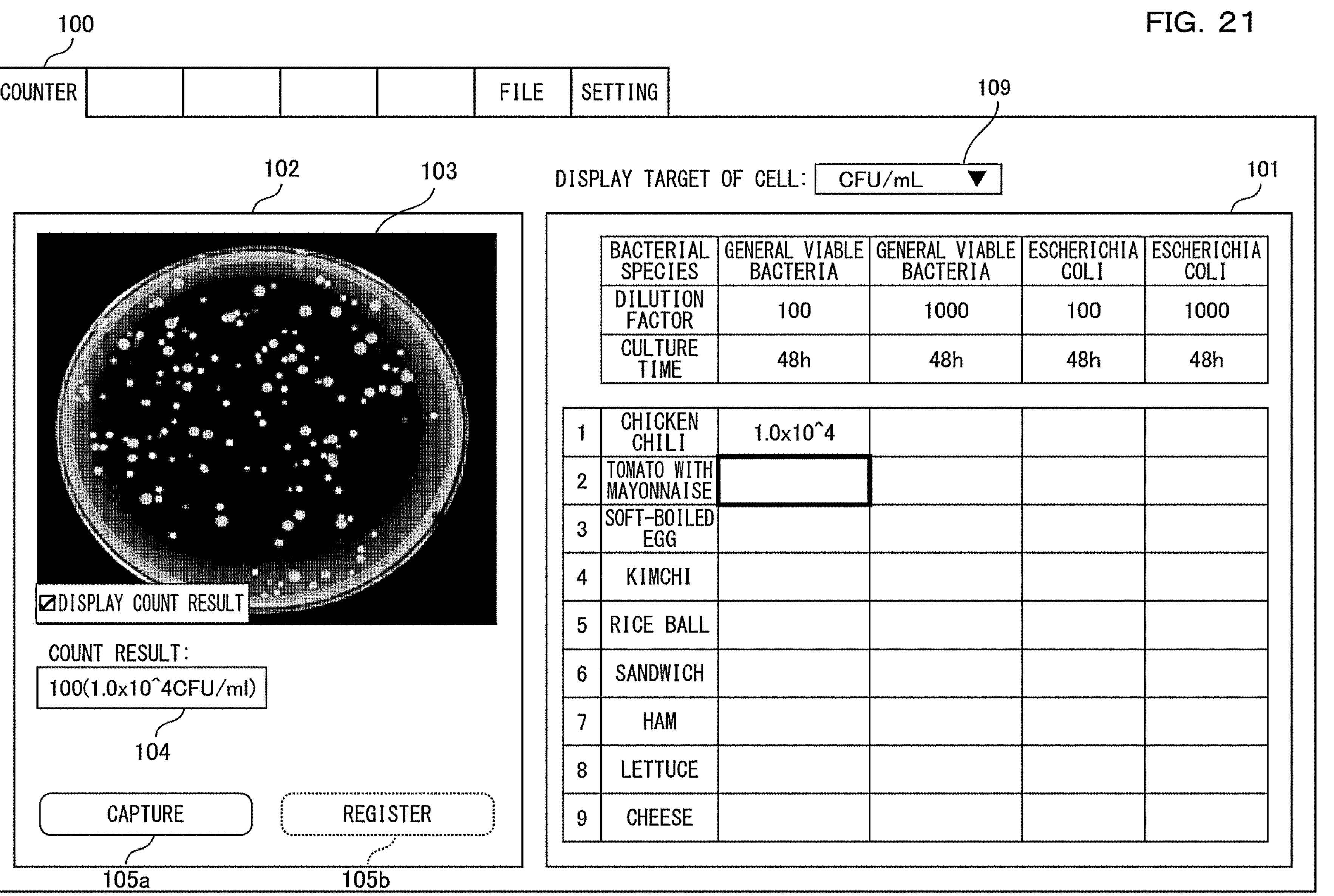
FIG. 21 is a view for describing a UI for switching a unit of a count result.

As illustrated in FIG. 21, when the user selects "CFU/mL" in the change menu 109, the MCU 30 changes a display target of the cell from "Count number" to "CFU/mL". As a result, the user can easily switch the display target of the cell.

As illustrated in FIG. 22, when the user selects "Comment" in change menu 109, the MCU 30 changes the display target of the cell to "Comment". As a result, the user can easily switch the display target of the cell to the comment. Further, in the UI 100, the user can also directly input a comment such as "Contamination occurs" as illustrated in FIG. 22. Here, the comment is a remark or the like included in one row of the count table.

Figure 23:
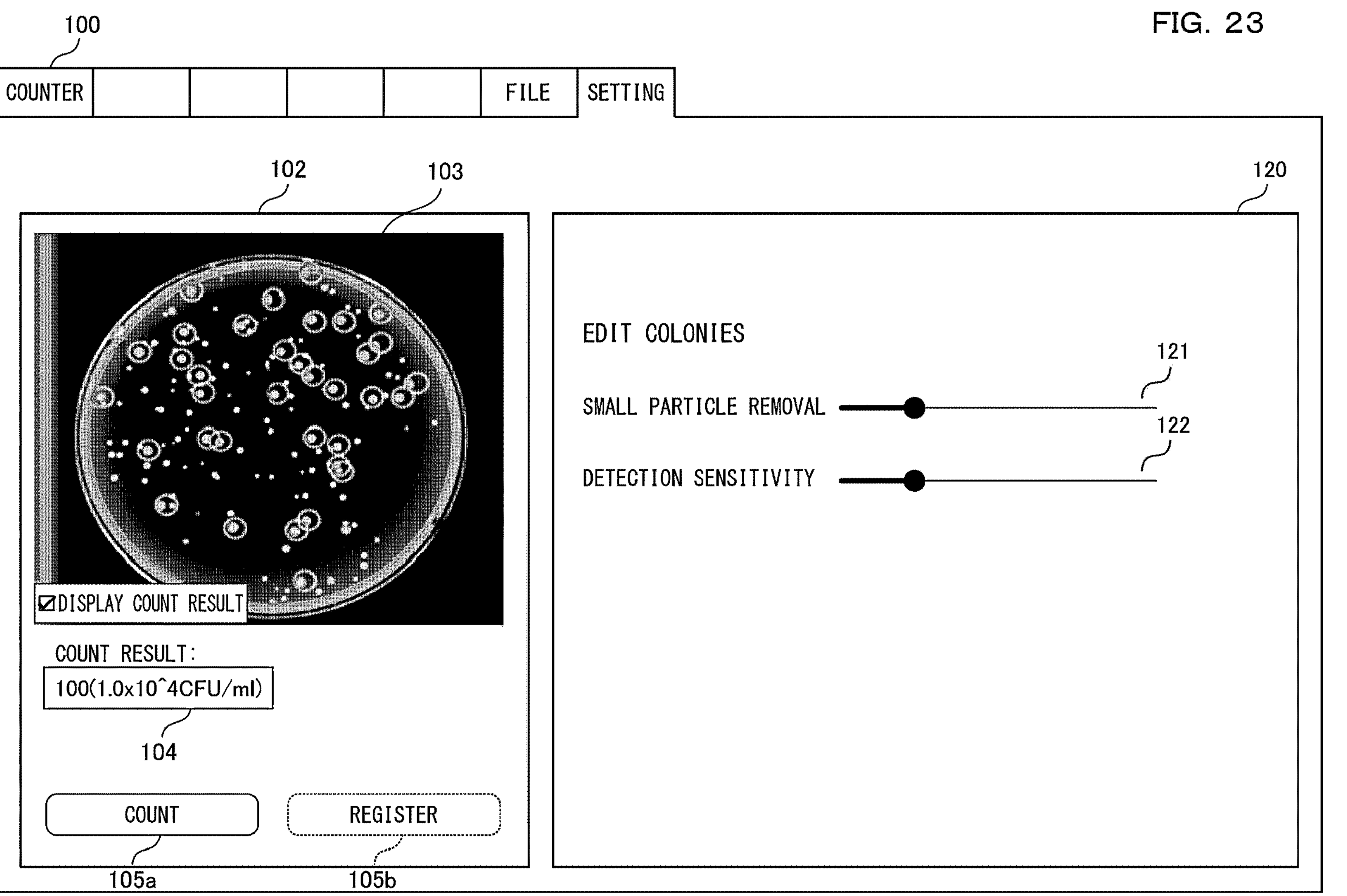
FIG. 23 is a view for describing a UI for re-setting a counting condition.

FIG. 23 illustrates the UI 100 displayed on the display device 37 by the MCU 30 when a cell to which a count value has been input is double-clicked. A setting screen 120 includes a control object for adjusting a parameter related to a colony detection algorithm out of a test condition associated with the cell selected by the double click. A slide bar 121 is, for example, a control object for setting a threshold to remove small particles by image processing. A slide bar 122 is a control object for adjusting colony detection sensitivity.

The MCU 30 may displays a mark such as a circle to be superimposed on a portion detected as a colony in the image 103 displayed in the result area 102. Since the MCU 30 changes an algorithm according to the adjustment of each of the slide bars 121 and 122, positions and the number of the marks indicating the colonies also change. As a result, the user can easily find an appropriate adjustment amount.

[Assignment of Button]

FIG. 24 illustrates an example of functions assigned to the first hardware button 8*a* (first software button 105*a*) and the second hardware button 8*b* (second software button 105*b*).

When a state of the count table is a state in which "Count table is displayed", the image 103 is a moving image, and a state of the active cell indicates that no count value has been input, the count button is assigned to the first hardware button 8*a* (first software button 105*a*), and the register button (inoperable) is assigned to the second hardware button 8*b* (second software button 105*b*).

When a state of the count table is the state in which "Count table is displayed", the image 103 is a moving image, and a state of the active cell indicates that a count value has been input, the count button is assigned to the first hardware button 8*a* (first software button 105*a*), and the register button (inoperable) is assigned to the second hardware button 8*b* (second software button 105*b*).

When a state of the count table is the state in which "Count table is displayed", the image 103 is a still image, and a state of the active cell indicates that no count value has been input, the capture button is assigned to the first hardware button 8*a* (first software button 105*a*), and the register button (operable) is assigned to the second hardware button 8*b* (second software button 105*b*). Note that the capture button may be referred to as a re-capture button.

When a state of the count table is the state in which "Count table is displayed", the image 103 is a still image, and a state of the active cell indicates that a count value has been input, the capture button is assigned to the first hardware button 8*a* (first software button 105*a*), and the register button (inoperable) is assigned to the second hardware button 8*b* (second software button 105*b*).

When a state of the count table is a state in which "Count table is not displayed", the image 103 is a moving image, and a state of the active cell indicates that no count value has been input, the count button is assigned to the first hardware button 8*a* (first software button 105*a*), and the register button (inoperable) is assigned to the second hardware button 8*b* (second software button 105*b*).

When a state of the count table is the state in which "Count table is not displayed", the image 103 is a moving image, and a state of the active cell indicates that a count value has been input, the count button is assigned to the first hardware button 8*a* (first software button 105*a*), and the register button (inoperable) is assigned to the second hardware button 8*b* (second software button 105*b*).

When a state of the count table is the state in which "Count table is not displayed", the image 103 is a still image, and a state of the active cell indicates that no count value has been input, the capture button is assigned to the first hardware button 8*a* (first software button 105*a*), and the register button (operable) is assigned to the second hardware button 8*b* (second software button 105*b*).

When a state of the count table is the state in which "Count table is not displayed", the image 103 is a still image, and a state of the active cell indicates that a count value has been input, the capture button is assigned to the first hardware button 8*a* (first software button 105*a*), and the re-register button (operable) is assigned to the second hardware button 8*b* (second software button 105*b*).

As illustrated in FIGS. 17 and 23, when a state of the count table is in the state in which "Count table is not displayed", a UI that enables a change in a test condition is displayed instead of the count table. Therefore, the count value also changes when the test condition is changed, the MCU 30 inquires of a user whether or not to write (re-register) the changed count value to the active cell.

Figure 25:
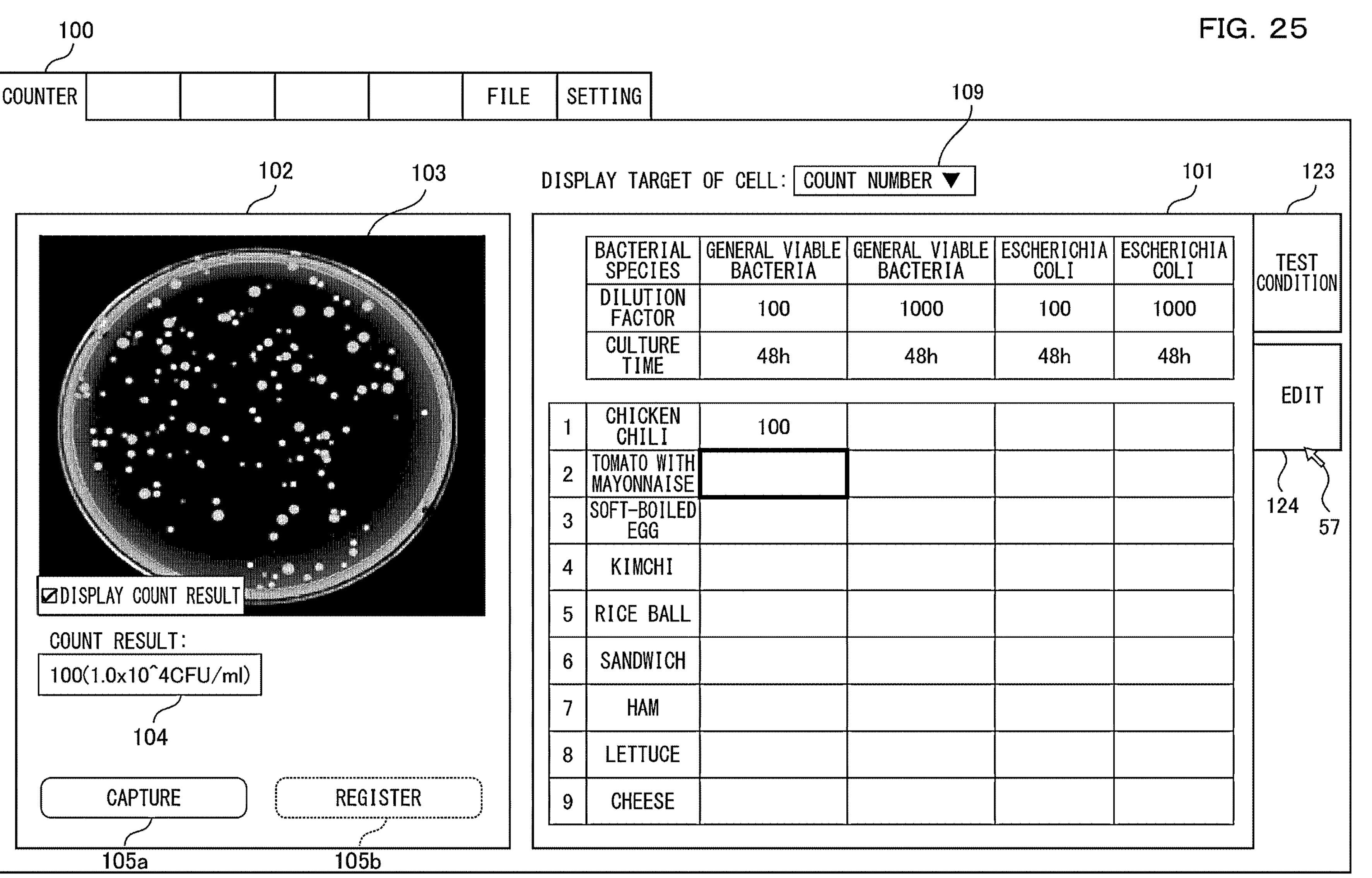

The state in which "Count table is not displayed" may be a state in which a count table to which a count result has been input is displayed and the count result can be re-edited. FIG. 25 illustrates the UI 100 with an edit tab 124 for re-editing. The state in which "Count table is not displayed" displayed in FIG. 24 may be a state in which a count table to which a count result has been input is displayed and the edit tab 124 has been clicked. In FIG. 25, a test condition tab 123 is a tab for displaying the confirmation screen 110 for a test condition illustrated in FIG. 17. As described above, the settings of the illumination and the main camera 11 can be changed on the confirmation screen 110.

When the count button is pressed while a moving image is being displayed in the result area 102 in this manner, the moving image is changed to a still image, the count result is displayed, and the register button is operable. When the register button is pressed while the still image is being displayed, the count result is written to the active cell, and the result area 102 returns to the state of displaying the moving image. When the count result that has been registered once is changed and the re-register button is pressed, the changed count result is overwritten on the count table, and the result area 102 returns to the state of displaying the moving image. When the capture button (re-capture button) is pressed while the result area 102 is displaying the still image, the result area 102 returns to the state of displaying the moving image.

[Method for Identifying Count Table]

A user views a count table when culturing bacteria or counting colonies on the Petri dish 15. Here, there is a case where the date on which the count table has been created is different from the date on which preparation work and count work are executed while visually observing the count table. In this case, the user needs to read a desired count table from the storage device 35 and display the count table on the display device 37.

Figure 26:
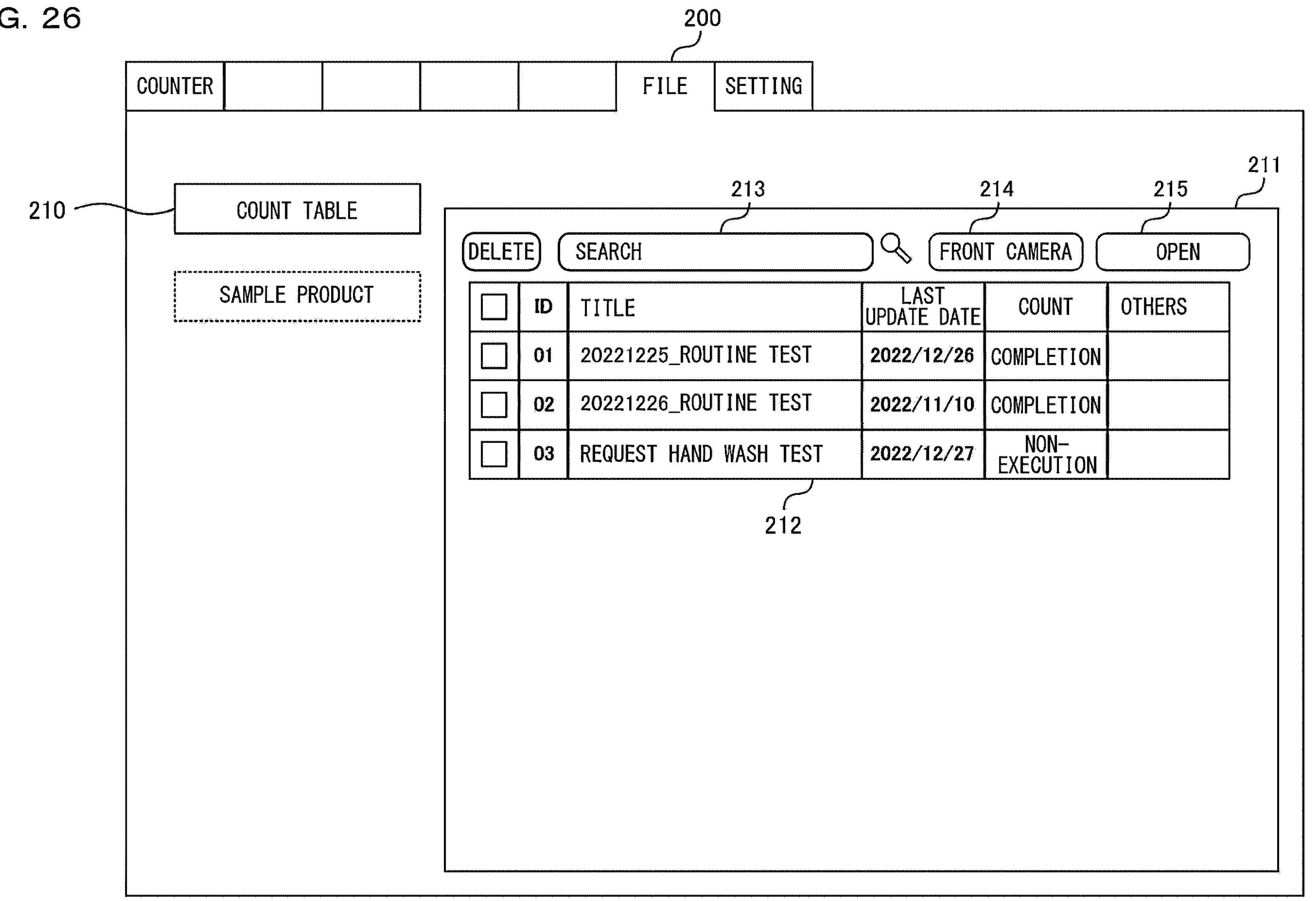
FIG. 26 is a view for describing a UI for calling a count table created in the past.

FIG. 26 illustrates a file UI 200 for calling a file such as a count table. A button 210 is a button for designating a count table as a calling target. A file list 211 is an area for displaying files stored in the storage device 35 as a list 212. When the button 210 is pressed, the MCU 30 displays only files having extensions specific to the count table among the plurality of files in the file list 211. The list 212 includes an ID (serial number), a title, a last update date, whether or not a count has been completed, and other information.

The search box 213 is a box to which a keyword for further searching for a desired file from the plurality of files included in the list 212 is input. A button 214 is a button for instructing activation of the front camera 10 in order to read an identification image given to a test list created by printing the count table on paper. An open button 215 is a button for instructing to open the count table selected from the list 212.

FIG. 27 illustrates a test list 220. The MCU 30 may output the test list 220 from the printer 38 or may output the test list to a display device of the terminal device 1*c*. The test list 220 is a list created from the corresponding count table 55. The order in which pieces of information are arrayed in the count table 55 and the order in which pieces of information are arrayed in the test list 220 may be different from each other or may coincide with each other. The test list 220 may be the same as the count table 55 displayed on the display device 37. Further, it is unnecessary to write a count result in the test list 220, and thus, a cell for writing the count result may be omitted. Moreover, in a case where the user uses the test list 220 for preparation of a culture sample, a culture time is not necessarily required. Therefore, a cell for the culture time may be omitted. In the test list 220, an identification image 221 such as a one-dimensional symbol or a two-dimensional symbol may be given as identification information for identifying each count table. The identification image 221 may include identification information of the user.

When the button 214 illustrated in FIG. 26 is pressed, the MCU 30 instructs the head device 1*a* to activate the front camera 10. The MCU 20 of the head device 1*a* activates the front camera 10 and attempts to read the identification image 221. The identification image 221 may be simply referred to as a symbol. At this time, the user aligns a position of the test list 220 with the front camera 10 such that the front camera 10 reads the identification image 221. When the MCU successfully reads identification image 221, the MCU 20 decodes the identification information from the identification image 221, and transmits the decoded identification information to the PC 1*b*. The MCU 30 reads a count table associated with the identification information received from the head device 1*a* from the storage device 35.

Figure 28:
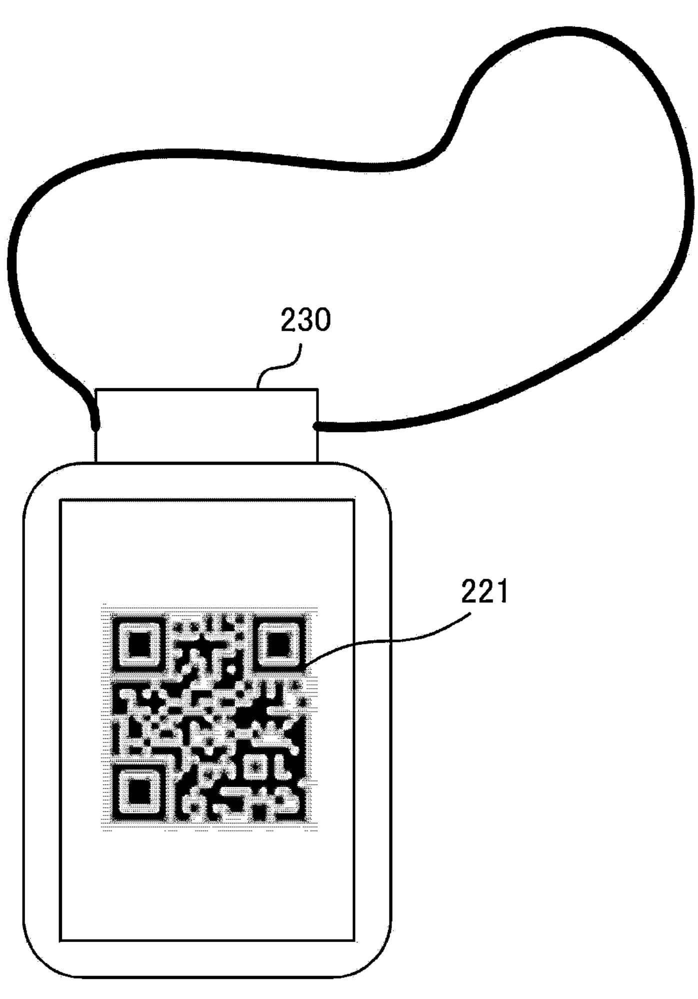
FIG. 28 is a view illustrating a user authentication tag.

FIG. 28 illustrates a user authentication tag 230 worn by users. Due to data integrity rules, various restrictions are sometimes imposed on the users who use the head device 1*a*. For example, according to 21 CFR Part 11, which is a U.S. Food and Drug Administration (FDA) rule, users are required to be physically and logically managed. For example, the user authentication tag 230 may be used to limit available functions of the head device 1*a* and the PC 1*b* for each user. The MCU 20 or the MCU 30 may execute user authentication by causing the front camera 10 to read the identification image 221 of the user authentication tag 230. That is, the identification image 221 may include a symbol indicating account information such as a user name and a password. However, the user name and the password are encrypted, and then included the identification image 221.

As the restriction of functions for each user, the following is conceivable. As an example, the users are classified into an administrator, a leader, and an worker. The administrator can add a user and set authority of each of the users. The leader can create a count table, execute a count, store a count result, edit the count result, and output (print or transmit) the count result. The worker can execute a count and store a count result. The MCU 20 and the MCU 30 may restrict functions that can be executed by a user according to the authority of the user identified from the identification image 221.

Although the identification image 221 is read by the front camera 10 here, the identification image 221 may be read by the main camera 11.

Figure 41:
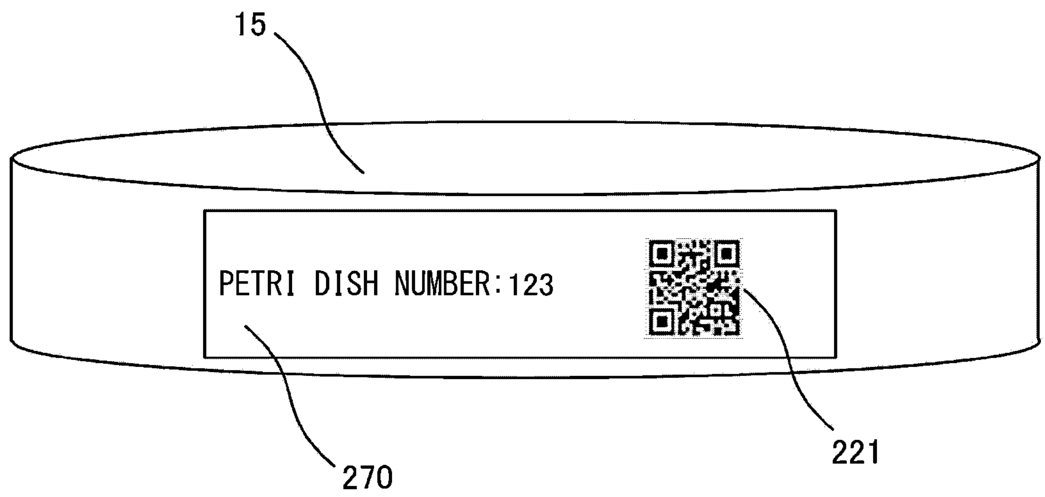
FIG. 41 is a view for describing an identification image given to a Petri dish.

As illustrated in FIG. 41, the front camera 10 and the main camera 11 may capture and read an image of a Petri dish number or the identification image 221 printed on a seal 270 attached to the Petri dish 15. In the identification image 221, identification information of the count table 55, a sample name, unique identification information indicating a cell in which a count result is stored, and the like may be encoded. That is, by reading the identification image 221, the MCU 30 can identify the count table 55, the sample name, the Petri dish 15, and a test condition. Moreover, the MCU 30 transmits the identified test condition to the head device 1*a*, and the MCU 20 of the head device 1*a* can control the main camera 11, the ring illumination devices 12 and 13, and the coaxial illumination device 14 according to the received test condition to acquire an image.

[Another Application Example of Front Camera]

(1) Text Input to Cell

Figure 29:
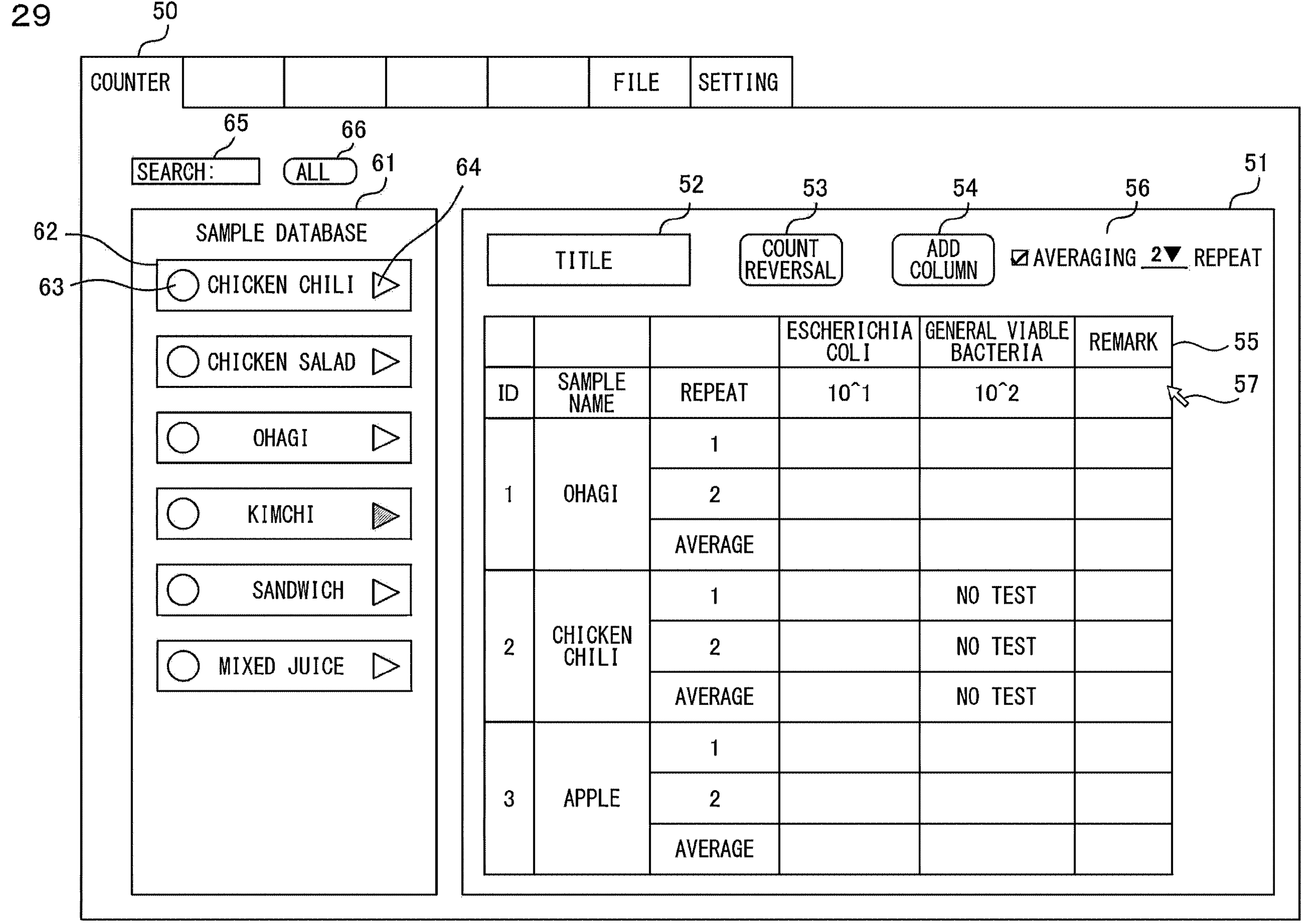
FIG. 29 is a view for describing a UI for registering information in a cell of a free column.

FIG. 29 illustrates the count table 55 in which a new column used as a remark has been added by pressing the button 54. The new column is defined as a free column, and can hold not only characters and numbers but also images and the like.

Figure 30:
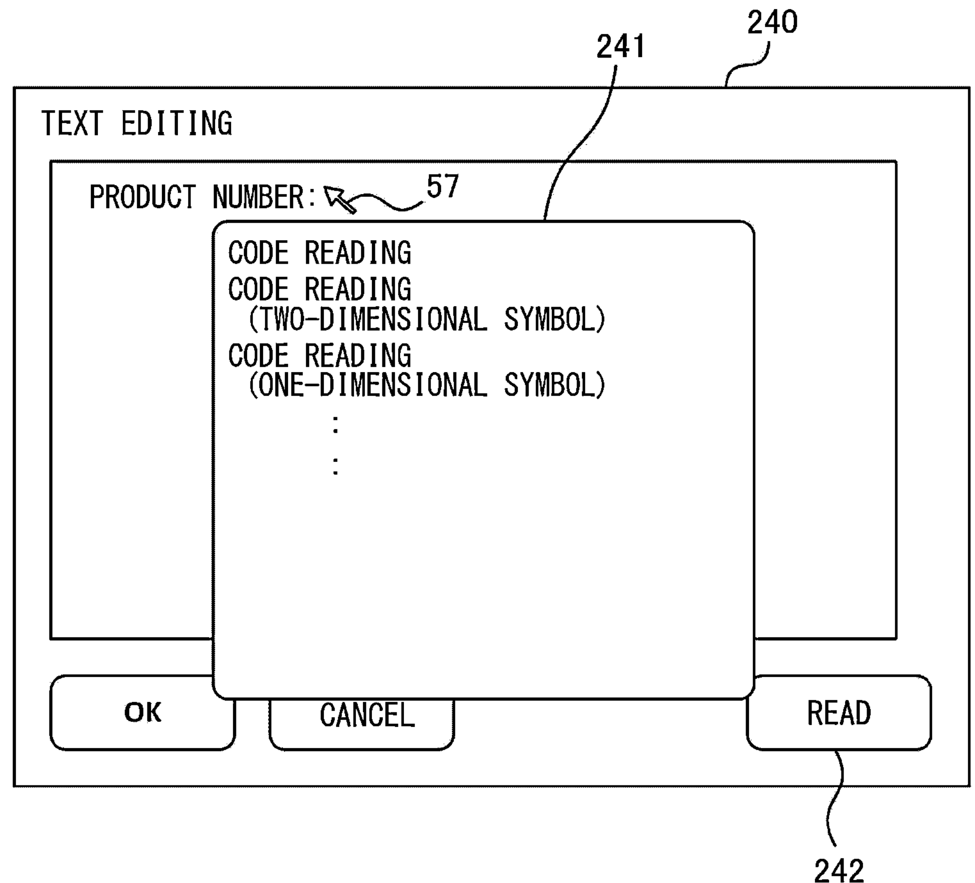
FIG. 30 is a view for describing a UI for registering information in a cell of a free column.

FIG. 30 illustrates an editing screen 240 displayed when a cell in the free column is right-clicked with the pointer 57. In this example, text "Product number:" for the cell has been input, and a dialog 241 for inputting the following text is displayed. The dialog 241 is displayed by right-clicking the inside of a text box of the editing screen 240 with the pointer 57. The dialog 241 includes a plurality of options for reading a code from a product or the like by using the front camera 10 and inputting a read result to the cell. In this example, the options include code reading by the front camera 10. For example, when "Code reading (one-dimensional symbol)" is selected by the pointer 57 and a read button 242 is pressed, the MCU 30 instructs the head device 1*a* to read a one-dimensional symbol.

Figure 31:
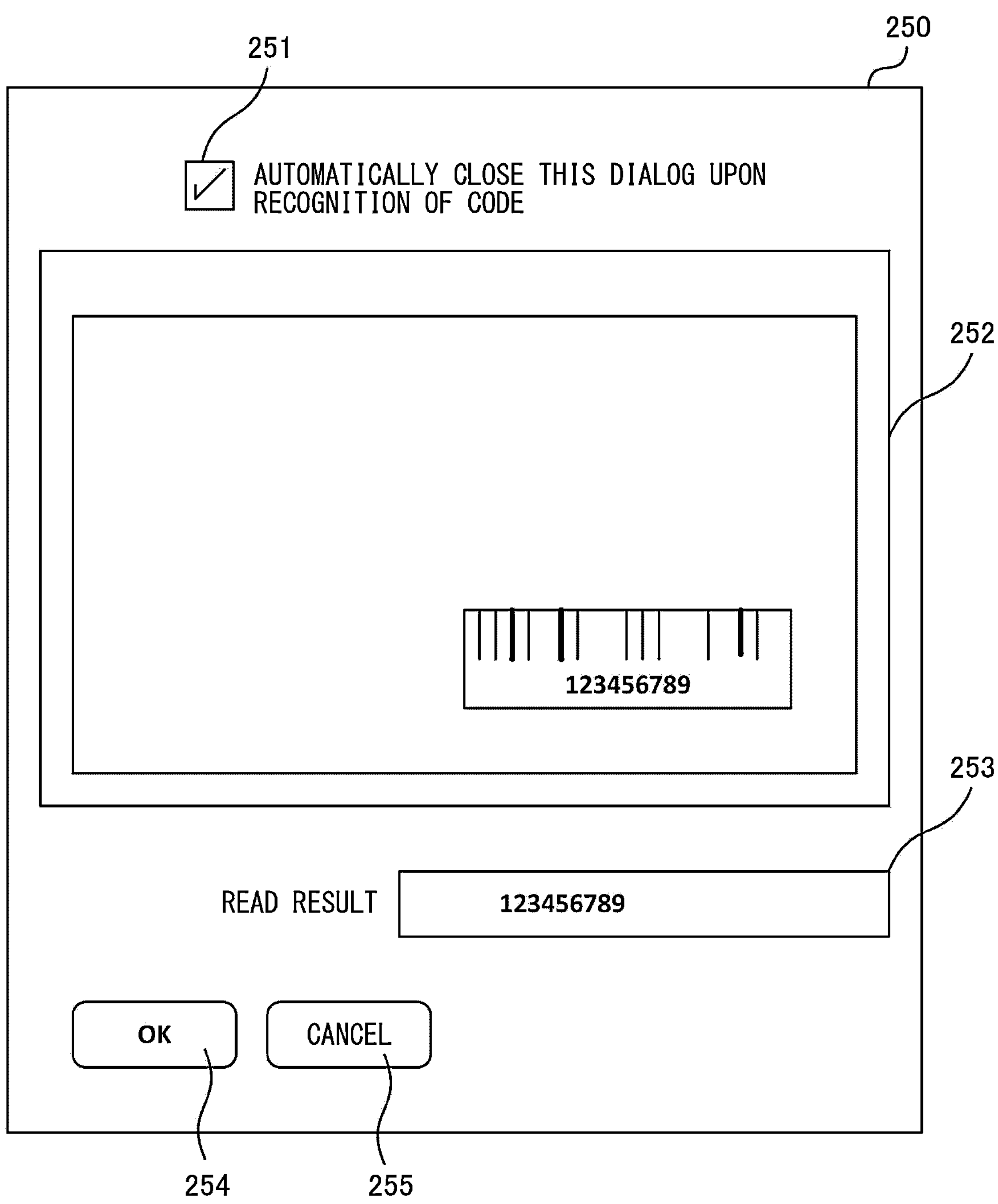
FIG. 31 is a view for describing a UI for reading of a code (symbol)

FIG. 31 illustrates a reading screen 250 displayed on the display device 37 when the read button 242 is pressed. A check box 251 is a check box for instructing that the MCU 20 automatically closes the reading screen 250 when the MCU 30 successfully recognizes a code. An image area 252 displays a moving image or a still image acquired by the front camera 10. A read result area 253 is an area for displaying text decoded from a one-dimensional symbol or a two-dimensional symbol.

The MCU 20 of the head device 1*a* activates the front camera 10, reads a one-dimensional code, decodes text from the one-dimensional code, and transmits the decoded text to the PC 1*b*. The user confirms the text displayed in the read result area 253, and presses an OK button 254 or a cancel button 255. When the OK button 254 is pressed, the MCU 30 closes the reading screen 250, returns to the editing screen 240, and inserts the text received from the head device 1*a* into the cell. When the cancel button 255 is pressed, the text received from the head device 1*a* is discarded, the reading screen 250 is closed to return to the editing screen 240.

Figures 32, 33:
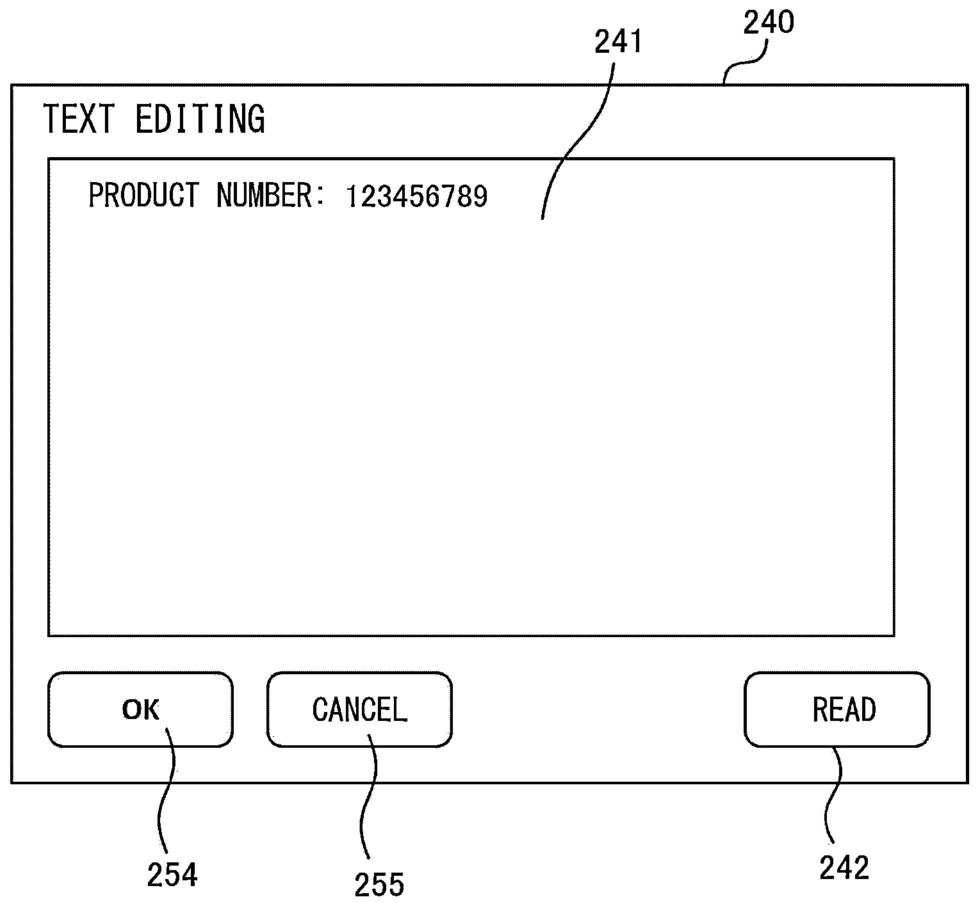
FIG. 32 is a view for describing a symbol decoding result.
FIG. 33 is a view for describing a report.

FIG. 32 illustrates the editing screen 240 into which text has been inserted. Here, when the OK button 254 is pressed, the MCU 30 closes the editing screen 240 and displays the UI 50 illustrated in FIG. 29 on the display device 37.

(2) Image Input to Cell

FIG. 33 illustrates an example of a count report 260 created from a part of the count table or the count table. Image data can be associated with cells of the free column included in the count table 55. The MCU 30 controls the main camera 11 of the head device 1*a* to acquire an image (Petri dish image) of the Petri dish 15, and associates the acquired Petri dish image with a cell. Alternatively, the MCU 30 may control the front camera 10 of the head device 1*a* to acquire an image (Petri dish image) of the Petri dish 15, and associate the acquired Petri dish image with a cell. Similarly, the MCU 30 may control the front camera 10 of the head device 1*a* to acquire an external appearance image of a product, and associate the acquired external appearance image with a cell. Moreover, the MCU 30 may control the front camera 10 of the head device 1*a* to read and decode a barcode given to the product, and input the decoded product number and the like to cells. The MCU 30 may control the printer 38 to print the count report 260 on paper.

Although various images are acquired by the front camera 10 here, various images may be acquired by the main camera 11 and associated with cells.

[Flowchart]

(1) Main Processing of PC 1*b*

FIG. 34 is a flowchart illustrating a series of processes executed by the MCU 30 of the PC 1*b*. The MCU 30 executes the following processing according to the count application program stored in the storage device 35.

In S1, the MCU 30 executes editing of a count table. As described with reference to FIGS. 5 to 15 and the like, the count table is edited or created through the UI 50 and the like.

In S2, the MCU 30 stores the count table in the storage device 35.

In S3, the MCU 30 identifies the count table. The count table may be identified by using the front camera 10 and the test list 220 or the user authentication tag 230, or may be identified by using the file UI 200 illustrated in FIG. 26.

In S4, the MCU 30 reads the identified count table from the storage device 35. As a result, the UI 100 illustrated in FIG. 16 is displayed on the display device 37.

In S5, the MCU 30 identifies a cell to which a count value is to be written. First, a cell in the uppermost row in the count table may be selected, or a cell clicked by the pointer 57 may be selected.

In S6, the MCU 30 identifies a test condition associated with the active cell. For example, the MCU 30 reads the test condition associated with each cell from the storage device 35 when the count table has been created.

In S7, the MCU 30 sets the test condition associated with the active cell in the head device 1*a*. As described above, the sensitivity of the main camera 11, an illumination device to be turned on, brightness, the number of light emitting elements to be turned on (irradiation direction), image processing (HDR or ring removal), a count algorithm (a parameter such as a threshold), and the like are transmitted to the head device 1*a*.

In S8, the MCU 30 determines whether or not the test condition has been changed. As described above, the test condition associated with the cell can be changed at any time even during a test. Therefore, when the test condition is changed, the MCU 30 returns to S7 and transmits the changed test condition to the head device 1*a*. When the test condition is not changed, the MCU 30 proceeds to S9.

In S9, the MCU 30 determines whether or not a capturing instruction has been input by a user. The user can instruct capturing by pressing the first hardware button 8*a* of the head device 1*a* or the first software button 105*a* of the UI 100. When the capturing instruction is not input, the MCU 30 returns from S9 to S8. When the capturing instruction is input, the MCU 30 proceeds from S9 to S10.

In S10, the MCU 30 transmits an imaging instruction to the head device 1*a*.

In S11, the MCU 30 acquires an image 103 of the Petri dish (test image) acquired by the main camera 11 from the head device 1*a*, and displays the test image in the result area 102 of the UI 100.

In S12, the MCU 30 determines whether or not a count instruction has been input. The user can input the count instruction by pressing the first hardware button 8*a* of the head device 1*a* or the first software button 105*a* of the UI 100 assigned as the count button. When the count instruction is not input, the MCU 30 returns from S12 to S8. When the count instruction is input, the MCU 30 proceeds from S12 to S13.

In S13, the MCU 30 transmits the count instruction to the head device 1*a*. Note that the MCU 30 performs count processing instead of the MCU 20 in a case where the count processing is performed by the PC 1*b*.

In S14, the MCU 30 receives a count result from the head device 1*a*, and displays the count result in the count value area 104. Note that, in a case where the MCU 30 executes the count processing in S14, the MCU 30 displays the counting result obtained by executing the count processing in the count value area 104.

In S15, the MCU 30 determines whether or not the test condition such as the image processing and the count algorithm has been changed. When the test condition is changed, the MCU 30 returns to S13. When the test condition is not changed, the MCU 30 proceeds to S16. Note that the change in the test condition in S8 is assumed to be a change in the test condition that requires re-acquisition of an image. The change in the test condition in S15 causes a change in image processing on the acquired image, but it is assumed that re-acquisition of an image is unnecessary.

In S16, the MCU 30 determines whether or not a registration instruction has been input by the user. The user can input the registration instruction by pressing the second hardware button 8*b* of the head device 1*a* or the second software button 105*b* of the UI 100 assigned as the register button. When the registration instruction has not been input, the MCU 30 returns from S16 to S8 to execute re-capturing or change the test condition. When the registration instruction is input, the MCU 30 proceeds from S16 to S17.

In S17, the MCU 30 registers the count result to the active cell.

In S18, the MCU 30 determines whether or not all counts have been ended. For example, when the count results have been input to all the cells existing in the count table, the MCU 30 determines that the counts have been ended. When there is still a cell without any input, the MCU 30 proceeds from S18 to S5, and changes the active cell to the next cell (cell identification).

(2) Main Processing of Head Device 1*a*

Figure 35:
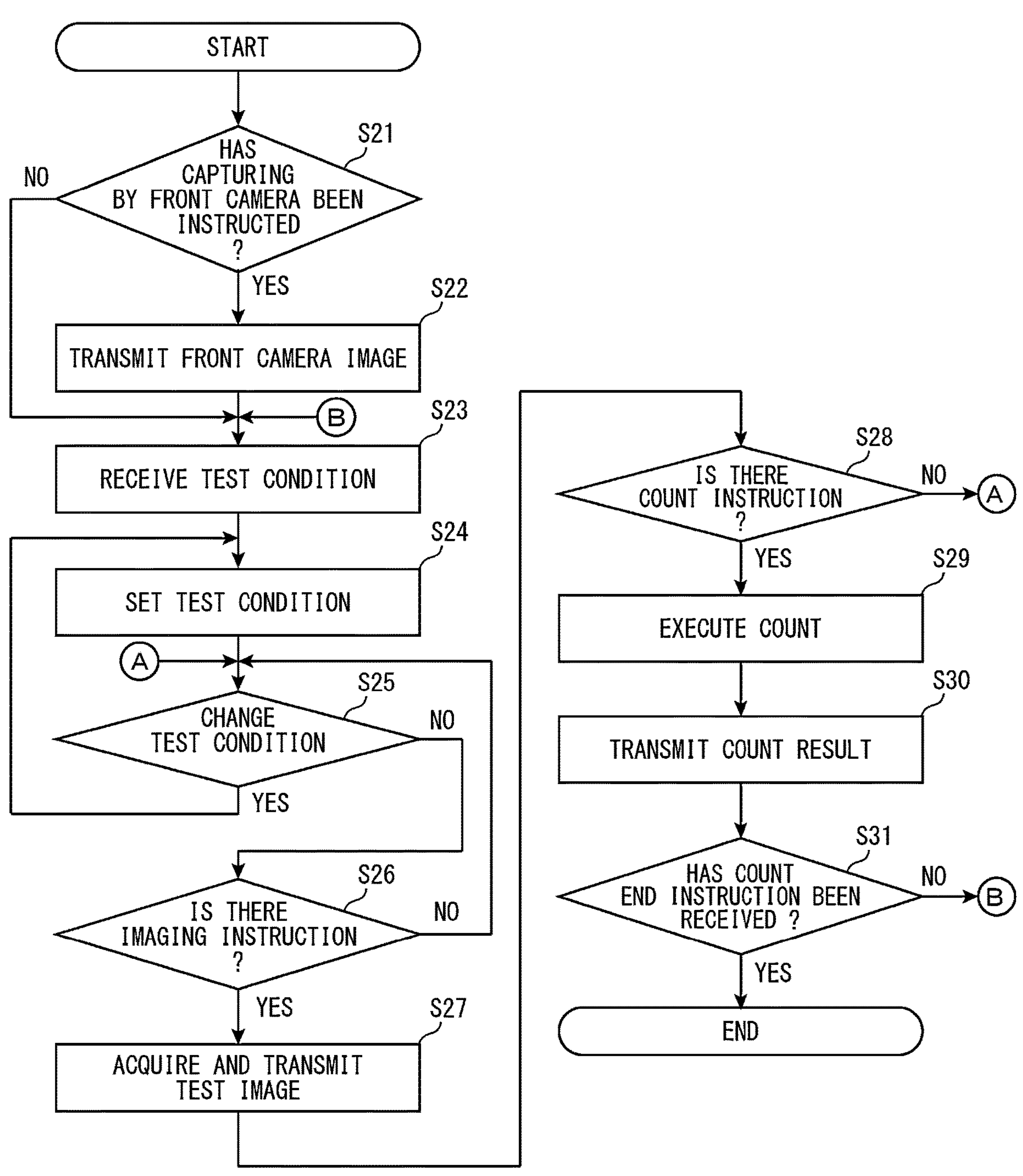
FIG. 35 is a flowchart illustrating processing executed by the head device.

FIG. 35 illustrates a series of processes executed by the MCU 20 of the head device 1*a* according to the control program.

In S21, the MCU 20 determines whether or not a capturing instruction with respect to the front camera 10 has been received. In a case where the identification image 221 of the test list 220 is read as described above, the capturing instruction (a code reading instruction) to the front camera 10 is input from the PC 1*b* to the head device 1*a*. When the capturing instruction to front camera 10 has not been input, the MCU 20 proceeds from S21 to S23. When the capturing instruction to the front camera 10 is input, the MCU 20 proceeds from S21 to S22.

In S22, the MCU 20 activates the front camera 10 to acquire an image (front camera image), and transmits the front camera image or a decoding result of a symbol to the PC 1*b*.

In S23, the MCU 20 receives a test condition from the PC 1*b* and stores the test condition in the storage device 25.

In S24, the MCU 20 sets the test condition for each section. The sensitivity out of the test condition is set in the imaging control section 21. An illumination device to be turned on, brightness, an illumination direction, and the like are set in the illumination control section 22.

In S25, the MCU 20 determines whether or not a change instruction for the test condition has been received from the PC 1*b*. The change instruction is received together with a new test condition. When the change instruction for the test condition is received, the MCU 20 returns to S24 and sets the new test condition. When the change instruction has not been received, the MCU 20 proceeds from S25 to S26.

In S26, the MCU 20 determines whether or not an imaging instruction has been received from the PC 1*b*. When the imaging instruction has not been input, the MCU 20 returns from S26 to S25. When the imaging instruction is input, the MCU 20 proceeds from S26 to S27.

In S27, the MCU 20 activates the main camera 11, acquires a test image, and transmits the test image to the PC 1*b*.

In S28, the MCU 20 determines whether or not a count instruction has been input from the head device 1*a*. When the count instruction has not been input, the MCU 20 returns from S28 to S25. When the count instruction is input, the MCU 20 proceeds from S28 to S29.

In S29, the MCU 20 executes a count of colonies according to the test condition.

In S30, the MCU 20 transmits a count result to the PC 1*b*.

In S31, the MCU 20 determines whether or not a count end instruction has been received. When the count end instruction is received, the MCU 20 ends the count. When the count end instruction has not been received, the MCU 20 returns from S31 to S23, and receives a test condition for the next cell.

(3) Registration of Sample Database

A count table has a plurality of rows and columns, and each cell is associated with a test condition. The count table and a test list may be created again for each day. Meanwhile, there is also a case where a test is executed for the same sample every day. Therefore, burden of count table creation processing is mitigated when a count table is registered in the sample DB 40 in advance for a sample with a high test frequency. Therefore, when a count table has been created, the user may register a row element corresponding to each sample in the sample DB 40.

Figure 36:
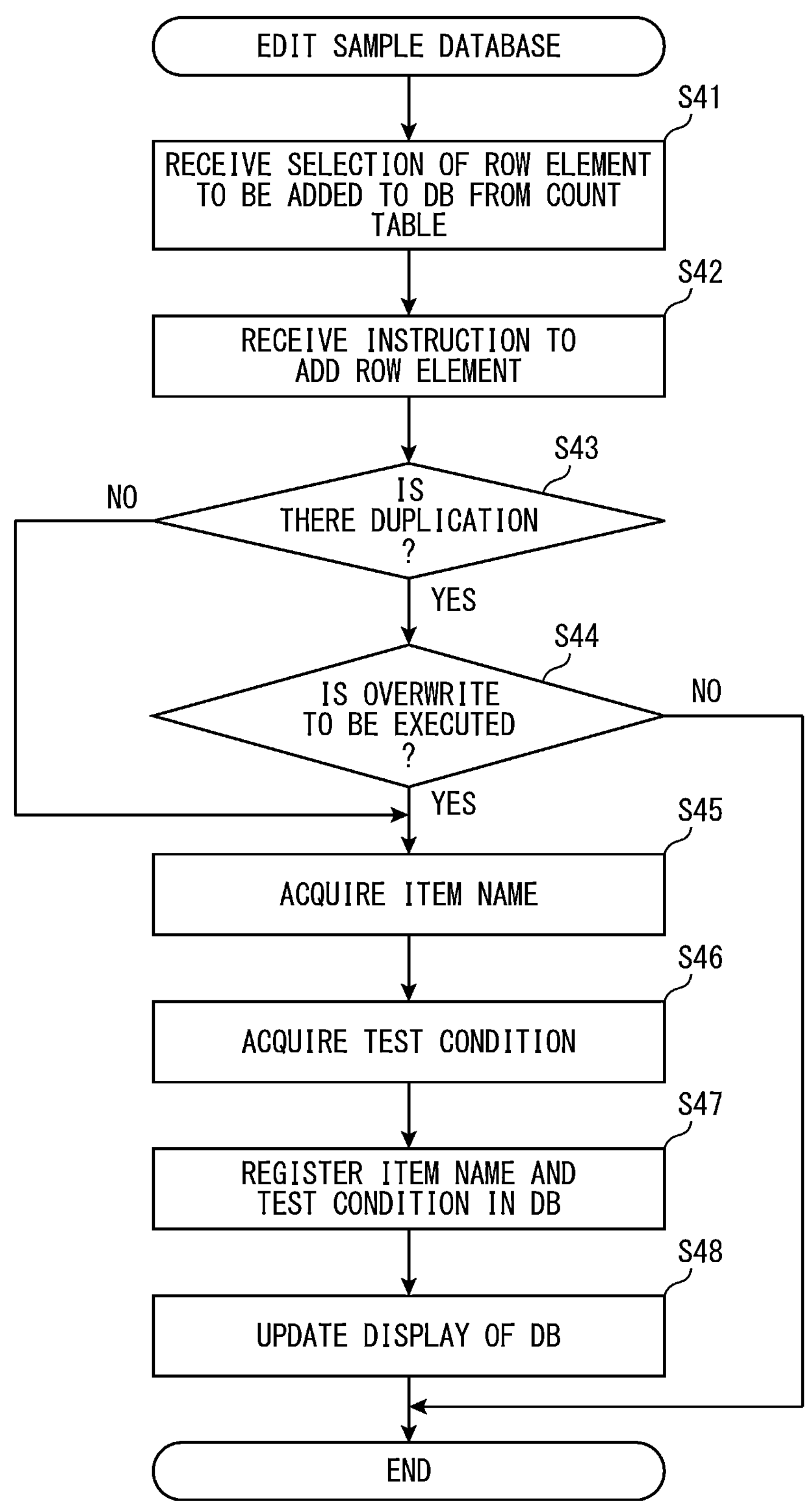
FIG. 36 is a flowchart illustrating editing of the sample database.

FIG. 36 is a flowchart illustrating editing processing of the sample DB 40 executed by the MCU 30 of the PC 1*b*. The MCU 30 executes the following processing according to the application program 39 stored in the storage device 35.

In S41, the MCU 30 receives selection of a row element to be registered in the sample DB 40 among a plurality of row elements included in the count table. For example, the MCU 30 may receive a click by the pointer 57 on any row element among the row elements included in the count table.

In S42, the MCU 30 receives an addition instruction for the selected row element. For example, the addition instruction may be input when a right click is executed by the pointer 57 in a state in which the row element has been selected.

In S43, the MCU 30 acquires a sample name of the row element instructed to be added, and determines whether or not the same sample name has already been registered in the sample DB 40 (duplication determination). When the row element instructed to be added does not already exist, the MCU 30 proceeds from S43 to S45. When the row element instructed to be added exists in the sample DB 40, the MCU 30 proceeds from S43 to S44.

In S44, the MCU 30 inquires of the user whether or not to overwrite the row element in the sample DB 40. When a cancellation instruction is input, the MCU 30 cancels the addition of the row element. When an overwriting instruction is input, the MCU 30 proceeds from S44 to S45.

In S45, the MCU 30 acquires an item name (for example, a sample name, a bacterial species, a culture medium type, or a dilution factor) constituting the row element to be added.

In S46, the MCU 30 acquires a test condition associated with a cell of the row element from the storage device 35.

In S47, the MCU 30 registers the item name and the test condition in the sample DB 40.

In S48, the MCU 30 updates display of the sample DB 40 in the UI 50.

(4) Editing of Count Table

Figure 37:
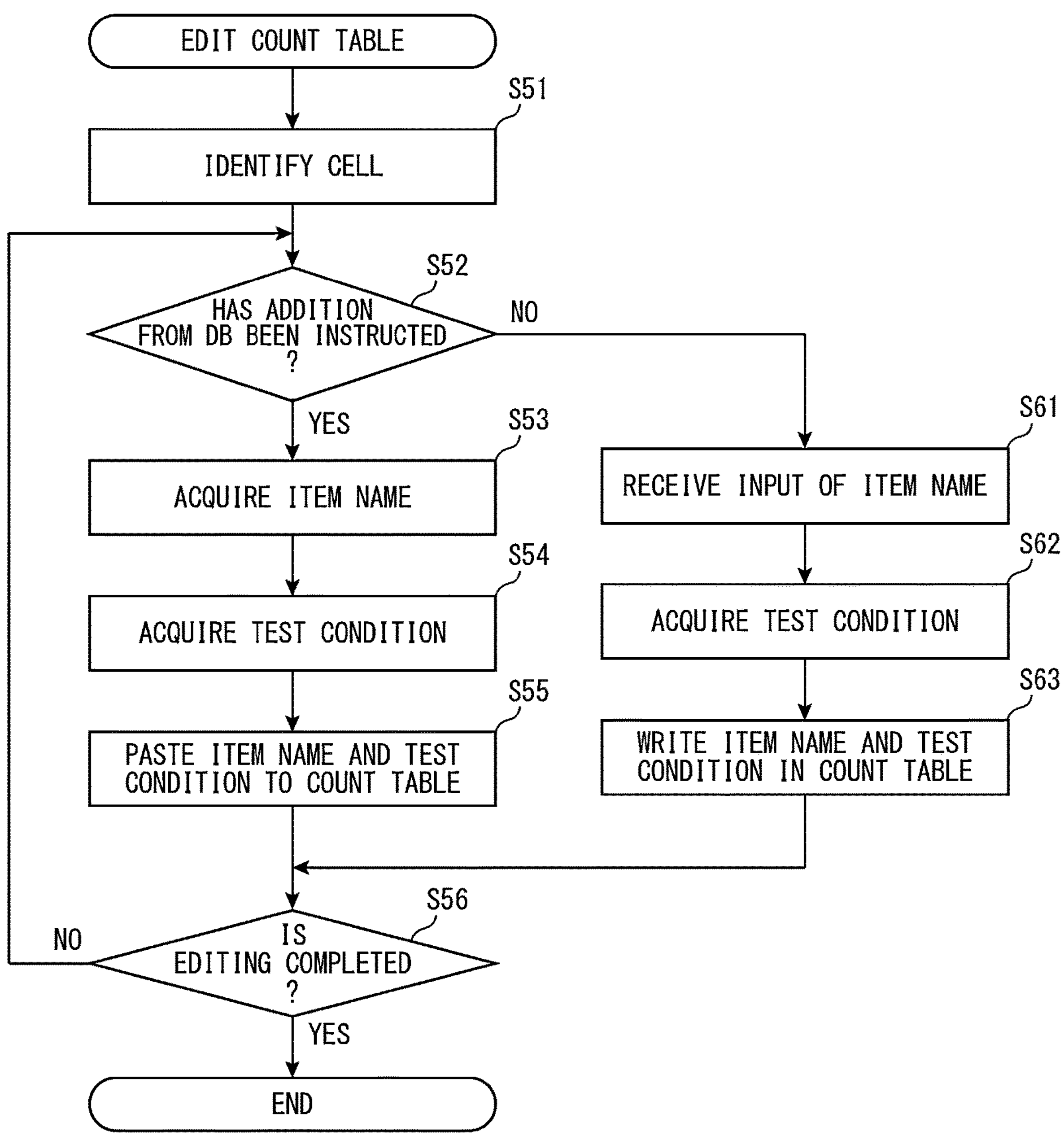
FIG. 37 is a flowchart for describing editing of the count table.

FIG. 37 is a flowchart illustrating count table editing processing executed by the MCU 30 of the PC 1*b*. The MCU 30 executes the following processing according to the count application program stored in the storage device 35.

In S51, the MCU 30 identifies a position (cells or a row) to which a row element is to be newly added in a count table. For example, the MCU 30 selects a row next to the last row in which a sample name has been input in the count table. Note that a new row may be selected between a row and another row. For example, when a row in which a sample name has been input in the count table is selected and right-clicked by the pointer 57, an empty row is added next to the selected row.

In S52, the MCU 30 determines whether or not an instruction to add a row from the sample DB 40 has been issued. For example, when the button 64 of the UI 50 is pressed, the MCU 30 recognizes that the instruction to add a row from the sample DB 40 has been issued. When the instruction to add a row from the sample DB 40 is issued, the MCU 30 proceeds to S53. When the instruction to add a row from the sample DB 40 has not been issued, the MCU 30 proceeds to S61.

In S53, the MCU 30 acquires an item name of the row instructed to be added from the sample DB 40.

In S54, the MCU 30 acquires a test condition of the row instructed to be added from the sample DB 40.

In S55, the MCU 30 attaches the acquired item name and test condition to the count table. That is, the MCU 30 adds a new row element to the count table. Note that the MCU 30 may determine whether or not a row element designated by the user among the plurality of row elements held in the sample DB 40 is included in a new count table. Moreover, when it is determined that the row element designated by the user is not included in the new count table, the MCU 30 may determine whether or not the row element designated by the user includes cells of a column element not included in the new count table. When it is determined that the row element designated by the user includes the cells of the column element not included in the new count table, the MCU 30 adds the column element to the new count table. That is, the column element is also added to the row element given with another sample name already existing in the count table.

In S56, the MCU 30 determines whether or not to complete editing. When the user instructs to complete editing, the MCU 30 stores the count table in the storage device 35. When the user does not instruct to complete editing, the MCU 30 returns from S56 to S51.

When a new row is added without using the sample DB 40, the MCU 30 receives an input of an item name through the keyboard 32 or the pointing device 33 in S61.

In S62, the MCU 30 receives an input of a test condition through the keyboard 32 or the pointing device 33.

In S63, the MCU 30 writes the acquired item name and test condition in the count table. Thereafter, the MCU 30 proceeds to S56.

(5) Identification of Count Table

Figure 38:
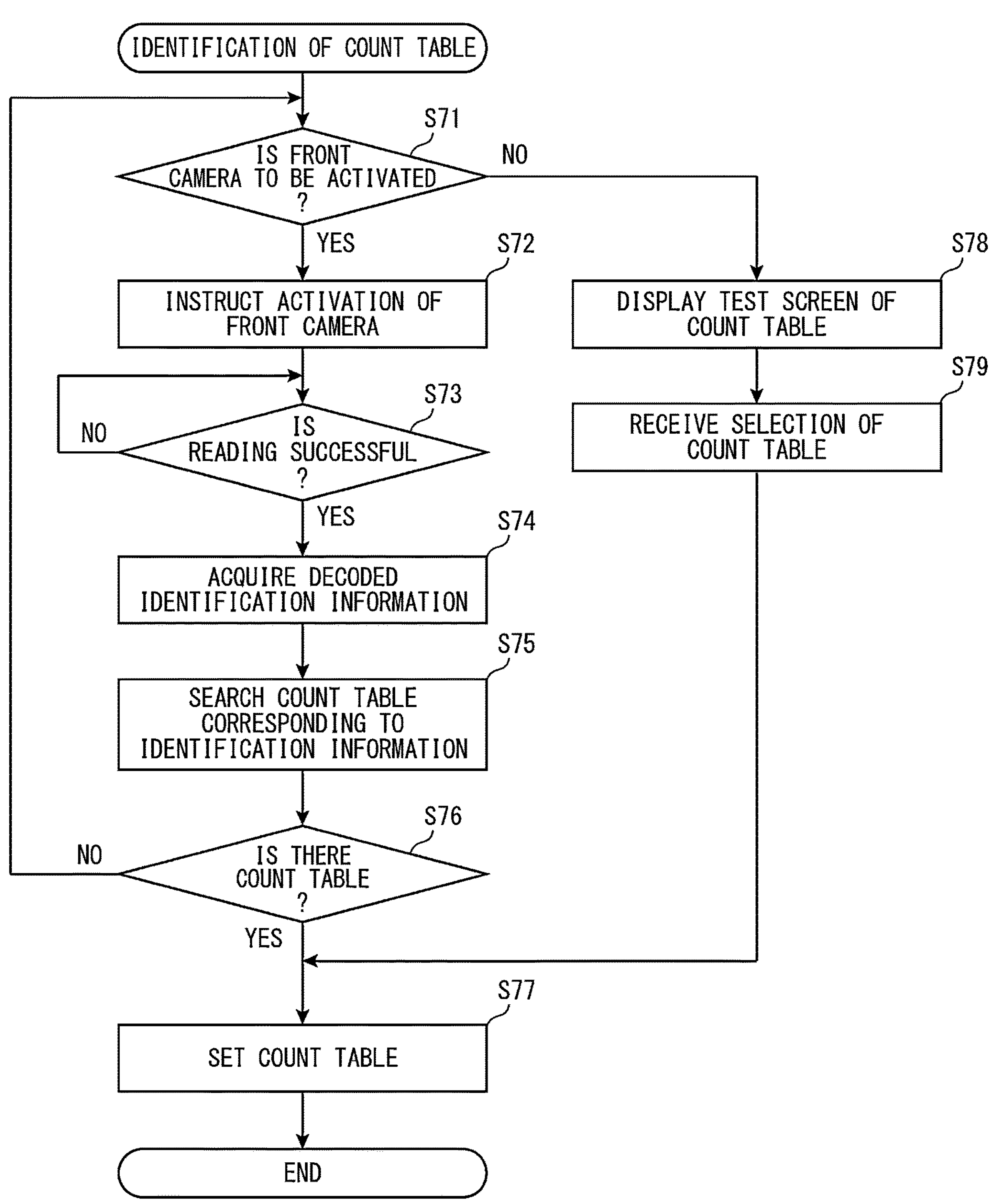
FIG. 38 is a flowchart for describing identification of the count table.

FIG. 38 is a flowchart illustrating count table identification processing executed by the MCU 30 of the PC 1*b*. The MCU 30 executes the following processing according to the count application program stored in the storage device 35.

In S71, the MCU 30 determines whether or not an activation instruction for the front camera 10 has been input.

For example, when the button 214 of the file UI 200 illustrated in FIG. 26 is clicked, the MCU 30 determines that the activation instruction has been input, and proceeds to S72.

In S72, the MCU 30 transmits the activation instruction for the front camera 10 to the head device 1*a*.

In S73, the MCU 30 waits for the head device 1*a* to successfully read the identification image 221.

In S74, the MCU 30 acquires identification information decoded from the identification image 221 in the head device 1*a*.

In S75, the MCU 30 searches the storage device 35 for a count table corresponding to the identification information.

In S76, the MCU 30 determines whether or not the count table corresponding to the identification information has been found. In a case where the count table does not exist, the MCU 30 returns to S71. In a case where the count table exists, the MCU 30 proceeds to S77.

In S77, the MCU 30 reads the count table from the storage device 35 and sets the count table in the UI 100.

When the activation instruction has not been input in S71, the MCU 30 proceeds to S78. In S78, the MCU 30 displays a count table search screen on the display device 37. In S79, the MCU 30 receives selection of a count table. For example, any count table may be selected in the file UI 200 illustrated in FIG. 26. Thereafter, the MCU 30 proceeds to S77.

(6) Count of Colonies

Figure 39:
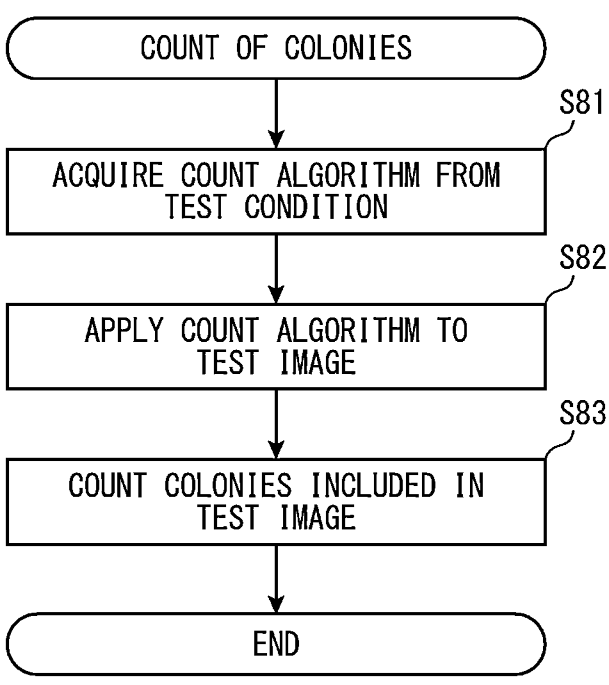
FIG. 39 is a flowchart illustrating a colony counting method.

FIG. 39 illustrates colony count processing executed by the MCU 20 of the head device 1*a* according to the control program. However, image processing and count processing may be executed by the MCU 30.

In S81, the MCU 20 acquires a count algorithm from a test condition received from the PC 1*b*. Specifically, image processing and a threshold parameter (for example, a binarization threshold) used in the count algorithm are acquired.

In S82, the MCU 20 applies the count algorithm to a test image acquired by the main camera 11. For example, image processing such as HDR or ring removal is applied to the test image.

In S83, the MCU 20 counts colonies included in the test image according to the test condition (threshold parameter).

(7) Registration of Information in Free Column (for Example, Remark Cell)

Figure 40:
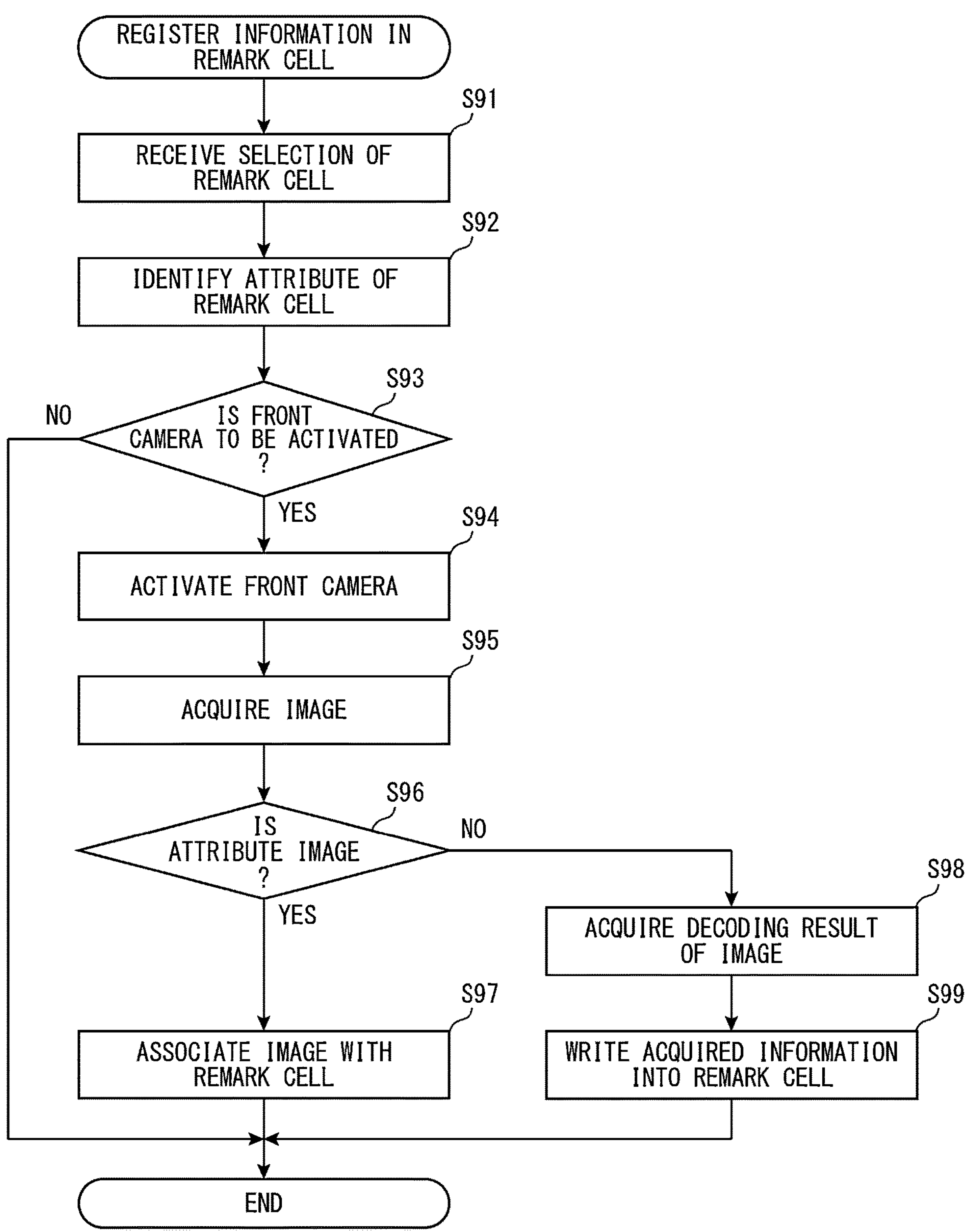
FIG. 40 is a flowchart illustrating a method of registering information in a cell of a free column.

FIG. 40 is a flowchart illustrating information registration processing with respect to a free column, such as a remark cell, executed by the MCU 30 of the PC 1*b*. The MCU 30 executes the following processing according to the count application program stored in the storage device 35.

In S91, the MCU 30 receives selection of a remark cell. Although the remark cell is used as an example here, a cell of another free column may be used. The MCU 30 sets the remark cell selected by the pointer 57 as an active cell.

In S92, the MCU 30 identifies an attribute of the remark cell. An attribute (for example, a count value, a character string, or an image) may be given to each cell in advance. The MCU 30 reads the attribute of each cell from the storage device 35.

In S93, the MCU 30 determines whether or not activation of the front camera has been instructed. When the activation of the front camera 10 is not instructed, the MCU 30 inputs text input from the keyboard 32 or the like to the remark cell. On the other hand, when the activation instruction is input, the MCU 30 proceeds to S94.

In S94, the MCU 30 activates the front camera 10 of the head device 1*a*. In S95, the MCU 30 acquires an image by the front camera 10.

In S96, the MCU 30 determines whether or not the identified attribute is an image. When the attribute is an image, the MCU 30 proceeds to S97.

In S97, the MCU 30 associates the image (for example, an external appearance image of a product) acquired by the front camera 10 with the remark cell.

When it is determined in S96 that the identified attribute is not an image, the MCU 30 proceeds to S98.

In S98, the MCU 30 acquires a decoding result of the image acquired by the front camera 10 from the head device 1*a*.

In S99, the MCU 30 writes the acquired information (the decoding result (for example, a serial number of the product)) into the remark cell.

<Removal of Residue>

Figure 42:
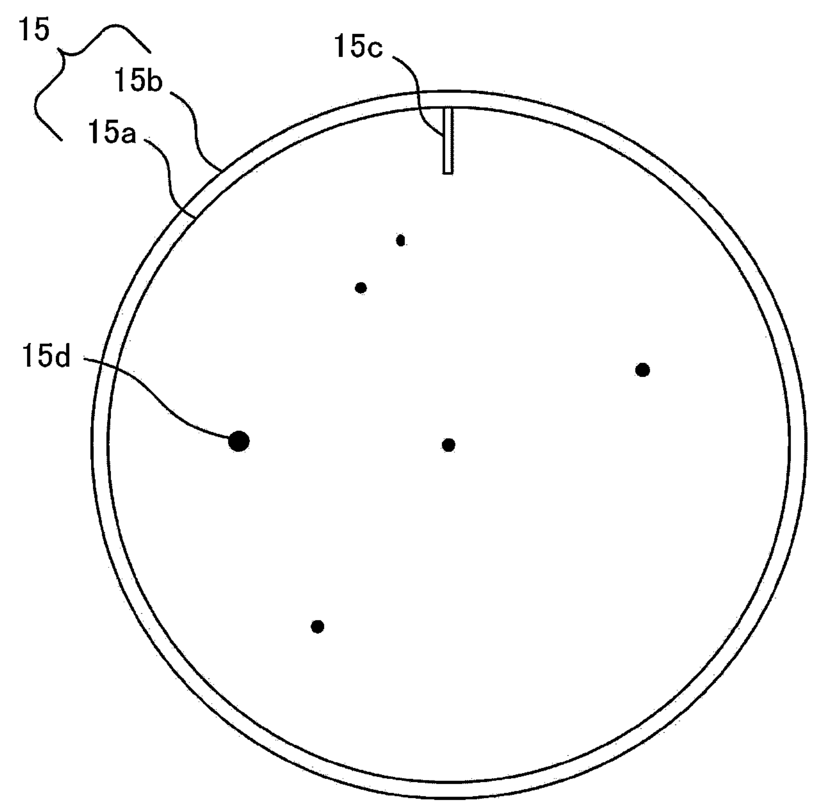
FIG. 42 is a view for describing an image before culturing (reference image)

FIG. 42 illustrates a pre-image acquired by the main camera 11 before culturing fungi. As illustrated in FIG. 42, the Petri dish 15 includes an inner dish 15*a* and an outer dish 15*b*. An outer diameter of the inner dish 15*a* is smaller than an inner diameter of the outer dish 15*b*, and the outer dish 15*b* functions as a lid that covers the inner dish 15*a*. A marker 15*c* is a marker for alignment, and is a marker that the user writes with a pen on a bottom of the inner dish 15*a* or a back surface of the bottom. The marker 15*c* may be a carved seal or the like. A residue 15*d* is a foreign matter such as dust, stain, dirt, or a letter drawn with a pen and left without being erased. The residue 15*d* may be a part of a food to be tested.

Figure 43:
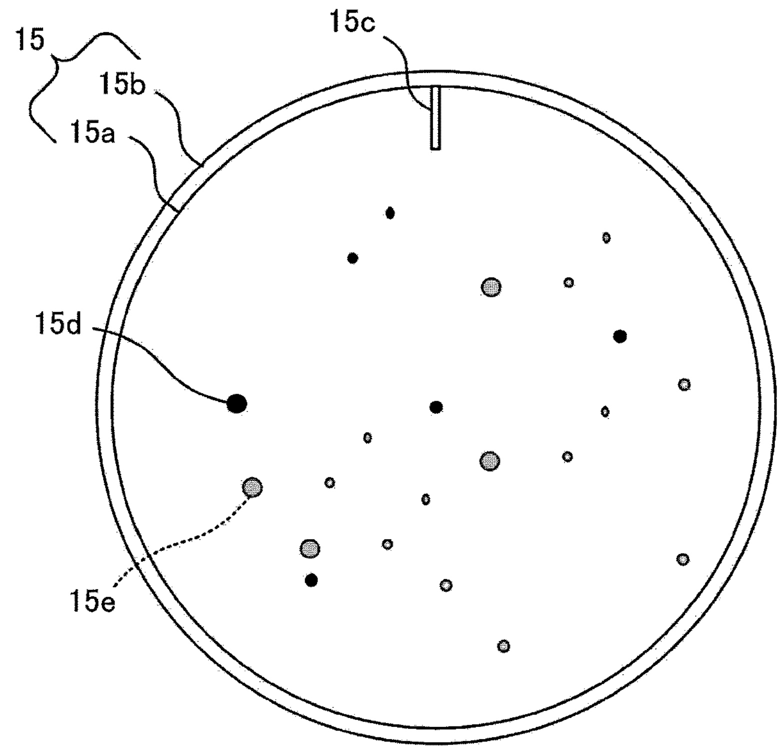
FIG. 43 is a view for describing an image after culturing (test image)

FIG. 43 illustrates a post-image acquired by the main camera 11 after culturing fungi. When the luminance of a colony 15*e* and the luminance of the residue 15*d* are close to each other, the colony 15*e* and the residue 15*d* are indistinguishable from each other in the binarized post-image. Therefore, the residue 15*d* is sometimes counted as a colony. Therefore, in the present embodiment, the pre-image (reference image) and the post-image (test image) are acquired, and counting accuracy of the number of colonies is improved by reducing an influence of the residue 15*d* in the test image based on the pre-image.

Figure 44:
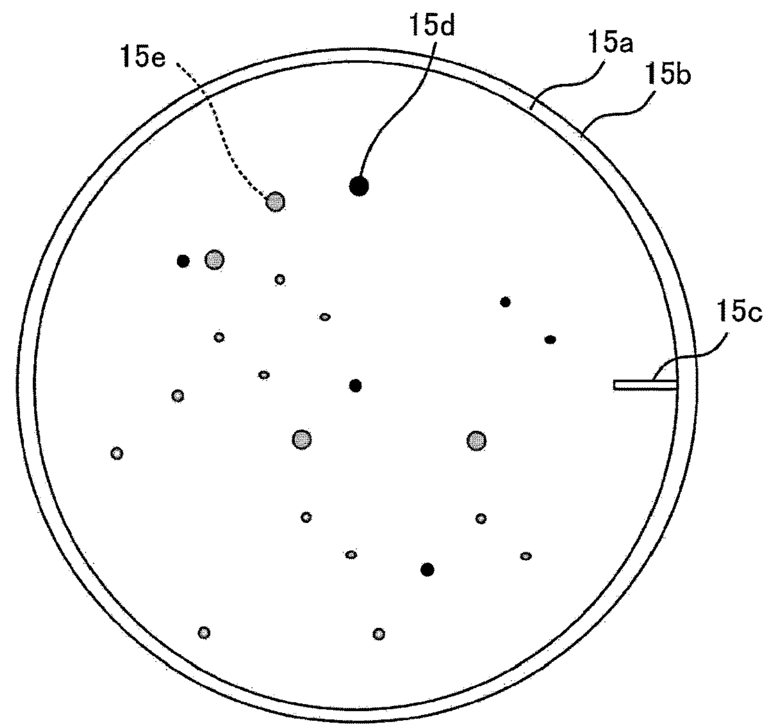
FIG. 44 is a view for describing an image after culturing (test image)

FIG. 44 illustrates another post-image. It takes a considerable time, such as 24 hours or 48 hours, to culture fungi. In the present example, the Petri dish 15 is taken down from the stage 5 and stored in an incubator or the like after a pre-image is acquired. When culture end time has passed, the user takes out the Petri dish 15 from the incubator, places the Petri dish on the stage 5, and acquires a post-image by the main camera 11. At this time, a position and a rotation angle of the Petri dish 15 when the pre-image has been acquired do not necessarily coincide with a position and a rotation angle of the Petri dish 15 when the post-image has been acquired. For example, even if the Petri dish 15 is aligned with the stage 5 using the marker 15, it is difficult to completely align the position and the rotation angle of the Petri dish 15 in the pre-image with the position and the rotation angle of the Petri dish 15 in the post-image. When such a relative displacement occurs, it is also difficult to sufficiently reduce an influence of the residue 15*d* in the post-image using the pre-image. Therefore, the present example also reduces an influence of such a relative displacement.

As described above, counting of colonies is affected by the test condition including the imaging condition of the main camera 11, the illumination condition of the illumination device, and the like. If a test condition at the time of acquiring the pre-image is different from a test condition at the time of acquiring the post-image, it may be difficult to sufficiently reduce the influence of the residue 15*d*. Therefore, it would be advantageous to provide a scheme for making the test condition at the time of acquiring the pre-image coincident with the test condition at the time of acquiring the post-image.

By the way, an extremely large number of the Petri dishes 15 are used in a food test, and thus, it is important to grasp which pre-image corresponds to which post-image. As illustrated in FIG. 41, when identification information (for example, a Petri dish number) is given to a side surface of the Petri dish 15, the user can distinguish between at least the plurality of Petri dishes 15. However, the pre-image and the post-image acquired by the main camera 11 do not include the Petri dish number given to the side surface of the Petri dish 15. If the Petri dish number is written on the lid or the bottom of the Petri dish 15 with a pen, the Petri dish number is included in the pre-image and the post-image, but this becomes the residue 15*d*, thereby lowering the counting accuracy. Therefore, it is important to correctly hold a relationship among the Petri dish 15, the pre-image, and the post-image. For example, it would be convenient for the user if the Petri dish number can be confirmed from the pre-image or the Petri dish number can be confirmed from the post-image.

[User Interface]

Hereinafter, the pre-image is referred to as a reference image, and the post-image is referred to as a test image.

Figure 45:
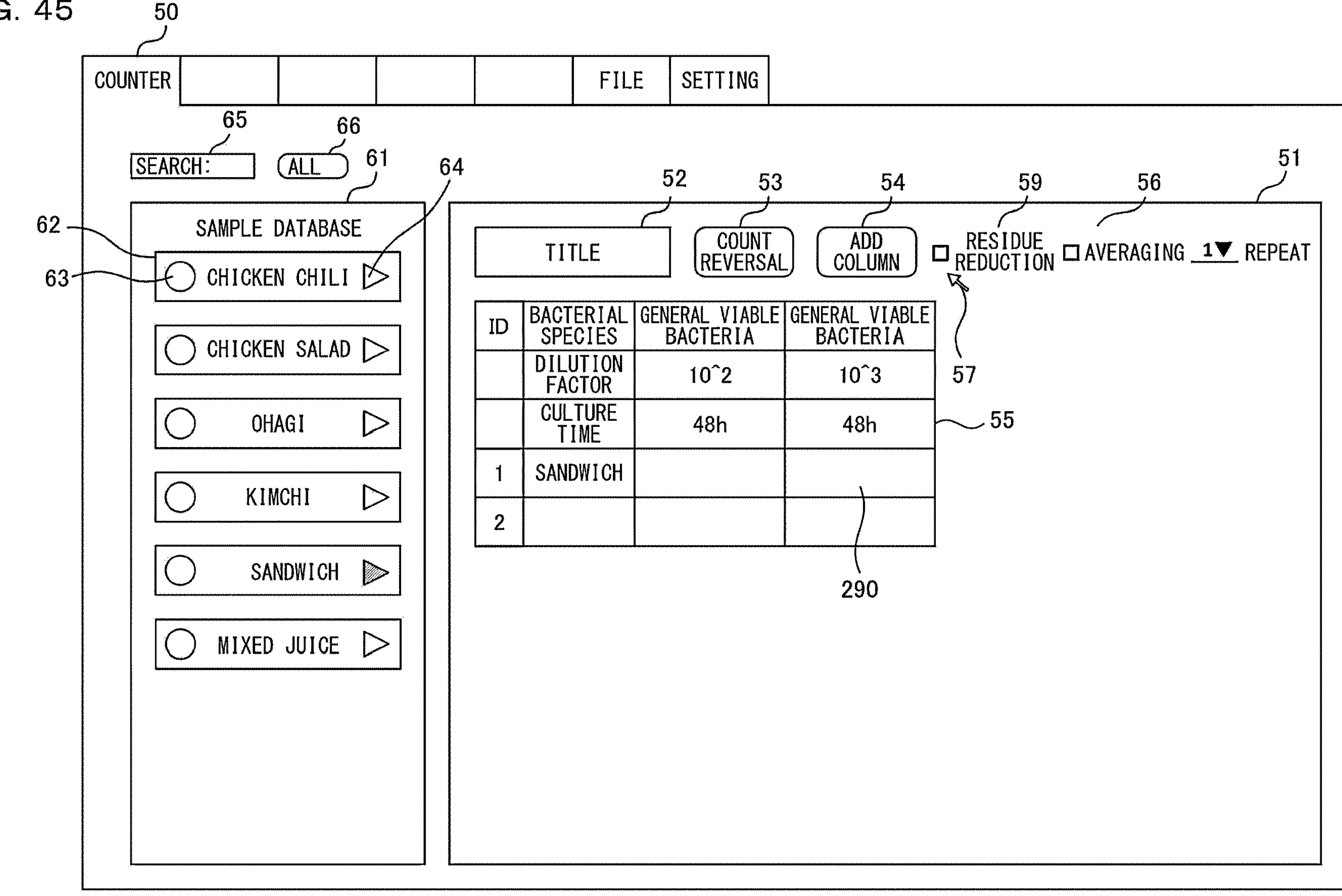
FIG. 45 is a view for describing a UI for enabling residue reduction.

FIG. 45 illustrates the UI 50 corresponding to residue reduction processing. The UI 50 includes a check box 59 functioning as a setting section that sets on/off (enabling/disabling) of the residue reduction processing. The check box 59 is turned on or off whenever being clicked by the pointer 57. A count cell 290 is a cell to which a count result is input.

Figure 46:
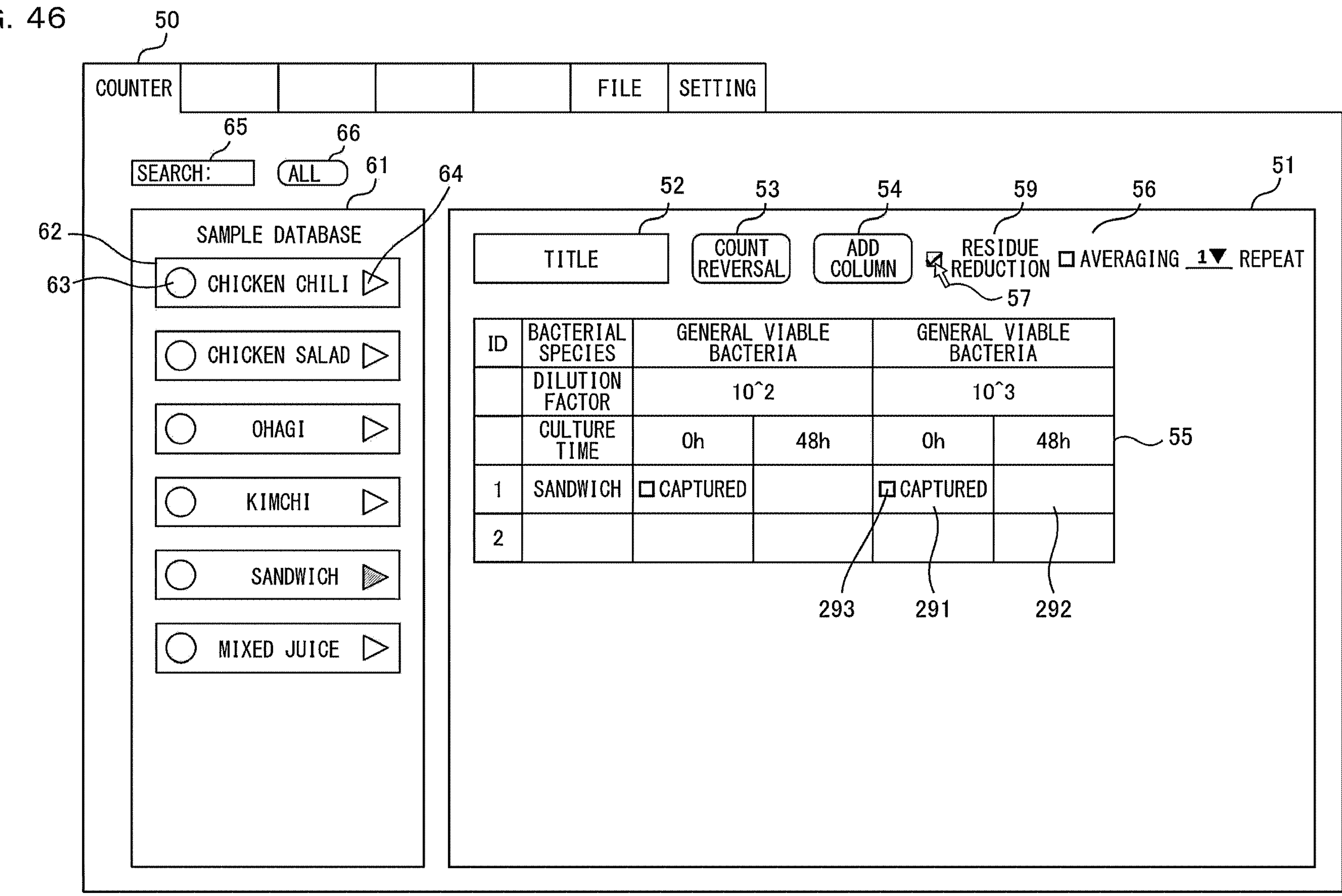
FIG. 46 is a view for describing a cell involved in the residue depletion.

FIG. 46 illustrates the UI 50 when the residue reduction processing is switched from off to on. When sensing that the check box 59 is turned on, the MCU 30 divides the count cell 290 into a first cell 291 and a second cell 292 in the count table 55. Note that when the check box 59 is switched from on to off, the UI 50 illustrated in FIG. 46 returns to the UI 50 illustrated in FIG. 45, and the first cell 291 and the second cell 292 return (are integrated) to one count cell 290.

In a column element including the first cell 291, "0 h" is illustrated as a culture time. "0 h" is merely a notation suggesting a state before culturing. The first cell 291 may include a check box 293 or an icon indicating whether or not a reference image has been acquired.

In a column element including the second cell 292, "48 h" is illustrated as a culture time. This is in common with a culture time associated with the original count cell 290.

FIG. 47 illustrates a UI 300 for acquiring a reference image. Portions that have been already described are denoted by the same reference signs. The UI 300 may be displayed on the display device 37 by double-clicking the first cell 291 with the pointer 57, or may be called from a user interface different from the count table 55. The MCU 30 stores a test condition, set in the first cell 291 through the UI 300, in the storage device 35. Moreover, the MCU 30 transmits an activation instruction to the head device 1*a*, and displays a moving image acquired by the main camera 11 in the result area 102. The user aligns the Petri dish 15 before culturing of fungi with the alignment member 7 while viewing the moving image displayed on the display device 37. The MCU 30 may align a center of the Petri dish 15 with a center of an image (reference image) by image processing. Even in this case, when the Petri dish 15 is manually aligned with the alignment member 7 as accurately as possible in advance, alignment accuracy by the image processing is improved.

The alignment member 7 has a shape corresponding to the Petri dish 15. As a result, the user can execute the alignment by arranging the Petri dish 15 along the alignment member 7. Note that a well plate or a film-type culture medium may be used as a culture container of the test individual. When the alignment members 7 corresponding to shapes of the respective culture containers are prepared in advance, the alignment can be easily executed even when the well plate or the film-type culture medium is used.

Examples of the test condition set through the UI 300 include a type of a culture medium, a sample name, a dilution factor, a culture time, a Petri dish number, a comment, capturing settings (camera settings such as an exposure time, selection of an illumination device, brightness, image processing), and the like.

When the MCU 30 senses that the first software button 105*a* (the first hardware button 8*a*) assigned to the capture button is operated, the MCU transmits the capturing settings to the head device 1*a*, and causes the main camera 11 to capture an image of the Petri dish 15 to acquire the reference image (still image). The user confirms the reference image displayed in the result area 102, and presses the register button 105*b* or presses the capture button 105 a for re-capturing. In the latter case, the user can change the test condition (mainly capturing settings) by operating the UI 300.

When sensing that the register button 105*b* is pressed, the MCU 30 stores the reference image in the storage device 35. Here, the MCU 30 may set a flag (reference flag), which is included in a header of the reference image and indicates the reference image, to "1". Further, the MCU 30 may store the reference image in the storage device 35 in association with identification information, such as a Petri dish number, or in association with the first cell 291.

Figure 48:
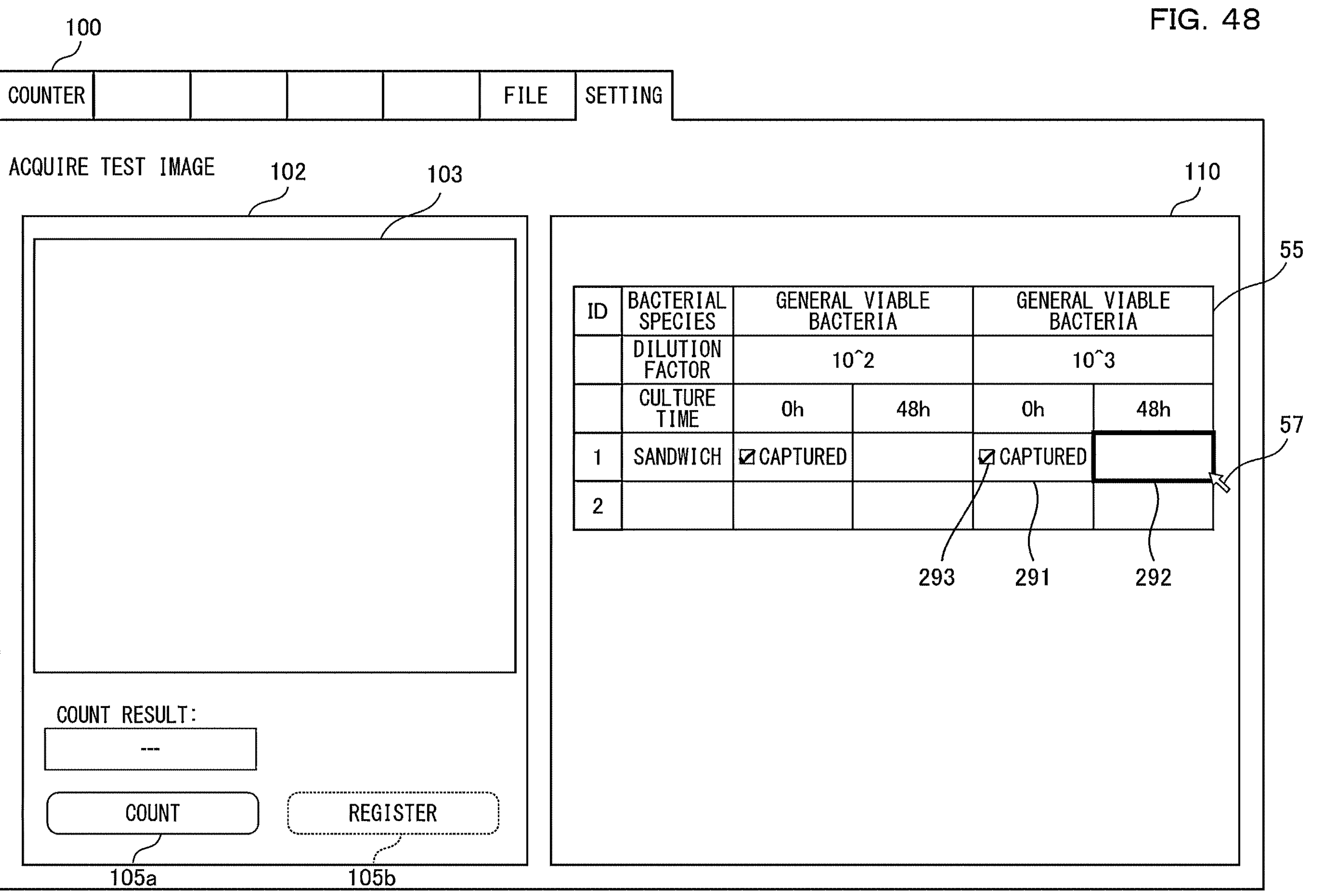
FIG. 48 is a view illustrating a UI for acquiring a test image.

FIG. 48 illustrates the UI 100 displayed on the display device 37 when the second cell 292 is double-clicked by the pointer 57. Here, the Petri dish 15 is not yet placed on the stage 5. When the second cell 292 is designated, the MCU 30 reads a test condition further associated with the first cell 291, which is associated with the second cell 292, from the storage device 35, and sets the test condition in the head device 1*a*. In FIG. 48, a check mark is displayed in the check box 293 since the reference image has already been acquired.

Figure 49:
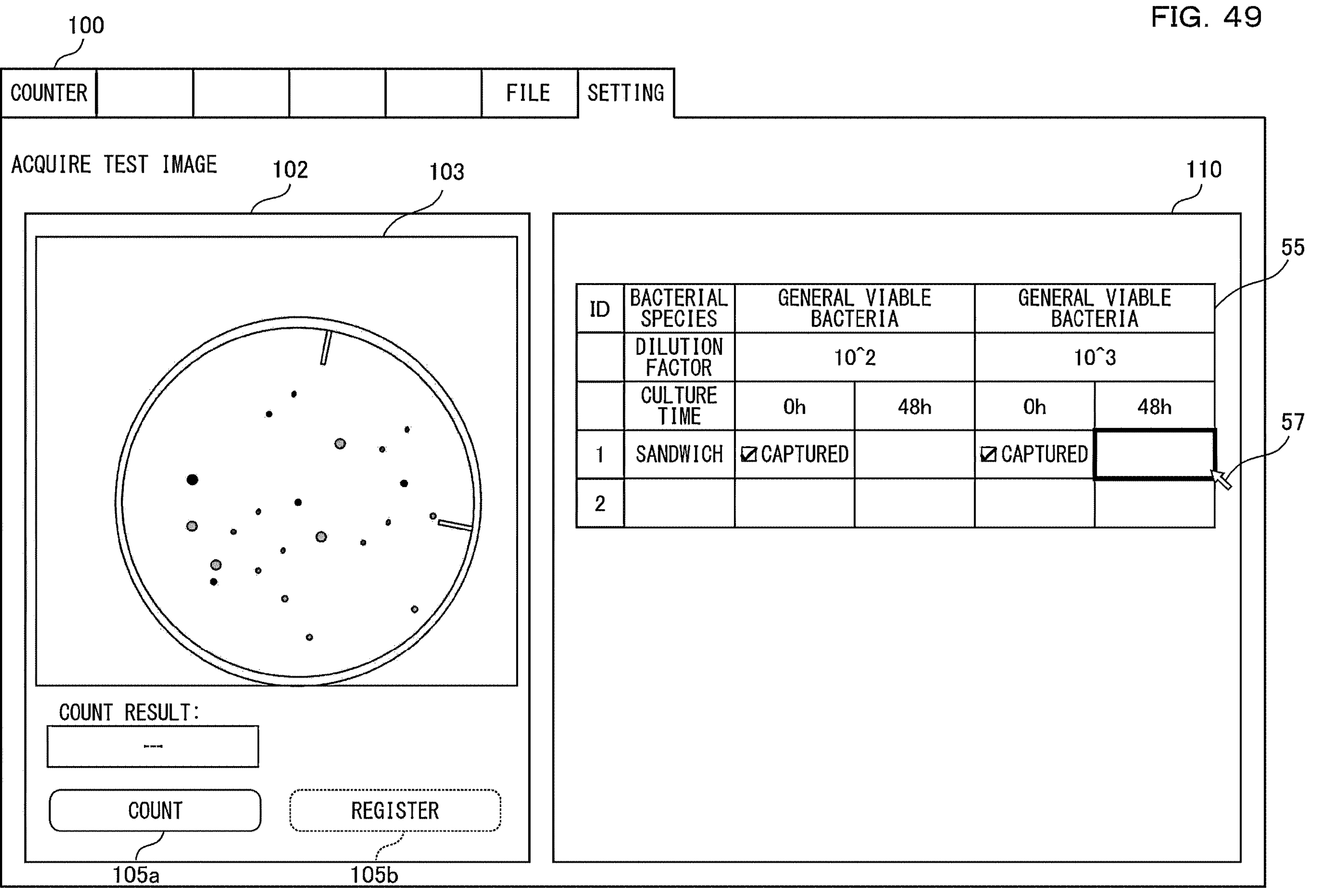
FIG. 49 is a view illustrating the UI for acquiring the test image.

FIG. 49 illustrates that the Petri dish 15 is placed on the stage 5. Here, the alignment member 7 is omitted. The user adjusts a position of the Petri dish 15 while viewing the moving image displayed in the result area 102. Here, in order to facilitate the adjustment of the position of the Petri dish 15, a guide image (for example, the reference image) may be displayed to be superimposed on the moving image. The MCU 30 may read the reference image associated with the first cell 291 which is associated with the second cell 292 from the storage device 35. Alternatively, the MCU 30 may cause the user to select the reference image using the following UI.

Figure 50:
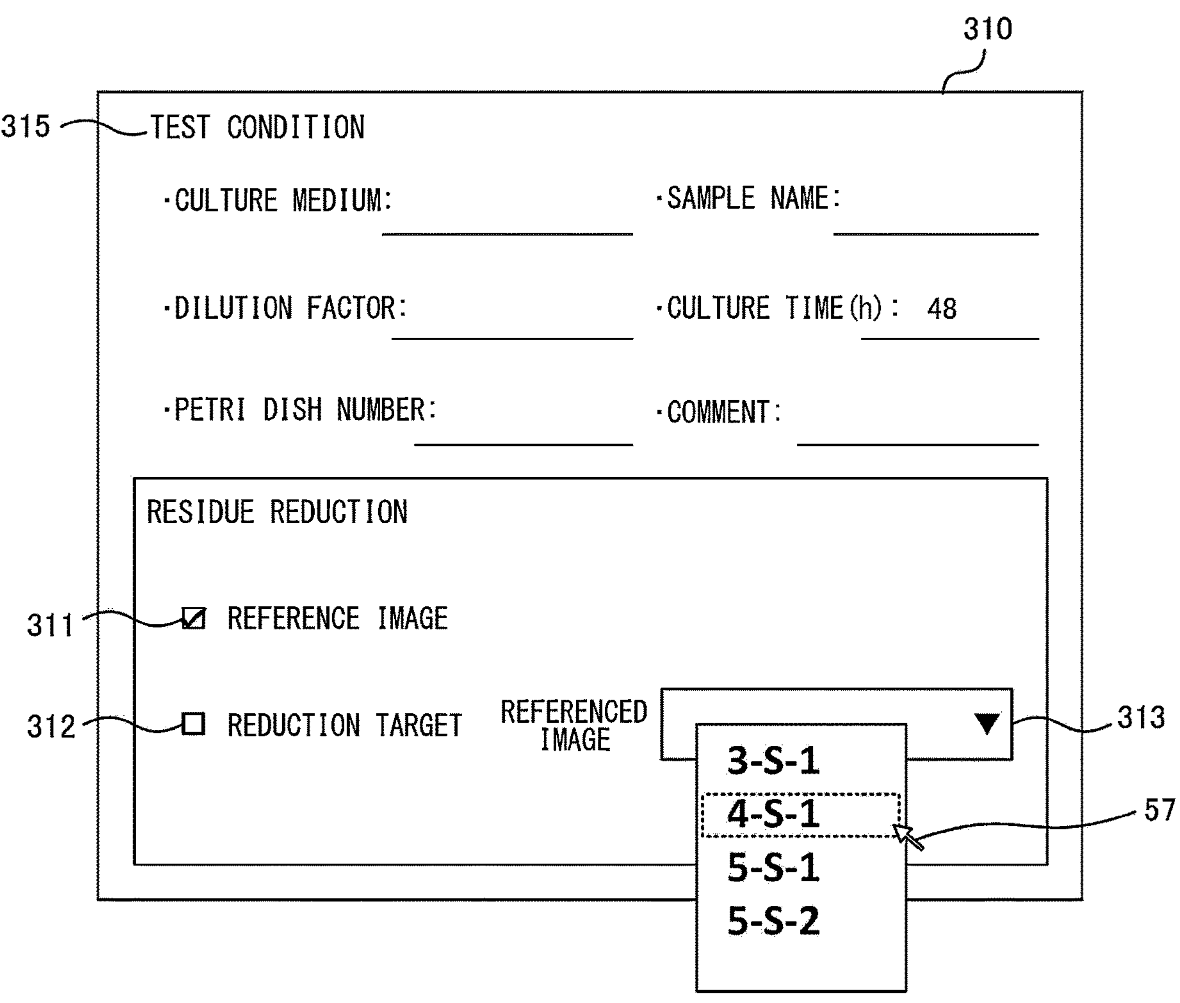

FIG. 50 illustrates a UI 310 for designating a reference image or a test image which is a residue reduction target. A check box 311 indicates that a calling target is the reference image. A check box 312 indicates that a calling target is the test image. When the check box 311 is checked, the MCU 30 extracts images with the reference flag being set to "1" among a plurality of images stored in the storage device 35 as the reference images and creates a list.

When a menu 313 is clicked by the pointer 57, the MCU 30 displays the list in the menu 313. In this example, a Petri dish number is given to each of the reference images. When the user selects one reference image from the menu 313 with the pointer 57, the MCU 30 reads a test condition associated with the selected reference image from the storage device 35.

Figure 51:
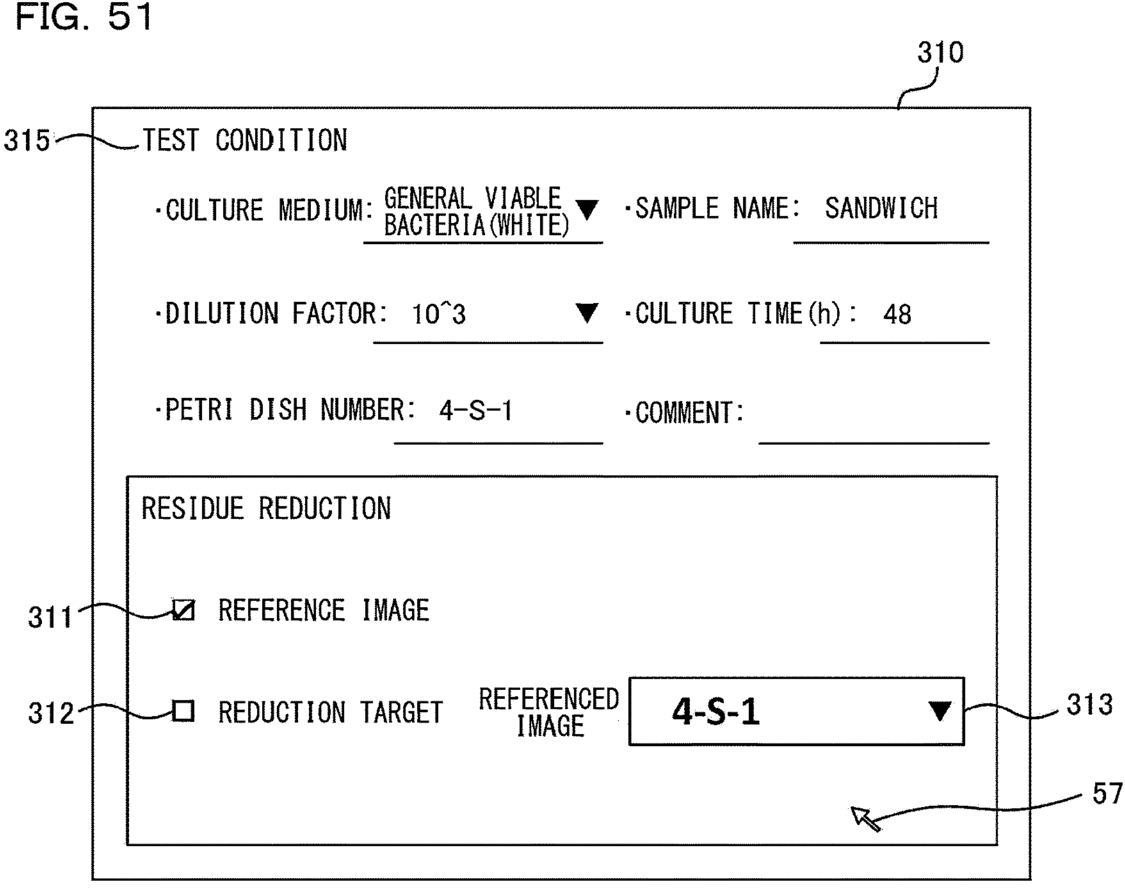
FIG. 51 is a view for describing display of a test condition associated with the reference image.

FIG. 51 illustrates the UI 310 when one reference image has been designated. The MCU 30 displays the test condition associated with the reference image selected by the user on a condition display section 315. As a result, the user can confirm whether or not the reference image as intended by the user has been selected.

When the check box 312 is checked, the MCU 30 extracts images with the reference flag being set to "1" among the plurality of images stored in the storage device 35 as the reference images and creates a list.

When a menu 313 is clicked by the pointer 57, the MCU 30 displays the list in the menu 313. A Petri dish number may be given to the test image. When the user selects one reference image from the menu 313 with the pointer 57, the MCU 30 reads a test condition associated with the selected reference image from the storage device 35 and displays the test condition on the UI 310.

Figure 52:
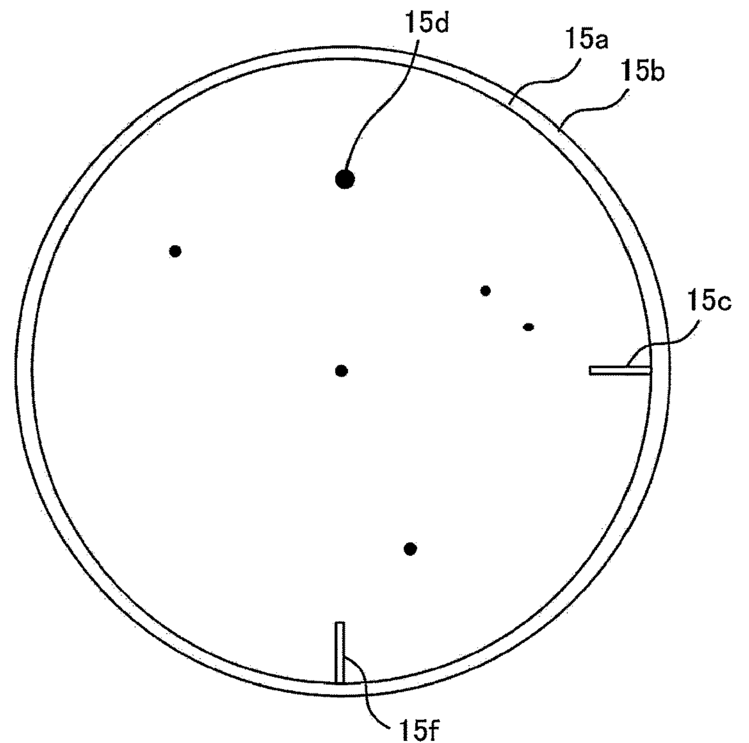
FIG. 52 is a view for describing a plurality of markers.

FIG. 52 illustrates at least two markers 15*c* and 15*f* given on the inner dish 15*a* of the Petri dish 15. The markers 15*c* and 15*f* are used for manual alignment of the Petri dish 15, but are also used in residue reduction processing to be described later.

Figure 53:
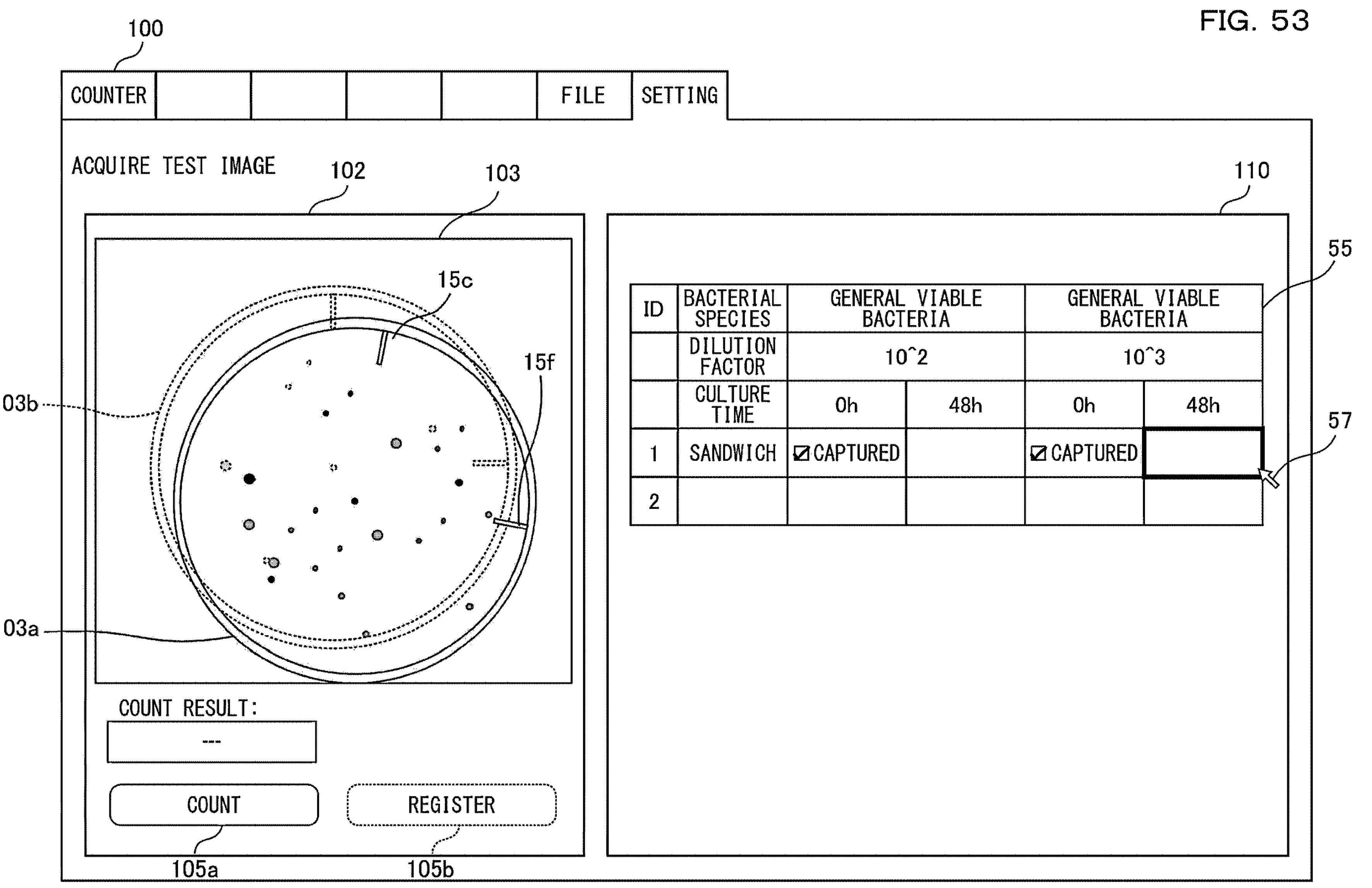
FIG. 53 is a view for describing a UI for assisting manual alignment.

FIG. 53 illustrates that a reference image 103*b* is displayed to be superimposed on a test image 103*a* as a moving image in the UI 100 for capturing a test image and counting colonies. The reference image 103*b* functions as a guide image for alignment. For example, the MCU 30 may reduce the luminance of the reference image 103*b*, extract an outline of the Petri dish 15 from the reference image 103*b*, color the outline with a conspicuous color (for example, red, orange, green, blue, or purple), and superimpose the colored outline on the test image 103*a*. The user manually adjusts a position of the Petri dish 15 such that a position and a rotation angle of the test image 103*a* coincide with a position and a rotation angle of the reference image 103*b*. At that time, the user can execute the alignment with high accuracy by referring to the markers 15*c* and 15*f*.

Figure 54:
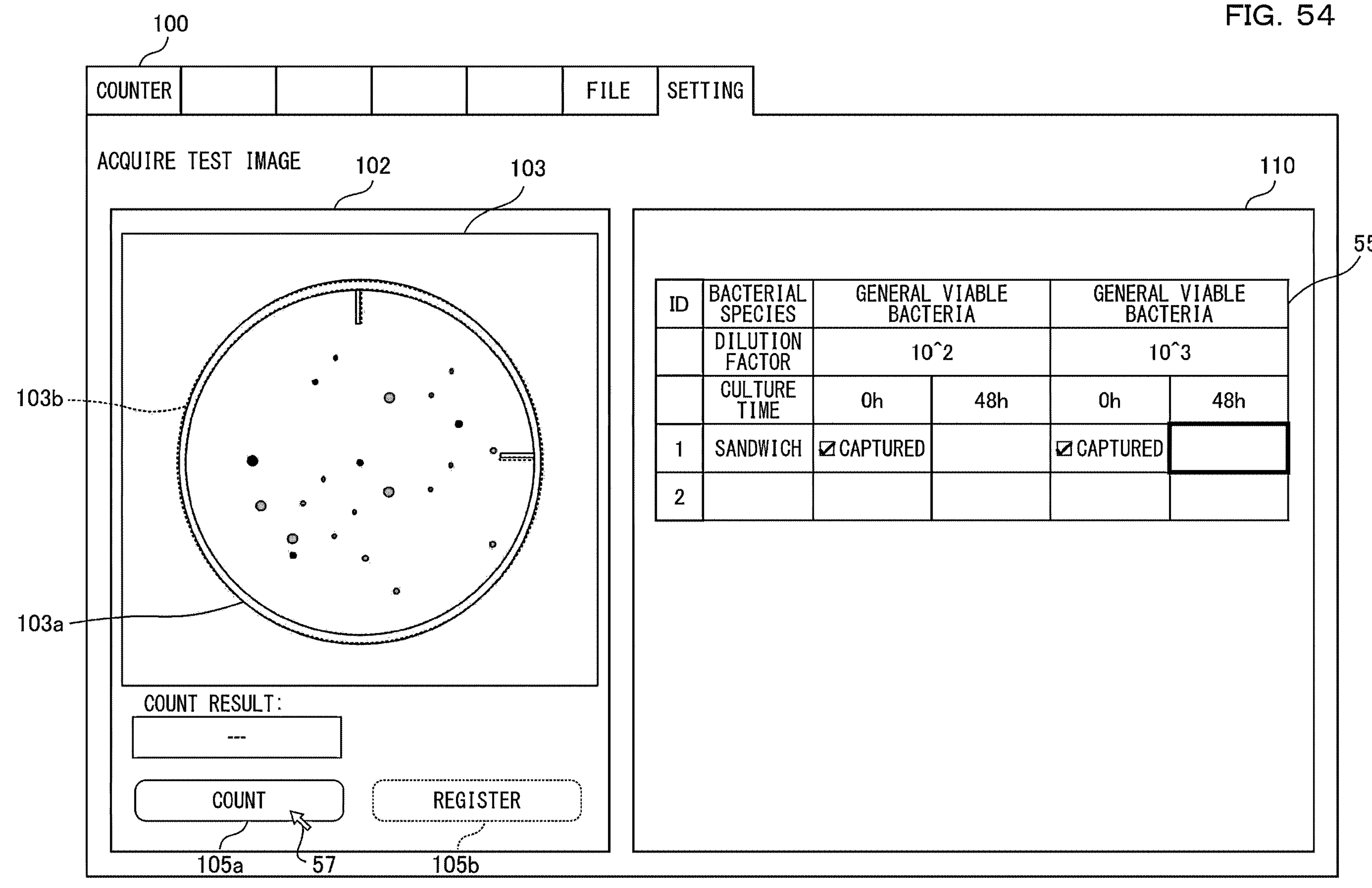
FIG. 54 is a view for describing the UI for assisting the manual alignment.

FIG. 54 illustrates a state in which the alignment of the Petri dish 15 is completed. Although the position and the rotation angle of the test image 103*a* and the position and the rotation angle of the reference image 103*b* desirably coincide as much as possible, but do not need to coincide completely. However, if the alignment is accurate, residues are more accurately reduced, and count accuracy of colonies is also improved.

When sensing that the first software button 105*a* (the first hardware button 8*a*) assigned to the count button is pressed, the MCU 30 sets the test condition in the head device 1*a* and transmits the imaging instruction. As a result, the test image is acquired, and the test image is stored in the storage device 35. The MCU 30 further reduces residues included in the test image 103*a* using the reference image 103*b* and the test image 103*a* (still image), and counts colonies.

Figure 55:
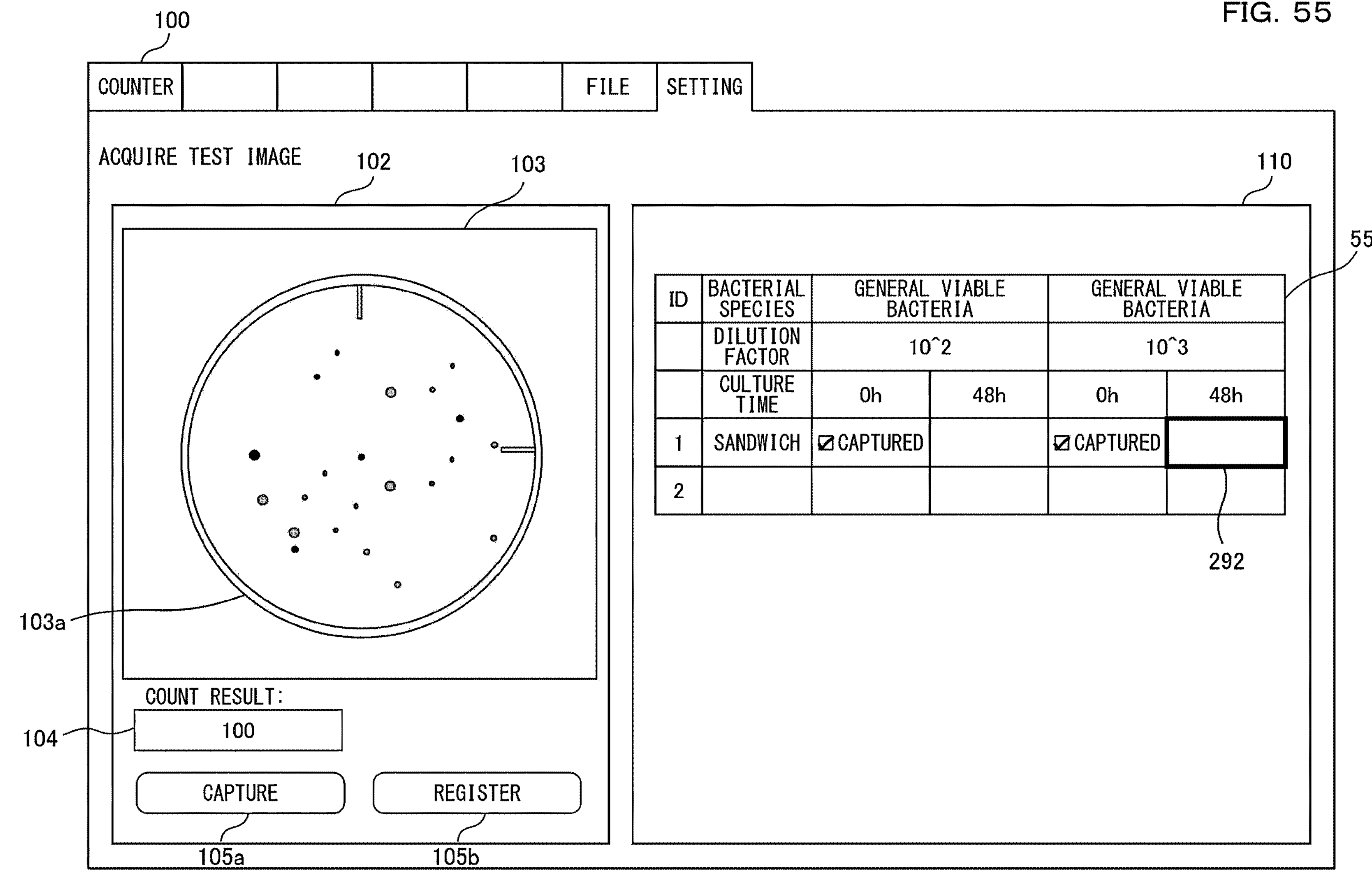
FIG. 55 is a view illustrating a UI for displaying a count result.

FIG. 55 illustrates the UI 100 indicating that a count result has been acquired. As described above, the capture button for re-capturing is assigned to the first software button 105*a* (the first hardware button 8*a*), and the register button is assigned to the second software button 105*b* (the second hardware button 8*b*). When sensing that the register button is pressed, the MCU 30 inputs the count result to the second cell 292 of the count table 55.

Figure 56:
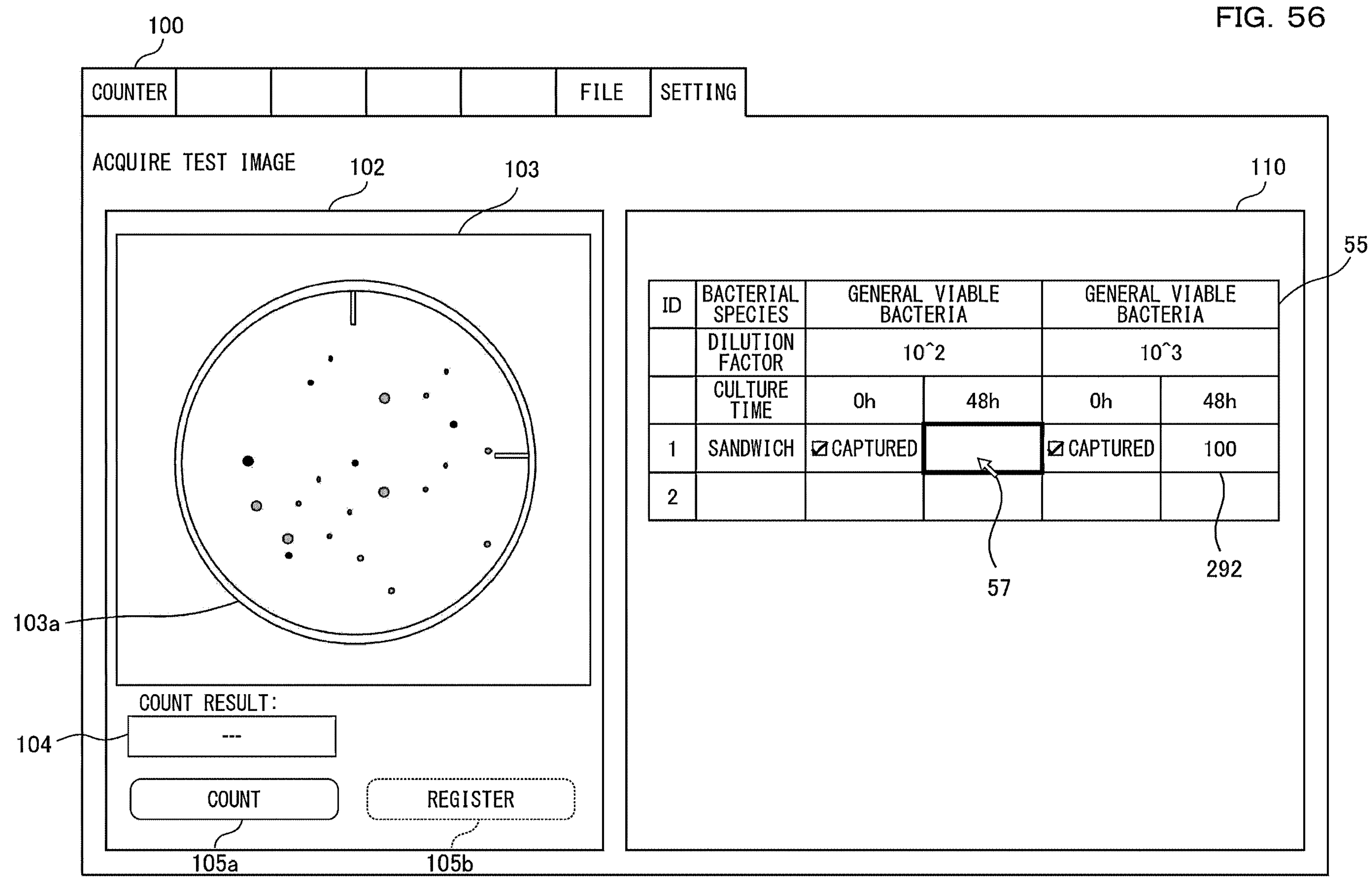
FIG. 56 is a view for describing that the count result has been input to a cell.

FIG. 56 illustrates that the count result has been input to the second cell 292. When the user selects the next cell with the pointer 57, the MCU 30 repeats the above procedure for the next cell.

[Alignment Marker]

FIG. 52 illustrates at least two markers 15*c* and 15*f* given on the inner dish 15*a*. The markers 15*c* and 15*f* may be drawn with a pen or engraved, but other types of markers may be employed.

Figure 57:
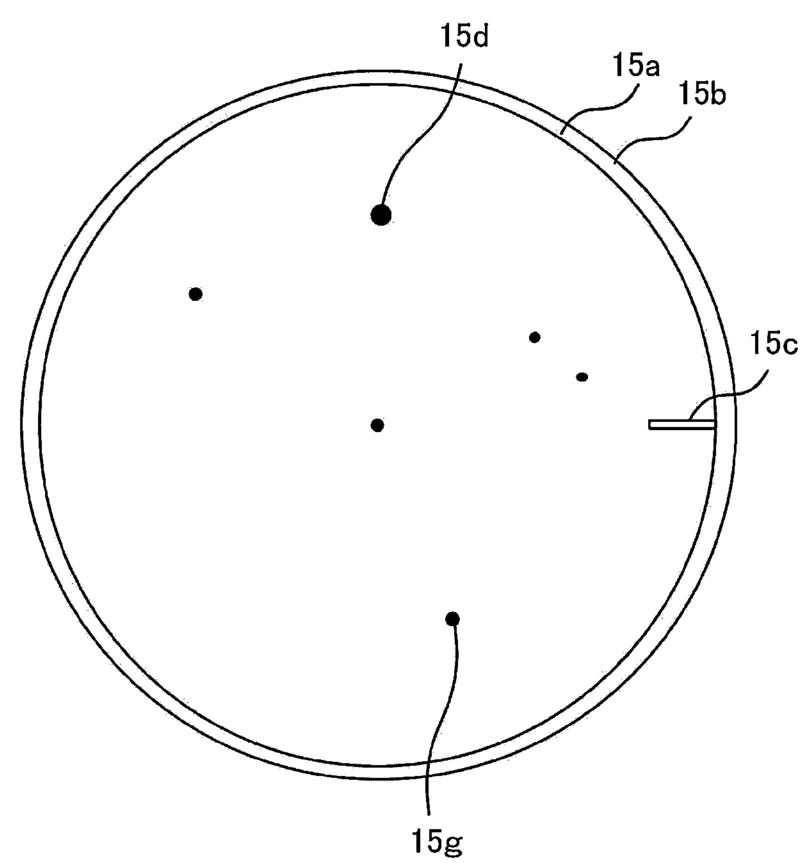
FIG. 57 is a view for describing another example of the plurality of markers.

FIG. 57 illustrates another type of marker 15*g*. The marker 15*g* is a residue itself. Various residues may be present in the inner dish 15*a* or the outer dish 15*b* of the Petri dish 15. In particular, a residue fixed to the inner dish 15*a* or the outer dish 15*b* may be suitable as the marker 15*g*. A residue present in a culture medium can also be used as the marker 15*g*, but in this case, it is necessary to allow the possibility that the marker 15*g* moves due to formation of a colony.

The MCU 30 may binarize the reference image 103*b* and select the largest lump as the marker 15*c*, or may select a residue designated by the user with the pointer 57 from the reference image 103*b* as the marker 15*c*.

[Residue Reduction Algorithm]

(1) First Algorithm

Figure 58:
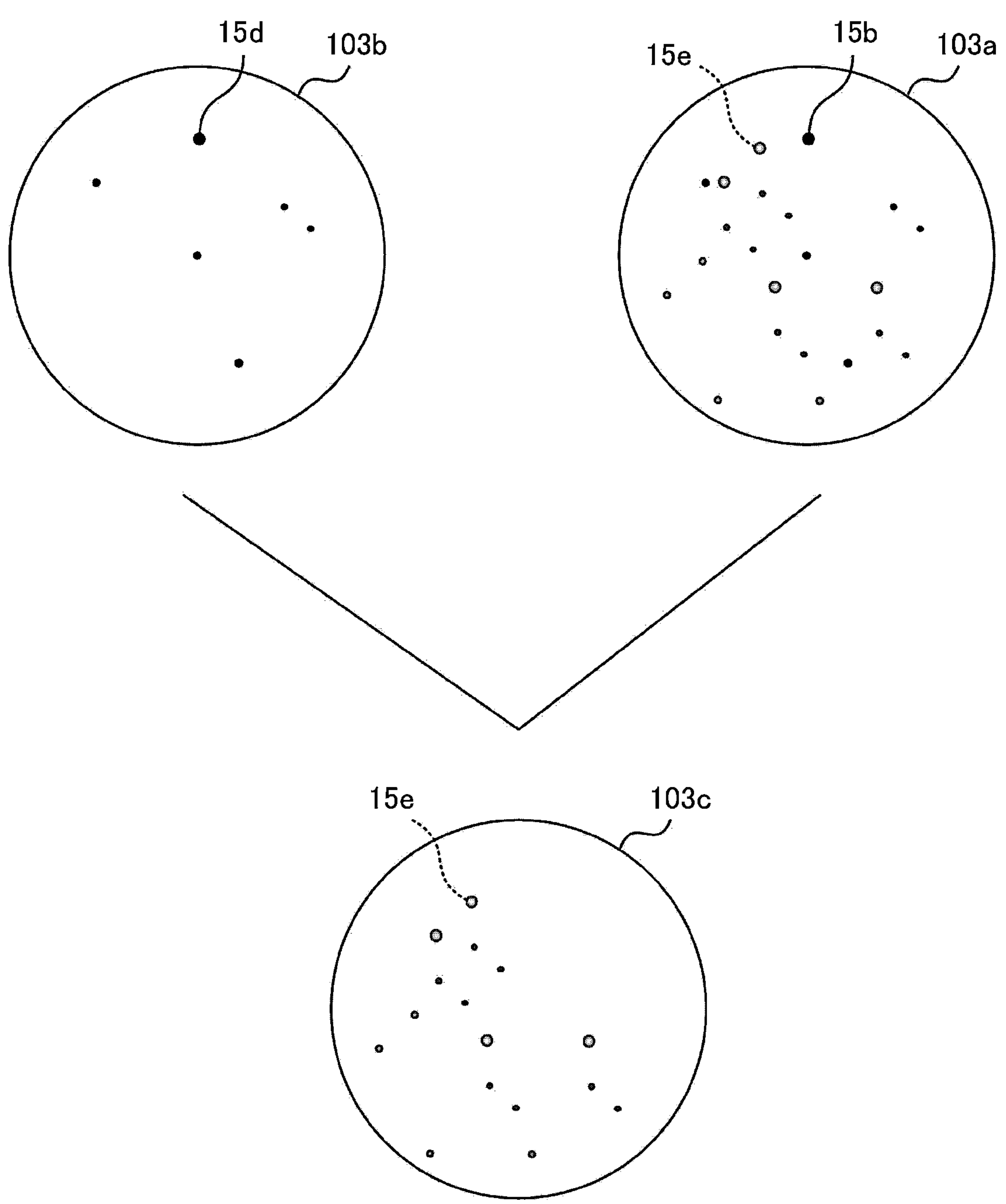
FIG. 58 is a view for describing a first residue reduction algorithm.

FIG. 58 illustrates an example of a residue reduction algorithm. The MCU 30 executes alignment by image processing on the reference image 103*b* and the test image 103*a* associated with the same identification information (for example, Petri dish number) based on markers 15*c*, 15*f*, and 15*g* which are common characteristic portions. For example, displacement amounts in the position and the rotation angle between the reference image 103*b* and the test image 103 a are obtained based on the markers 15*c*, 15*f*, and 15*g* on the reference image 103*b* and the markers 15*c*, 15*f*, and 15*g* on the test image 103*a*. When one of the reference image 103*b* and the test image 103*a* is corrected with the displacement amounts, the position and the rotation angle of the reference image 103*b* coincide with the position and the rotation angle of the test image 103*a*.

Thereafter, the MCU 30 subtracts the binarized reference image 103*b* from the binarized test image 103*a* to create a test image 103*c* for a count, and counts the number of the colonies 15*e* included in the test image 103*c* for a count. Here, since the binarized reference image 103*b* is subtracted from the binarized test image 103*a*, the number of the colonies 15*e* included in the test image 103*a* can be counted with the reduced influence of the residue included in the reference image 103*b*. That is, even if the colonies 15*e* increased by culturing and the residue present at the start of culturing are present in the test image 103*a*, the number of the colonies 15*e* increased by culturing can be selectively counted.

(2) Second Algorithm

Figure 59:
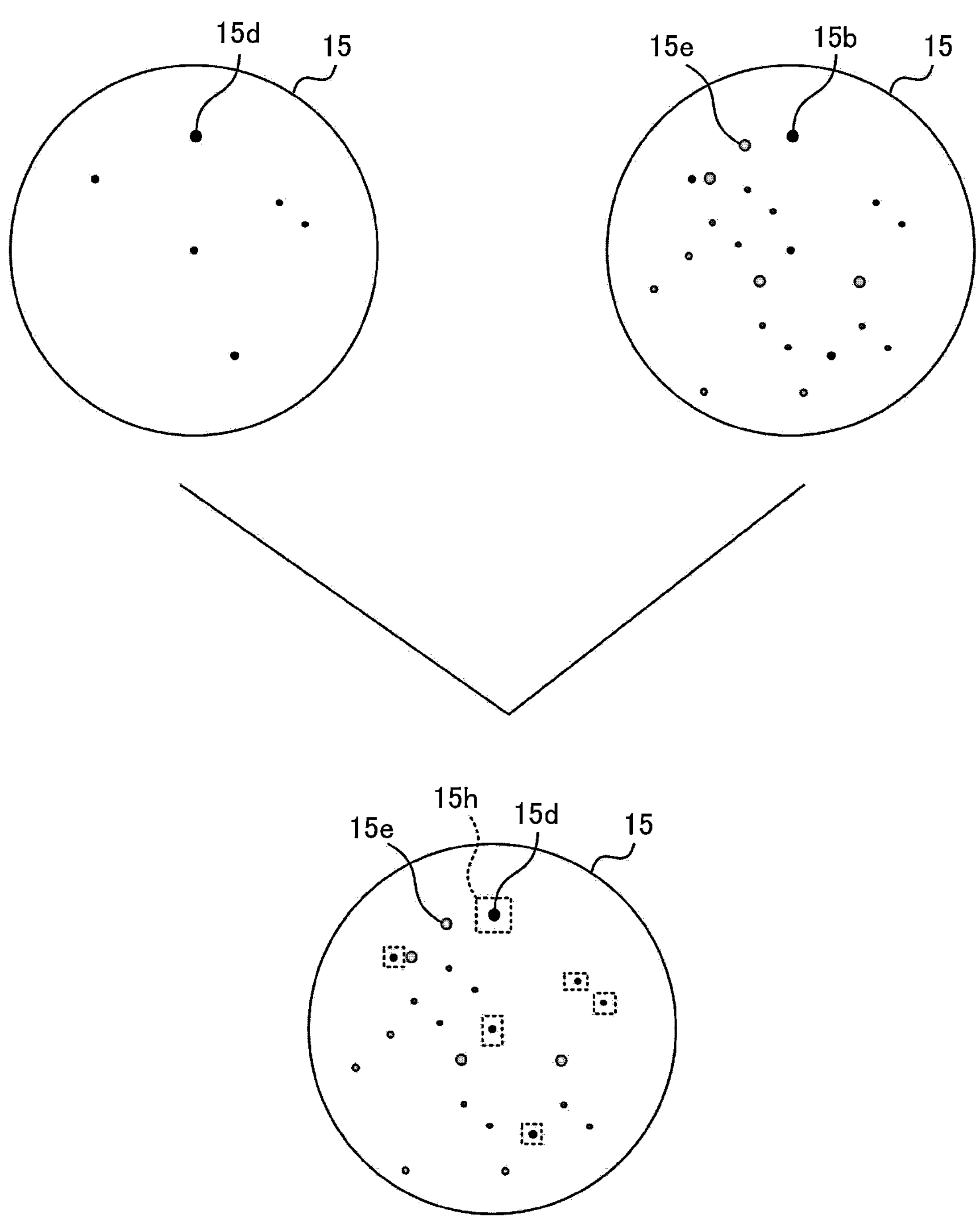
FIG. 59 is a view for describing a second residue reduction algorithm.

FIG. 59 illustrates another example of the residue reduction algorithm. Also in this example, the procedure described in relation to FIG. 58 is used as a procedure up to a calculation of displacement amounts.

The MCU 30 identifies a coordinate of the residue 15*d* from the binarized reference image 103*b*, and corrects the coordinate of the residue 15*d* with the displacement amounts. As a result, a position of the residue 15*d* in the test image 103*a* is identified. The MCU 30 sets a mask 15*h* for the residue 15*d* identified in the test image 103*a*. The MCU 30 excludes pixels on which the mask 15*h* is set from a count of colonies. Since the mask 15*h* is set with respect to the position of the residue 15*d* identified from the reference image 103*b*, the number of the colonies 15*e* included in the test image 103*a* can be counted with the reduced influence of the residue included in the reference image 103*b*.

Although the mask 15*h* is illustrated as a rectangle in FIG. 59, an outline of the residue 15*d* identified from the binarized reference image 103*b* may be adopted as a shape of the mask 15*h*. Alternatively, the mask 15*h* may be larger than the outline of the residue 15*d*. In this case, the outline of the residue 15*d* and the shape of the mask 15*h* are similar to each other.

(3) Third Algorithm

A third algorithm is the simplest. The MCU 30 counts colonies from the binarized reference image 103*b* to obtain a number m of colonies. The MCU 30 counts colonies from the binarized test image 103*a* to obtain a number n of colonies. The MCU 30 subtracts the number m from the number n to obtain a final number (n−m) of colonies.

The third algorithm would not even require alignment by image processing. The third algorithm may be suitable if a count in a short time is required.

[Flowchart]

(1) Case where Count Table is not Used

Figure 60:
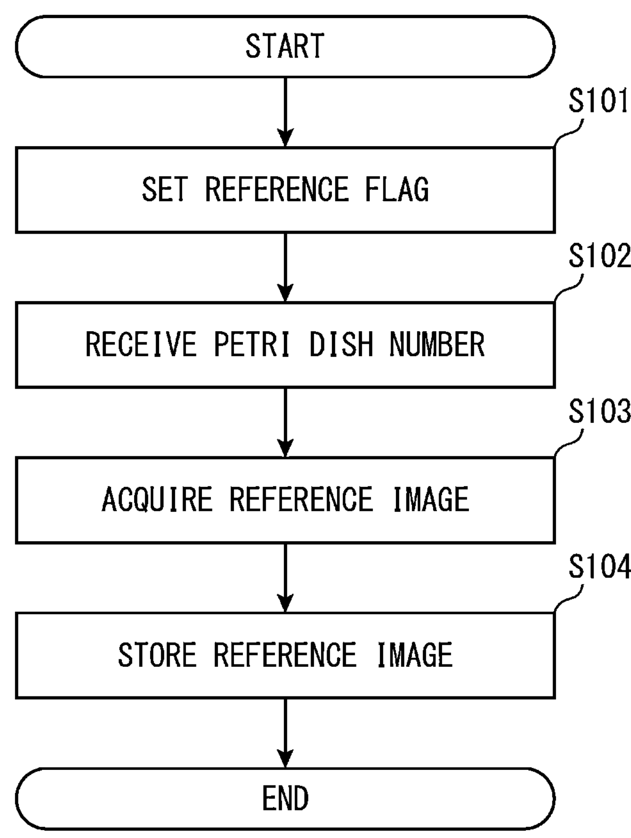
FIG. 60 is a flowchart illustrating a method of acquiring the reference image without using the count table.

FIG. 60 is a flowchart illustrating a method of acquiring the reference image 103*b* without using the count table 55.

In S101, the MCU 30 sets a reference flag. Here, the reference flag is set to “1”. The reference flag being “0” indicates that an image is not a reference image.

In S102, the MCU 30 receives a Petri dish number input by the user through the keyboard 32 or the front camera 10. As described above, the Petri dish number may be decoded from the identification image 221.

In S103, the MCU 30 transmits an imaging command to the head device 1*a*, causes the head device 1*a* to capture the Petri dish 15 before culturing, and acquires the reference image 103*b*.

In S104, the MCU 30 stores the reference image 103*b* received from the head device 1*a* in the storage device 35. Here, the MCU 30 may store the reference flag and the Petri dish number in a header of the reference image 103*b*. The MCU 30 may store a test condition used at the time of acquiring the reference image 103*b* in the storage device 35 in association with the reference image 103*b*.

Figure 61:
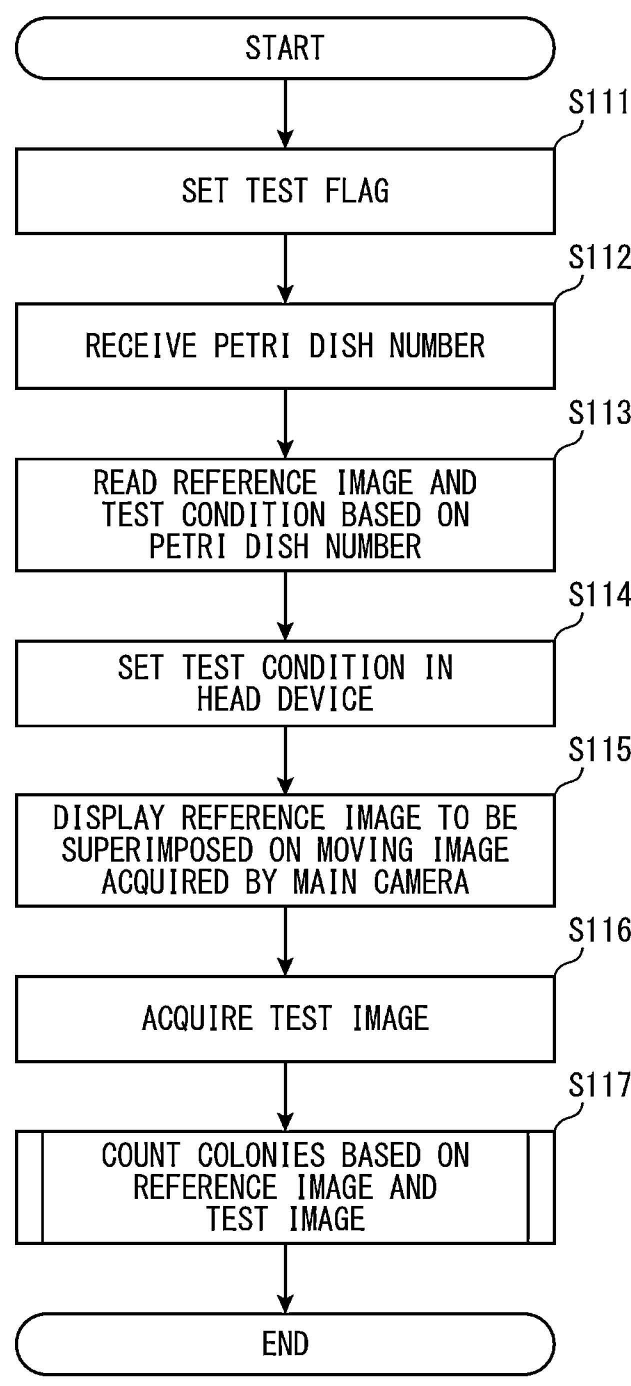
FIG. 61 is a flowchart illustrating a method of acquiring the test image without using the count table and counting colonies.

FIG. 61 is a flowchart illustrating a method of acquiring the test image 103*a* without using the count table 55 and counting colonies.

In S111, the MCU 30 sets a test flag. Here, “1” is set in the test flag. The test flag being “0” indicates that an image is not a test image.

In S112, the MCU 30 receives a Petri dish number input by the user through the keyboard 32 or the front camera 10. As described above, the Petri dish number may be decoded from the identification image 221.

In S113, the MCU 30 reads the reference image 103*b* and the test condition from the storage device 35 based on the Petri dish number. As described above, the Petri dish number, the reference image 103*b*, and the corresponding test condition are stored in the storage device 35 in association with each other.

In S114, the MCU 30 sets the test condition in the head device 1*a*.

In S115, the MCU 30 displays the reference image 103*b* to be superimposed on a moving image acquired by the main camera 11. As a result, it may be easy for the user to manually align the Petri dish 15.

In S116, the MCU 30 transmits the imaging command to the head device 1*a*, causes the main camera 11 to capture the Petri dish 15 after culturing, and acquires the test image 103*a* which is a still image. Note that the MCU 30 may acquire, as the test image 103*a*, a test image for alignment based on the test condition read in S113, and acquire a test image for a count after receiving adjustment of the test condition by the user.

In S117, the MCU 30 counts colonies based on the reference image 103*b* and the test image 103*a*. In a case where the test image for alignment and the test image for a count are acquired as the test image 103*a*, the MCU 30 aligns the Petri dish 15 based on the reference image 103*b* and the test image for alignment, and counts colonies based on the reference image 103*b* and the test image for a count. Count processing may be executed by the MCU 20 or may be executed by the MCU 30.

(2) Case where Count Table is Used

Figure 62:
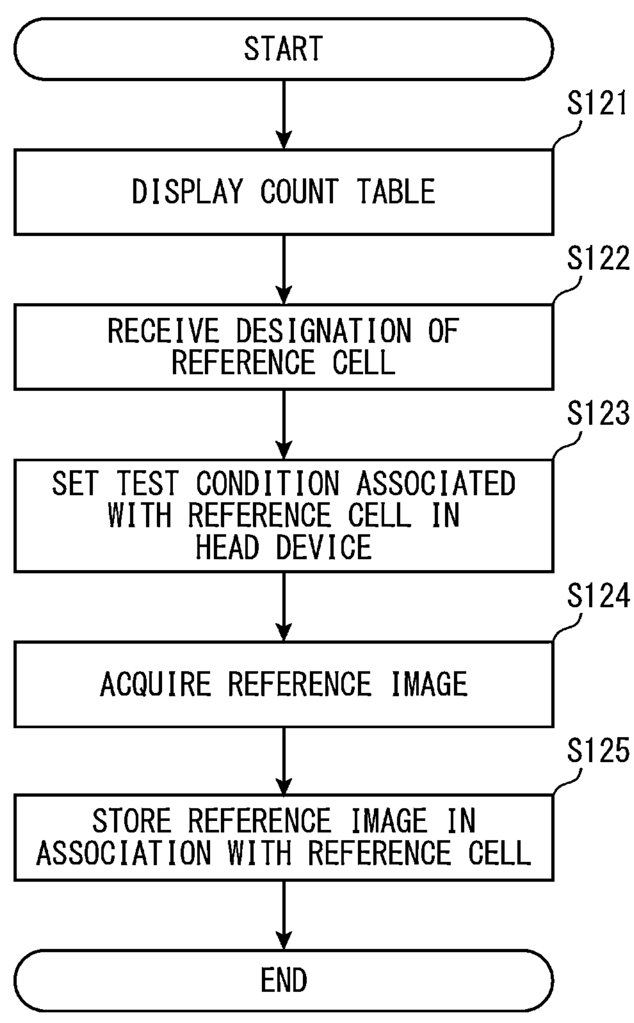
FIG. 62 is a flowchart illustrating a method of acquiring the reference image using the count table.

FIG. 62 is a flowchart illustrating a method of acquiring the reference image 103*b* using the count table 55.

In S121, the MCU 30 displays the count table 55 designated by the user on the display device 37. The count table 55 is designated through, for example, the keyboard 32, the pointing device 33, the front camera 10, or the main camera 11.

In S122, the MCU 30 receives designation of the first cell 291 which is a reference cell. The first cell 291 is designated by, for example, the pointer 57 operated by the pointing device 33.

In S123, the MCU 30 reads a test condition associated with the first cell 291 as the reference cell from the storage device 35 and sets the test condition in the head device 1*a*.

In S124, the MCU 30 transmits an imaging command to the head device 1*a*, causes the head device 1*a* to capture the Petri dish 15 before culturing, and acquires the reference image 103*b*.

In S125, the MCU 30 stores the reference image 103*b* received from the head device 1*a* in the storage device 35 in association with the first cell 291 as the reference cell. In the count table 55, the first cell 291 is associated with identification information (for example, a sample name) of a test individual. That is, the reference image 103*b* is also associated with the identification information (for example, the sample name) of the test individual.

Figure 63:
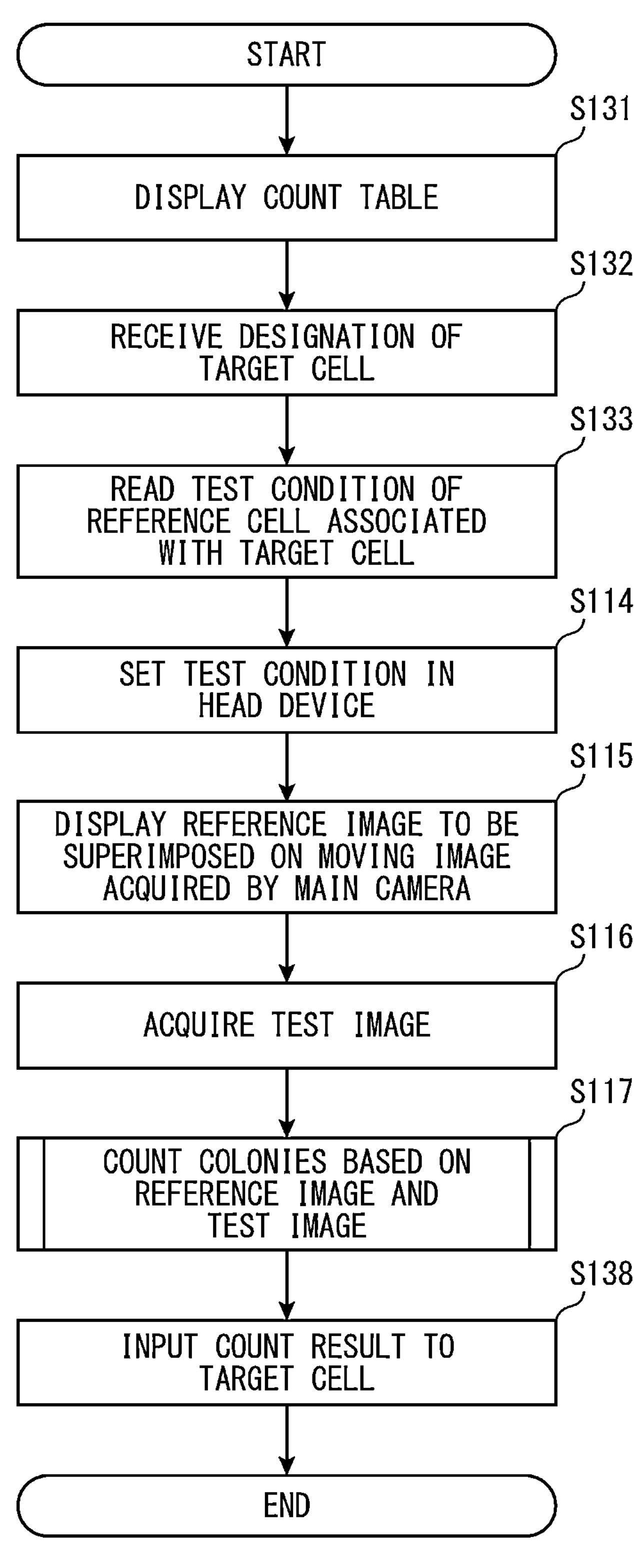
FIG. 63 is a flowchart illustrating a method of acquiring the test image using the count table and counting colonies.

FIG. 63 is a flowchart illustrating a method of acquiring the test image 103*a* using the count table 55 and counting colonies.

In S131, the MCU 30 displays the count table 55 designated by the user on the display device 37. The count table 55 is designated through, for example, the keyboard 32, the pointing device 33, the front camera 10, or the main camera 11.

In S132, the MCU 30 receives designation of a target cell (the second cell 292) in the count table 55. The second cell 292 as the target cell is designated by, for example, the pointer 57 operated by the pointing device 33.

In S133, the MCU 30 reads the test condition of the reference cell (first cell 291) associated with the second cell 292 as the target cell from the storage device 35.

Thereafter, the MCU 30 executes S114 to S117.

In S138, the MCU 30 inputs a count result to the second cell 292 which is the target cell.

(3) Count Processing (Details of S117)

Figure 64:
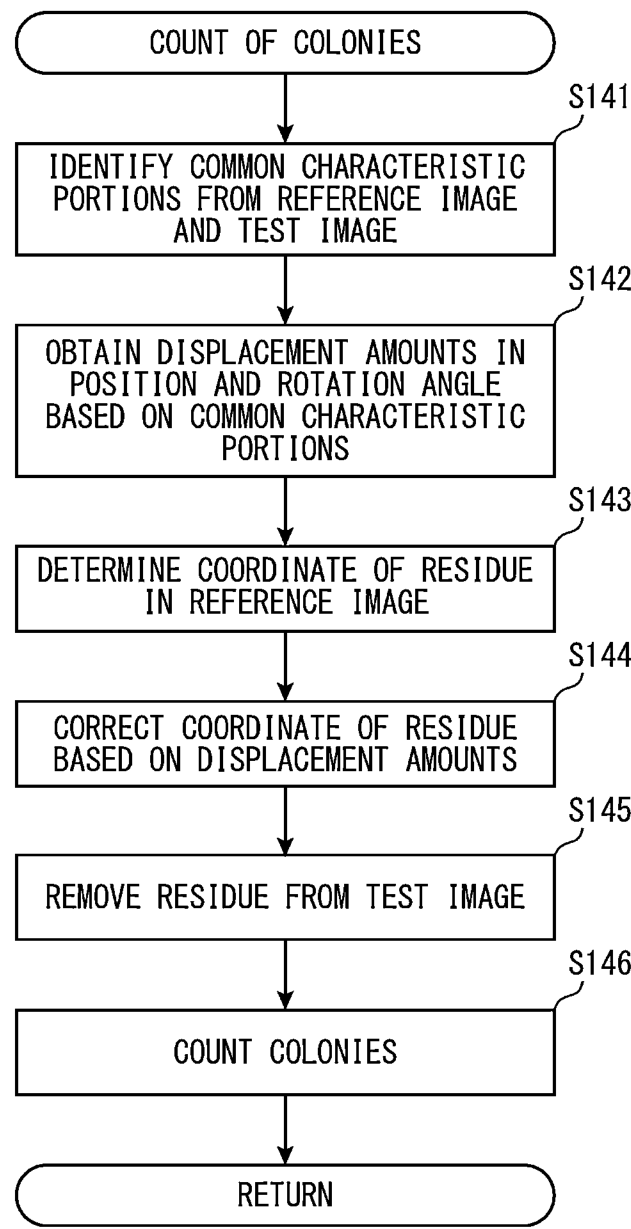
FIG. 64 is a flowchart illustrating a count method according to a first count algorithm.

FIG. 64 is a flowchart illustrating a count method according to the first count algorithm. Count processing may be executed by either the MCU 30 or the MCU 20, but is described here as being executed by the MCU 30 for convenience of description.

In S141, the MCU 30 identifies common characteristic portions from the reference image 103*b* and the test image 103*a*. As described above, the MCU 30 extracts at least two markers from the reference image 103*b* and the test image 103*a* from among the plurality of markers 15*c*, 15*f*, and 15*g*.

In S142, the MCU 30 obtains a displacement amount in a position and a displacement amount in a rotational angle based on the common characteristic portions. That is, the displacement amounts between the reference image 103*b* and the test image 103*a* are obtained.

In S143, the MCU 30 identifies a residue in the reference image 103*b* and obtains a coordinate of the identified residue.

In S144, the MCU 30 corrects the coordinate of the residue based on the displacement amounts. As a result, a position and a size of the residue identified in the reference image 103*b* are converted into a position and a size of the residue in the test image 103*a*.

In S145, the MCU 30 removes the residue from the test image 103*a*. The residue is formed with a plurality of pixels. Therefore, in the test image 103*a*, luminance values of the plurality of pixels constituting the residue are changed to values that are not counted as a colony. In a case where the test image 103*a* is binarized, a pixel indicating a colony is 1, and a pixel that is not the colony is 0. Therefore, in the test image 103*a*, the luminance values of the plurality of pixels constituting the residue are replaced with 0.

In S146, the MCU 30 counts colonies in the test image 103*a* in which the residue has been reduced.

Figure 65:
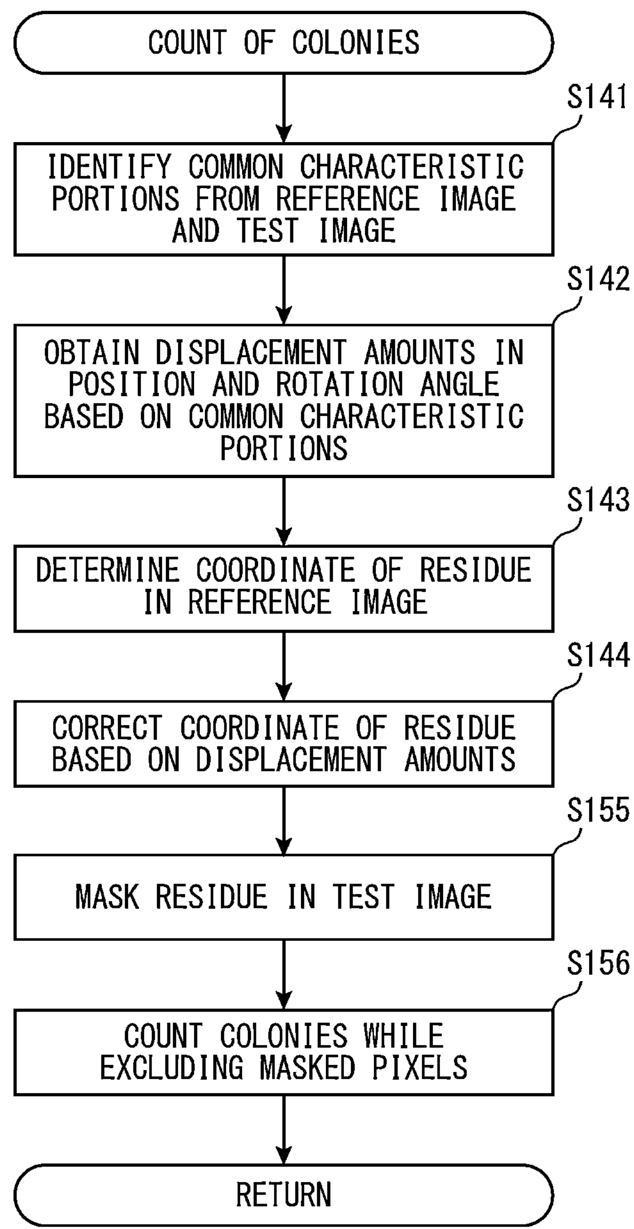
FIG. 65 is a flowchart illustrating a count method according to a second count algorithm.

FIG. 65 is a flowchart illustrating a count method according to the second count algorithm. Count processing may be executed by either the MCU 30 or the MCU 20, but is described here as being executed by the MCU 30 for convenience of description. Note that S145 and S146 in FIG. 64 are replaced with S155 and S156 in FIG. 65, and thus, S155 and S156 will be mainly described.

In S155, the MCU 30 masks a residue in the test image 103*a*. For example, the MCU 30 masks a plurality of pixels constituting the residue in the test image 103*a*. Alternatively, the MCU 30 sets a mask so as to surround the plurality of pixels constituting the residue in the test image 103*a*.

In S156, the MCU 30 counts colonies while excluding the masked pixels in the test image 103*a*.

Figure 66:
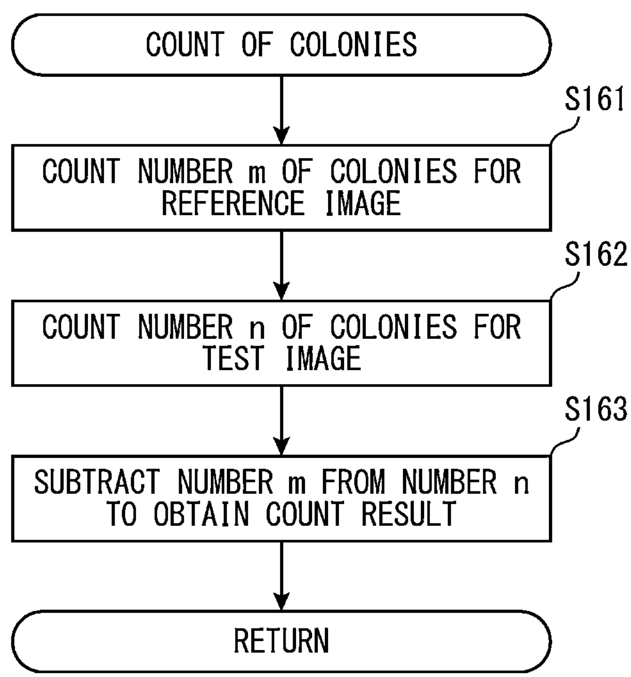
FIG. 66 is a flowchart illustrating a count method according to a third count algorithm.

FIG. 66 is a flowchart illustrating a count method according to the third count algorithm. Count processing may be executed by either the MCU 30 or the MCU 20, but is described here as being executed by the MCU 30 for convenience of description.

In S161, the MCU 30 binarizes the reference image 103*b*, and counts the number m of colonies in the binarized reference image 103*b*.

In S162, the MCU 30 binarizes the test image 103*a*, and counts the number n of colonies in the binarized test image 103*a*.

In S163, the MCU 30 subtracts the number m from the number n to obtain a count result (the number n−m).

<Summary>

[Viewpoint A1]

The storage device 35 is an example of a storage section that stores a count table including a cell to which a count result of each of a plurality of test individuals is input. The MCU 30 and the display control section 36 are an example of a display control section that displays the count table stored in the storage section on the display device 37. The MCU 30, the pointing device 33, and the like are examples of a cell identifying section that identifies a target cell to which a count result is input from among a plurality of the cells included in the count table displayed by the display control section. The MCU 20 or the MCU 30 is an example of a counting instruction section that generates a counting instruction according to an operation of a user. The MCU 30 and the main camera 11 are an example of an acquisition section that acquires a test image that is an image of the test individual based on the counting instruction generated by the counting instruction section. The MCU 20 or the MCU 30 is an example of a counting section that counts colonies included in the test individual based on the test image acquired by the acquisition section. As illustrated in FIGS. 19 and 20, the MCU 20 or the MCU 30 functions as a table management section that reflects the number of the colonies counted by the counting section in the target cell. As a result, burden on the user regarding post-processing on colony counting results is mitigated.

[Viewpoint A2]

The table management section (for example, the MCU 30) may create a count table including an identification information cell, which stores identification information of the test individual, and a count result cell, which is associated with the identification information cell and stores a count result of the number of the colonies for the test individual, and stores the count table in the storage section according to an operation of the user. That is, as illustrated in FIGS. 5 and 16, the count tables 55 and 82 may include the identification information cell that stores the identification information (for example, a sample name) of the test individual and the count result cell that is associated with the identification information cell and stores the count result of the number of the colonies for the test individual. As a result, the user can save time and effort for creating the count table by handwriting.

[Viewpoint A3]

The table management section (for example, the MCU 30) may associate a test condition with the count result cell that stores the count result of the number of the colonies. As a result, it is possible to easily set the test condition when executing a test related to a colony by associating the test condition with the cell in which the count result is stored.

[Viewpoint A4]

The acquisition section may include an illumination section (for example, the ring illumination devices 12 and 13 or the coaxial illumination device 14) that illuminates the test individual and an imaging section (for example, the main camera 11) that captures an image of the test individual illuminated by the illumination section. The test condition may include an illumination condition (for example, an illumination type or brightness) of the illumination section. An appropriate illumination condition varies depending on a bacterial species such as *Escherichia coli* or general viable bacteria, and a type of culture medium (for example, a sheet type medium, a liquid type medium, or a selective medium). Therefore, since the illumination condition is included as the test condition, the illumination condition suitable for each cell can be set. Moreover, the test condition may include an imaging condition (for example, exposure time) of the imaging section. An appropriate imaging condition may vary depending on a culture medium color and a colony color. Since the test condition includes the imaging condition, an appropriate imaging condition can be set for each cell.

[Viewpoint A5]

The illumination section may operate according to either a first illumination mode (for example, a mode of turning on the ring illumination device 12) in which epi-illumination is performed on the test individual or a second illumination mode (for example, a mode of turning on the coaxial illumination device 14) in which transmitted illumination is performed on the test individual from a direction opposing the imaging section. The test condition includes selection of the first illumination mode or the second illumination mode. When the test condition includes designation of an illumination mode, it is possible to select an appropriate illumination mode for each cell.

[Viewpoint A6]

The test condition may include a counting condition to be applied to the counting section. Here, the counting condition may include at least one of a threshold for detecting a colony and a color serving as a reference in detecting the colony. For example, the counting condition may include a threshold for distinguishing a colony from the others (for example, a binarization threshold that affects detection sensitivity) and a color that serves as a reference in counting the colony (for example, a foreground color or a background color). The MCU 20 or the MCU 30 may binarize the test image to count the number of colonies. Thus, the binarization threshold affects the detection sensitivity of the colony. When the binarization threshold is appropriately set, erroneous detection of the colony decreases. Further, if the color of the colony and a color of a culture medium can be appropriately set, the erroneous detection of the colony decreases. When the counting condition is set for each cell, the erroneous detection of the colony may decrease for each cell. Further, a counting algorithm may be appropriately adjustable according to the counting condition.

[Viewpoint A7]

When the counting instruction is input by the user, the counting section (for example, the MCU 20 or the MCU 30) may output an illumination command according to the test condition associated with the target cell to the illumination section. The illumination section illuminates the test individual according to the illumination command. The imaging section captures the image of the test individual illuminated by the illumination section according to the illumination command and generates the test image. The counting section counts the number of colonies based on the test image reflecting the illumination command. As a result, it is possible to count the number of colonies for the test image reflecting the test condition set for each cell.

[Viewpoint A8]

When the identifying section changes the target cell from a first cell to a second cell, the counting section (for example, the MCU 20 or the MCU 30) changes a test condition to be applied to the acquisition section from a first test condition associated with the first cell to a second test condition associated with the second cell. In this manner, when the target cell is changed, the test condition can be changed in conjunction with the change. An appropriate test condition may vary for each cell, that is, for each test individual. If an appropriate test condition is set for each cell in advance, the user can select an appropriate test condition only by selecting a cell.

[Viewpoint A9]

The sample DB 40 is a database for assisting creation of the count tables 55 and 82. The MCU 30 may function as a registration section that registers data in the database. The count tables 55 and 82 may have a plurality of row elements each including the identification information cell and the count result cell. The registration section (MCU 30) may be configured to register a row element included in the count table 82 in which the count result has been input to the count result cell in the database. Here, the row element includes a cell and a test condition associated with the cell. The table management section (MCU 30) may create a new count table based on a row element designated by the user among the plurality of row elements held in the database. For example, a cell constituting the row element designated by the user and a test condition associated with the cell are copied to the new count table. Further, the count result that has been stored in the cell may be deleted when being registered in the sample DB 40. Since row elements adoptable as row elements of a count table are stored as the database in advance in this manner, the user can easily create the new count table.

[Viewpoint A10]

The count tables 55 and 82 may have a plurality of column elements. The plurality of column elements may be associated with each combination. Here, the combination is a combination of a culture condition (for example, a dilution factor or a culture time) of the test individual and a bacterial species (for example, a general viable bacteria or a *Escherichia coli*). Each of the column elements has a different combination of the culture condition and the bacterial species. For example, a first column element and the second column element are different in at least one of the culture condition and the bacterial species. As a result, for a certain test individual, cells corresponding to a plurality of combinations formed with various culture conditions and various bacterial species can also be grouped into one row.

[Viewpoint A11]

The table management section (for example, the MCU 30) may determine whether or not a row element (designated row element) designated by the user among the plurality of row elements held in the database is included in a new count table. When it is determined that the designated row element is not included in the count table, the MCU 30 may determine whether or not the designated row element includes a cell of a new column element not included in the count table. When it is determined that the designated row element includes a cell of a new column element, the MCU 30 adds the new column element to the new count table. On the other hand, when the designated row element is already included in the count table or the designated row element does not include a cell of a new column element, the column element is not added to the count table. As a result, duplication of the row elements and duplication of the column elements in a table table are suppressed, and the table table can be made compact.

[Viewpoints A12 and A13]

The database may include a plurality of row elements in which a parent-child relationship is defined. The parent-child relationship may be a relationship in which a finished product is a parent and ingredients constituting the finished product are children. In some cases, it is necessary to count colonies in a culture result of the entire product (finished product) and to count colonies in culture results of individual ingredients constituting the product. Therefore, since the parent-child relationship is defined in advance, the user's man-hours at the time of creating the count table are reduced. For example, when a certain finished product (for example, sandwich) is selected, ingredients (for example, ham and lettuce) may be presented in a selectable manner.

[Viewpoint A14]

The table management section (for example, the MCU 30) may collectively add the plurality of row elements in which the parent-child relationship is defined to a new count table. As a result, the burden on the user at the time of creating the count table may be further mitigated.

[Viewpoint A15]

When application of statistical processing is instructed, the table management section (for example, the MCU 30) may create the count table to include n row elements respectively storing count results of n culture vessels, which culture the same test individual, and at least one row element storing statistical processing results of the n row elements. According to FIG. 11, a case of n=2 is described. Here, n may be three or more. This may make it easy to create the count table for executing the statistical processing such as averaging.

[Viewpoint A16]

As illustrated in FIG. 16, the display control section (for example, the MCU 30) may cause the display device 37 to display the test image and the count table side by side (simultaneously in parallel). The cell identifying section (for example, the MCU 30) may identify the target cell according to selection of the user from among the plurality of cells included in the count table displayed on the display device 37 together with the test image. The display control section (for example, the MCU 30) may cause the display device to display the count table in which the number of the colonies counted by the counting section has been reflected on the target cell together with the test image. As a result, the cell in which the count result is stored can be easily selected.

[Viewpoint A17]

As illustrated in FIG. 25, the display control section (for example, the MCU 30) may display a first control object (for example, the tab 123) for setting an illumination condition included in the test condition associated with the target cell and a second control object (for example, the tab 124) for setting a counting condition included in the test condition on the display device 37. As a result, the test condition associated with the cell can be easily changed. Moreover, when sensing that the first control object (for example, the tab 123) has been operated by the user, the display control section (for example, the MCU 30) may display a setting screen (for example, the confirmation screen 110) for setting the illumination condition on the display device. When sensing that the second control object (for example, the tab 124) has been operated by the user, the display control section (for example, the MCU 30) may display a setting screen (for example, the setting screen 120) for setting the counting condition on the display device.

[Viewpoint A18]

The display control section (for example, the MCU 30) may display, on the display device 37, a third control object (for example, the first software button 105*a*) for instructing the counting section to execute counting and a fourth control object (for example, the second software button 105*b*) for instructing the counting section to register the count result in the target cell. As a result, the user can easily instruct the count and instruct the registration of the count result.

[Viewpoint A19]

When sensing that the third control object has been operated by the user, the display control section (for example, the MCU 30) may assign the third control object from a control object (for example, the count button) for instructing counting to a control object (for example, the capture button or the re-capture button) for instructing the acquisition section to acquire the test image. That is, the MCU 30 may change a command issued by operating the third control object from a command for instructing the counting to a command for instructing the acquisition of the test image. As a result, the number of operable buttons is reduced, and the user can easily determine what needs to be operated now.

[Viewpoint A20]

As illustrated in FIG. 18, when the third control object is assigned to the control object (for example, the count button) for instructing the counting, the display control section (for example, the MCU 30) may display the fourth control object (for example, the register button) so as not to be operable by the user. As illustrated in FIG. 19, when the third control object assigned to the control object for instructing the counting is operated, a counting result is acquired. When the counting result is acquired, the display control section (for example, the MCU 30) may assign the third control object to the control object (for example, the capture button) for instructing the acquisition section to acquire the test image, and change the fourth control object (for example, the register button) to be operated by the user. That is, when the command for instructing the counting is assigned to the third control object, the fourth control object may be displayed so as not to be operated by the user. Moreover, when the third control object to which the command for instructing the counting is assigned is operated and the count result is acquired, the command for instructing the acquisition section to acquire the test image may be assigned to the third control object, and the display of the fourth control object may be changed so as to be operated by the user. As a result, the user can easily determine what needs to be operated now.

[Viewpoint A21]

As illustrated in FIGS. 19 and 20, when the fourth control object (for example, the register button) is operated, the display control section (for example, the MCU 30) may register the count result in the target cell and change the fourth control object again so as not to be operated by the user. Here, the cell identifying section changes the target cell to the next cell. As illustrated in FIGS. 20 and 18, when the third control object (for example, the capture button) to which the command for instructing the acquisition section to acquire the test image has been assigned is operated, the display control section (for example, the MCU 30) may cause the acquisition section to acquire the test image, and assign the command for instructing the counting to the third control object (for example, the count button). As a result, the user can easily determine what needs to be operated now.

[Viewpoint A22]

The head device 1*a* may further include, for example, a first hardware button and a second hardware button provided on a housing of the colony counting device. The same function may be assigned to the first hardware button and the third control object, and the same function may be assigned to the second hardware button and the fourth control object. As a result, it is possible to link the hardware button and the software button. In a case where the user is gazing at the Petri dish 15 set in the head device 1*a*, an instruction can be input by the hardware button of the head device 1*a*. That is, the user can easily input the instruction without moving the line of sight to the display device 37 of the PC 1*b* and operating the pointing device 33. On the other hand, in a case where the user is gazing at the test image displayed on the PC 1*b*, shifting the line of sight to the hardware button and pressing the hardware button may reduce work efficiency. Therefore, in this case, the software button is displayed on the display device 37 so that the user can easily and accurately operate the button.

[Viewpoint A23]

The application program 39 is an example of a program executed in a control device that controls a colony counting device. The application program 39 causes the PC 1*b* to execute:

storing a count table, which includes a cell to which a count result of each of a plurality of test individuals is input, in a storage section;

displaying the count table stored in the storage section on a display device;

identifying a target cell to which a count result is input from among a plurality of the cells included in the count table displayed on the display device;

acquiring a test image that is an image of the test individual;

acquiring the number of colonies included in the test individual based on the test image acquired by an acquisition section according to a counting instruction input by a user; and reflecting the number of colonies on the target cell.

[Viewpoint A24]

According to the above example, a control method for controlling the colony counting device 1 is provided. The control method includes:

storing a count table, which includes a cell to which a count result of each of a plurality of test individuals is input, in a storage section;

displaying the count table stored in the storage section on a display device;

identifying a target cell to which a count result is input from among a plurality of the cells included in the count table displayed on the display device;

acquiring a test image that is an image of the test individual;

counting colonies included in the test individual based on the test image acquired by an acquisition section according to a counting instruction input by a user; and reflecting the number of the counted colonies on the target cell.

[Viewpoint B1]

The storage device 35 functions as a storage section that stores a count table and identification information associated with the count table that includes a cell to which a colony count result for a test individual is input. The MCU 30 and the MCU 20 function as an identification information acquisition section that acquires identification information from an identification image (for example, one-dimensional symbol or two-dimensional symbol) obtained by encoding the identification information. The MCU 30 functions as a table management section that reads the count table associated with the identification information acquired by the acquisition section from the storage section. Moreover, the MCU 30 functions as a cell identifying section that identifies a target cell to which a count result is input from among a plurality of the cells included in the count table read by the table management section. The MCU 20 or the MCU 30 functions as a counting instruction section that generates a counting instruction according to an operation of a user. The main camera 11 functions as a first imaging section that generates a test image that is an image of the test individual based on the counting instruction generated by the counting instruction section. The MCU 20 or the MCU 30 functions as a counting section that counts colonies included in the test individual based on the test image generated by the first imaging section. The table management section (for example, the MCU 30) is configured to reflect the number of the colonies counted by the counting section on the target cell identified by the cell identifying section. Since the count table to which the count result is input is identified from the identification image and displayed in this manner, the burden on the user regarding the counting of colonies is mitigated.

[Viewpoint B2]

The identification information acquisition section may be configured to acquire the identification information from an identification image captured by the first imaging section (for example, the main camera 11). In this manner, an imaging section that captures an image of the test individual may also be used as an imaging section that captures the identification image.

[Viewpoint B3]

The identification information acquisition section may include a second imaging section. The front camera 10 is an example of the second imaging section that captures an identification image. The identification information acquisition section (for example, the MCUs 20 and 30) may be configured to acquire the identification information from the identification image captured by the second imaging section.

[Viewpoint B4]

The second imaging section (for example, the front camera 10) may be configured to capture an additional image that is at least one of an appearance of the test individual, an appearance of the test individual packaged by a packaging body (for example, a packaging bag or a product package), or information printed on the packaging body. The storage section (for example, the storage device 35) may store at least one of the additional image and additional information acquired from the additional image in association with the target cell. As described above, the count table may include the cell to which the count result is input and a cell (for example, a remark cell or a cell of a free column) capable of storing an image or the like. In this case, the additional image (for example, a product appearance) and the additional information (for example, a product code) may be stored in or be associated with the latter cell. The user can easily grasp which test individual has been used to obtain the count result by referring to the additional information or the additional image stored in association with the target cell.

[Viewpoint B5]

The count table may include an additional cell (for example, the remark cell or the cell of the free column) that holds at least one of the additional image and the additional information. The user can easily grasp which test individual has been used to obtain the count result by referring to the additional information or the additional image held in the additional cell.

[Viewpoint B6]

As illustrated in FIGS. 29 and 40, the MCU 30 and the pointer 57 may function as a selection section that selects one additional cell from a plurality of additional cells existing in the count table. Moreover, the MCU 30 may function as an additional information registration section that registers at least one of the additional image and the additional information in the one additional cell selected by the selection section. As a result, the user can register the additional image or the additional information to a desired cell in the count table.

[Viewpoint B7]

The MCU 30 may function as an obtaining section that obtains identification information (for example, a sample name or a Petri dish number) of the test individual associated with the target cell. The storage section may be configured to store the test image of the test individual captured by the first imaging section according to the counting instruction input by the user in association with the identification information of the test individual. In the related art, a lot of man-hours are required to correctly record a relationship between the test image and the test individual. For example, it is conceivable to acquire a test image with a digital camera, but in this case, it may be necessary to manually associate the test image with identification information of the test individual. Further, the manual association causes human error. In the present embodiment, the MCU 30 identifies the target cell, and associates the test image of the test individual with the identification information of the test individual that is associated with the target cell. Therefore, man-hours required by the user is reduced as compared with the related art, and the relationship between the test image of the test individual and the identification information of the test individual can be correctly recorded.

[Viewpoint B8]

As illustrated in FIG. 33, the MCU 30 may function as a report generation section that generates a report including the identification information of the test individual, the number of colonies counted by the counting section, and the test image of the test individual. As a result, the user can intuitively grasp which sample has been measured to obtain the result.

[Viewpoint B9]

Unique cell identification information may be given to a cell to which the number of colonies is input in the count table. As illustrated in FIG. 41, the MCU 30 may print the identification image 221 obtained by encoding the unique cell identification information on the seal 270 (resin or paper having an adhesive surface) by the printer 38. The user attaches the seal 270 to a side surface of the Petri dish 15. Note that the Petri dish number may be used as the unique cell identification information. The identification information acquisition section (for example, the MCU 30, the front camera 10, or the main camera 11) may be configured to acquire the cell identification information. The cell identifying section (for example, the MCU 30) may identify the target cell based on the cell identification information acquired by the identification information acquisition section. As a result, the user can save time and effort for designating the target cell. Moreover, the target cell corresponding to the test individual may be accurately identified.

[Viewpoint B10]

As illustrated in FIG. 28, the identification information acquisition section (for example, the MCU 30) may acquire user authentication information by the first imaging section or the second imaging section. As a result, a dedicated camera and a code reader for user authentication can be omitted.

[Viewpoint B11]

As illustrated in FIG. 27, the identification information acquisition section (for example, the MCU 30, the front camera 10, or the main camera 11) may be configured to acquire the identification information from an identification image printed on a print medium (for example, the test list 220).

[Viewpoint B12]

The MCU 30 may function as a data creation section that creates data of a test list including s count table and identification information associated with the count table.

[Viewpoint B13]

The identification information acquisition section (for example, the MCU 30, the front camera 10, or the main camera 11) may be configured to acquire the identification information from an identification image displayed on the terminal device 1*c*. As a result, it is possible to reduce paper media.

[Viewpoint B14]

The communication circuit 34 is an example of a communication section that communicates with the terminal device 1*c* and transmits the identification image to the terminal device 1*c*.

[Viewpoint B15]

The MCU 30 may function as a creation section that creates a count table in accordance with a user operation and causes the storage section to store the count table.

[Viewpoint B16]

The creation section (for example, the MCU 30) may associate a test condition with a cell storing the count result of the number of colonies. The first imaging section may be configured to capture an image of the test individual according to the test condition (for example, an exposure time, an illumination type, or brightness).

[Viewpoint B17]

The colony counting device 1 may further include a housing (for example, the upper unit 2, the support unit 3, and the lower unit 4) having a first imaging section.

The housing may include: the stage 5 that holds the Petri dish 15 accommodating a test individual; an illumination section (for example, the ring illumination devices 12 and 13 or the coaxial illumination device 14) that illuminates the test individual; and a receiving section (for example, the first hardware button 8*a*) that receives a counting instruction input by a user.

[Viewpoint B18]

The colony counting device 1 may further include a housing (for example, the upper unit 2, the support unit 3, and the lower unit 4) including a first imaging section and a second imaging section. The housing may include: the stage 5 that holds the Petri dish 15 accommodating a test individual; an illumination section (for example, the ring illumination devices 12 and 13 or the coaxial illumination device 14) that illuminates the test individual; and a receiving section (for example, the first hardware button 8*a*) that receives a counting instruction input by a user. Moreover, the housing may have the recess 4*a*. The second imaging section (for example, the front camera 10) may be arranged in the recess. The receiving section (for example, the first hardware button 8*a*) may be arranged in an operation section (the operation section 8) between the stage and the recess. As a result, it is possible to easily input the counting instruction.

[Viewpoint B19]

When the receiving section (for example, the first hardware button 8*a*) receives an imaging instruction when the colony counting device 1 is in a first state, the first imaging section may execute imaging. When the receiving section receives the imaging instruction when the colony counting device 1 is in a second state different from the first state, the second imaging section may execute imaging. As a result, it is possible to instruct the different imaging sections to execute the imaging even though the same operation is performed on the single receiving section. The first state is, for example, a state in which a count table has already been identified. The second state is, for example, a state in which a count table has not yet been identified.

[Viewpoint B20]

A program executed in a processor that controls a colony counting device, the program causing the processor to execute:

causing a storage section to store a count table and identification information associated with the count table that includes a cell to which a colony count result for a test individual is input;

acquiring the identification information from an identification image obtained by encoding the identification information;

reading the count table associated with the acquired identification information from the storage section;

identifying a target cell to which a count result is input from among a plurality of the cells included in the read count table;

generating a counting instruction according to an operation of a user;

generating a test image that is an image of the test individual based on the generated counting instruction;

counting colonies included in the test individual based on the generated test image; and reflecting the number of the counted colonies on the identified target cell.

[Viewpoint B23]

A control method executed in a processor that controls a colony counting device, the control method including:

storing a count table and identification information associated with the count table in a storage section, the count table including a cell to which a colony count result for a test individual is input;

acquiring the identification information from an identification image obtained by encoding the identification information;

reading the count table associated with the acquired identification information from the storage section;

identifying a target cell to which a count result is input from among a plurality of the cells included in the read count table;

generating a counting instruction according to an operation of a user;

generating a test image that is an image of the test individual based on the generated counting instruction;

counting colonies included in the test individual based on the generated test image; and reflecting the number of the counted colonies on the identified target cell.

[Viewpoint C1]

The main camera 11 functions as an imaging section that captures a test individual and generates an image of the test individual. The MCUs 20 and 30 function as a registration section that registers the image of the test individual in an initial state generated by the imaging section as the reference image 103*b*. The MCUs 20 and 30 function as a residue identifying section that identifies a residue included in the reference image 103*b* registered by the registration section and identifies a position of the residue in the test image 103*a* corresponding to the residue included in the reference image 103*b* based on a displacement of each of two or more common characteristic portions (for example, the markers 15*c*, 15*g*, and 150 between the reference image 103*b* and the test image 103*a* that is generated by the imaging section and an image of the test individual after culturing. The MCUs 20 and 30 function as a counting section that counts the number of colonies included in the test image 103*a* while excluding the residue from a count as a colony based on the position of the residue identified by the residue identifying section. As a result, the counting accuracy of colonies is improved.

Note that the display device 37 functions as a display section that displays at least one of the reference image 103*b* and the test image 103*a*. The MCUs 20 and 30 are examples of a characteristic portion identifying section that identifies the two or more common characteristic portions (for example, the markers 15*c*, 15*g*, and 150 from the reference image 103*b* and the test image 103*a*. The MCUs 20 and 30 function as the counting section that aligns a position and a rotation angle of the reference image 103*b* and a position and a rotation angle of the test image 103*a* based on the two or more common characteristic portions and counts the number of colonies not included in the reference image 103*b* but included in the test image 103*a*. That is, the MCUs 20 and 30 may function as the counting section that identifies the two or more common characteristic portions from the reference image and the test image, aligns the position and rotation angle of the reference image and the position and rotation angle of the test image based on the two or more identified common characteristic portions, and counts the number of colonies while excluding at least one residue of residues and colonies included in the test image based on the test image after the alignment and the position of the residue included in the reference image.

[Viewpoint C2]

The storage device 35 functions as a storage section that stores the reference image 103*b* and identification information of the test individual indicated by the reference image 103*b* in association with each other when the reference image 103*b* is registered by the registration section. The MCU 30, the keyboard 32, the pointing device 33, the main camera 11, and the front camera 10 function as a receiving section that receives an input of the identification information of the test individual for reading the reference image 103*b* registered by the registration section. The residue identifying section (for example, the MCU 30) may identify the position of the residue in the test image 103*a* corresponding to the residue included in the reference image 103*b* associated with the identification information of the test individual received by the receiving section. In this manner, the reference image 103*b* and the test image 103*a* can be easily associated by using the identification information of the test individual. That is, capturing of the reference image 103*b* and capturing of the test image 103*a* can be easily associated by using the identification information of the test individual.

Note that the MCU 30, the keyboard 32, the pointing device 33, the main camera 11, and the front camera 10 are examples of the receiving section that receives the input of the identification information (for example, a Petri dish number) of the test individual. The Petri dish number is merely an example, and identification information including characters and symbols other than numerical values may be adopted. The storage device 35 functions as the storage section that stores the reference image 103*b* in association with the identification information of the test individual received by the receiving section. The MCU 30 functions as the registration section that registers the identification information of the test individual received by the receiving section and the reference image in the storage section in association with each other. As exemplified in S112 and S132, the receiving section may be configured to receive an input of the identification information of the test individual again before the counting section starts counting the number of colonies. As illustrated in S117, the counting section may be configured to read the reference image 103*b* associated with the identification information of the test individual received by the receiving section, and count the number of colonies not included in the reference image 103*b* but included in the test image 103*a* using the reference image 103*b* and the test image 103*a* acquired by the imaging section. That is, the counting section may be configured to count the number of colonies using the reference image and the test image while excluding at least one residue included in the test image.

[Viewpoint C3]

The MCU 30 and the UI 300 are examples of a setting section that sets an imaging condition in the imaging section. The storage section (for example, the storage device 35) is configured to store the imaging condition applied to the imaging section at the time of capturing an image of the test individual before culturing in association with the identification information of the test individual. The registration section (for example, the MCU 30) is configured to store the imaging condition applied to the imaging section at the time of capturing the image the test individual before culturing in the storage section in association with the identification information of the test individual. The setting section (for example, the MCU 30) may be configured to read the imaging condition (for example, an exposure time) associated with the identification information of the test individual received again by the receiving section after culturing of the test individual from the storage section, and set the imaging condition in the imaging section. That is, the imaging section captures an image of the test individual after culturing according to the imaging condition set by the setting section and acquires a test image for counting colonies. As a result, the capturing of the reference image 103*b* and the capturing of the test image 103*a* can be easily associated through the identification information of the test individual. Since the capturing is executed under the same condition, an influence of the residue may be accurately reduced.

[Viewpoint C4]

The ring illumination devices 12 and 13 and the coaxial illumination device 14 are examples of an illumination section that illuminates the test individual. The setting section (for example, the MCU 30 or the UI 300) is configured to set an illumination condition for the illumination section. The storage section (for example, the storage device 35) may be configured to store the illumination condition (for example, an illumination type or brightness) set in the illumination section at the time of capturing an image of the test individual before culturing in association with the identification information of the test individual. That is, the registration section (for example, the MCU 30) registers, in the storage section, the illumination condition set in the illumination section at the time of capturing the image of the test individual before culturing in association with the identification information of the test individual. The setting section (for example, the MCU 30) may be configured to read the illumination condition associated with the identification information of the test individual received again by the receiving section after culturing of the test individual from the storage section and set the illumination condition in the illumination section. The imaging section captures an image of the test individual in a state in which the test individual after culturing is illuminated according to the illumination condition set by the setting section and acquires a test image for counting colonies. As a result, since the capturing is executed under the same illumination condition, an influence of the residue may be accurately reduced.

[Viewpoint C5]

As illustrated in FIG. 52 and the like, at least one characteristic portion of the two or more common characteristic portions may be a marker given to a container accommodating the test individual. That is, the residue identifying section (for example, the MCU 30) may recognize a marker given on a peripheral edge portion of an upper surface or a lower surface of a cylindrical transparent container accommodating the test individual as the at least one characteristic portion of the two or more common characteristic portions. As a result, two images are accurately aligned. As a result, the influence of the residue may be accurately reduced. Note that there is a case where reducing the influence of the residue fails when the two markers 15*c* and 15*f* are present on a diameter of the Petri dish 15. In this case, it is sufficient to provide a third marker at a position not overlapping with a straight line connecting the markers 15*c* and 15*f*.

[Viewpoint C6]

As illustrated in FIG. 52, the marker may be a marker drawn on the container (for example, inner dish 15*a*) with a pen, a marker engraved on the container, or a marker attached to the container. Further, the residue identifying section (for example, the MCU 30) may recognize a linear marker as the at least one characteristic portion.

[Viewpoint C7]

The container (for example, the Petri dish 15) may have an inner container (for example, the inner dish 15*a*) and an outer container (for example, the outer dish 15*b*) serving as a lid of the inner container. In this case, the marker is provided on the inner container. The counting section (for example, the MCU 30) aligns a position and a rotation angle of the inner container included in the reference image with a position and a rotation angle of the inner container included in the test image based on the two or more common characteristic portions provided in the inner container. Further, the cylindrical transparent container may include an inner transparent container which has a bottomed cylindrical shape and in which a culture medium is formed, and a cylindrical outer transparent container serving as a lid of the inner transparent container. In this case, the residue identifying section (for example, the MCU 30) may recognize a marker given on a peripheral edge portion of a bottom surface of the inner transparent container as the at least one characteristic portion of the two or more common characteristic portions.

In general, an inner diameter of the outer container needs to be larger than an outer diameter of the inner container to make it easy to cover the inner container with the outer container. That is, a clearance is required between the inner container and the outer container. However, when the clearance increases, a position of the outer container relative to the inner container is displaced between the time of capturing the reference image 103*b* and the time of capturing the test image 103*a*, and it is likely to be difficult to accurately position the Petri dish 15. Therefore, residues generally adheres to the inner container, but the outer container may rotate when the Petri dish 15 is taken in and out of an incubator. In this case, it is sometimes difficult to accurately reduce the residues with a marker provided on the outer container. The marker on the inner container does not change in position relative to the residues of the inner container. Thus, the marker on the inner container may contribute to accurately reducing the residues.

[Viewpoint C8]

The at least one characteristic portion of the two or more common characteristic portions may be a container accommodating the test individual, the residue adhering to the test individual, or a part of the test individual. That is, the residue identifying section (for example, the MCU 30) may recognize the container accommodating the test individual, the residue adhering to the test individual, or a part of the test individual as the at least one characteristic portion of the two or more common characteristic portions. As a result, it is possible to save time and effort for giving the marker to the container.

[Viewpoint C9]

As illustrated in FIG. 53, the display section (for example, the display device 37) may be configured to display the reference image 103*b* acquired from the test individual before culturing and a moving image of the test individual after culturing acquired by the imaging section in a superimposed manner. As a result, it may be easy for the user to manually align the Petri dish 15 at the time of capturing the image of the test image 103*a*. As a result, the accuracy of residue reduction may be improved.

[Viewpoint C10]

The imaging section (for example, the main camera 11) may acquire the test image 103*a* from the test individual after culturing after the user manually aligns the test individual after culturing. The counting section (for example, the MCU 20 or 30) may include a characteristic portion identifying section that identifies two or more common characteristic portions from the reference image 103*b* and the test image 103*a* acquired by the imaging section after the user manually aligns the test individual after culturing. The counting section (for example, the MCU 20 or 30) may be configured to align a position and a rotation angle of the reference image 103*b* and a position and a rotation angle of the test image 103*a* based on the two or more common characteristic portion, and count the number of colonies while excluding at least one residue included in the test image 103*a*. When the manual alignment and the alignment by image processing are utilized in this manner, the accuracy of residue reduction may be further improved.

[Viewpoint C11]

The stage 5 is an example of a stage on which the test individual is placed. The alignment member 7 is an example of an alignment member that is provided on the stage and assists manual alignment by the user with respect to the test individual placed on the stage. The alignment member may have a shape formed so as to come into contact with a container accommodating the test individual at at least two points to support the container. For example, a horizontal cross-sectional shape of a contact surface of the alignment member may be similar to a horizontal cross-sectional shape of a non-contact surface of the container. Alternatively, the alignment member may have a substantially inverted V-shape when viewed from above the stage so as to support the Petri dish having a circular horizontal cross-sectional shape with two contact points. Further, a well plate having a plurality of wells has a rectangular horizontal cross-sectional shape. Therefore, the alignment member may have an L-shaped horizontal cross-sectional shape such that the alignment member can support the well plate with at least two contact points. As a result, the accuracy of the manual alignment may be improved.

[Viewpoint C12]

The MCU 30 may function as a table management section (a creation section) that creates the count table 55 including a cell to which a count result of each of a plurality of the test individuals is input and stores the count table in the storage section. The display device 37 functions as the display section that displays the count table created by the table management section. The MCU 30 and the pointer 57 may function as a cell identifying section that identifies a target cell from among a plurality of the cells included in the count table 55 displayed on the display section. The MCU 30 may function as the registration section that registers the identification information (for example, a Petri dish number) of the test individual and the reference image 103*b* in association with each other in the target cell. When the target cell is identified, the counting section (for example, the MCU 30) may read the reference image 103*b* associated with the target cell from the storage section, count the number of colonies included in the test image while reducing the residue included in the reference image, and input or associate the counted number of colonies to or with the target cell. As a result, the user can read the reference image 103*b* corresponding to the test image 103*a* by identifying the target cell. The counting section (for example, the MCU 20 or 30) may be configured to input or associate the number of colonies to or with the target cell. As a result, the count result can be correctly input to the cell.

[Viewpoint C13]

The count table 55 may have the first cell 291 and the second cell 292 for each of the test individuals. In this case, the first cell 291 indicates whether or not the reference image 103*b* has been acquired. The second cell 292 is associated with the first cell and indicates the number of colonies. Here, the target cell is the second cell. In this manner, the cell associated with the reference image 103*b* may be further associated with the target cell to which the count result is input.

[Viewpoint C14]

When the first cell is clicked, the imaging section (for example, the main camera 11) may capture an image of the test individual before culturing to acquire the reference image 103*b*. Moreover, when the second cell is clicked, the imaging section (for example, the main camera 11) may capture an image of the test individual after culturing to acquire the test image 103*a*. In this manner, clicking a cell may be used as a trigger for capturing. Note that clicking a cell may include operating a capture button after the cell is clicked.

When the first cell is clicked, the imaging section (for example, the main camera 11) may capture an image of the test individual before culturing to acquire the reference image 103*b*. When the second cell is clicked, the imaging section (for example, the main camera 11) may capture an image of the test individual after culturing using the imaging condition associated with the first cell to acquire the test image 103*a*. In this manner, the imaging condition for the test image 103*a* may be associated with the first cell 291 via the second cell 292. As a result, the imaging condition of the reference image 103*b* and the imaging condition of the test image 103*a* coincide, and thus, the accuracy of residue reduction may be improved. Further, the user can save time and effort for individually setting the imaging condition of the reference image 103*b* and the imaging condition of the test image 103*a*.

[Viewpoint C15]

The counting section (for example, the MCU 20 or 30) may have a first mode in which the influence of the residue is mitigated and a second mode in which the influence of the residue is not mitigated. The display section (for example, the display device 37) may display an icon for selecting the first mode or the second mode. In this manner, on/off of residue reduction processing may be selected through the icon.

[Viewpoint C16]

As illustrated in FIG. 50, the MCU 30 and the UI 310 may function as a designation section that designates the reference image 103*b* from a plurality of candidate images stored in the storage section. As illustrated in FIG. 51, the MCU 30 may function as a display control section that reads at least one piece of information of a type of a culture medium, a dilution factor, a name of the test individual, and the identification information of the test individual associated with the reference image 103*b* designated by the designation section from the storage section and causes the display section to display the at least one piece of information.

[Viewpoint C17]

The identification information of the test individual may be identification information (for example, a Petri dish number) of a container accommodating the test individual. If information familiar to the user is used, the colony counting device 1 that is easy to use for the user may be realized.

[Viewpoint C18]

The counting section (for example, the MCU 20 or 30) may identify the position of the residue in the reference image 103*b*, obtain relative displacements between a position and a rotation angle of the test image 103*a* and a position and a rotation angle of the reference image 103*b* based on the two or more common characteristic portions, set a mask area in the test image based on the position of the residue and the relative displacements, and count the number of colonies from the test image 103*a* in which the mask area is set.

[Viewpoint C19]

The main camera 11 functions as the imaging section that captures an image of the test individual before culturing to acquire the reference image 103*b* for reducing an influence of a residue of the test individual, and captures an image of the test individual after culturing to acquire the test image 103*a* for counting colonies. The MCUs 20 and 30 may function as the counting section that counts the number of colonies in the reference image 103*b* and the number of colonies in the test image 103*a*, subtracts the number of colonies in the reference image 103*b* from the number of colonies in the test image 103*a*, and obtains the number of colonies in the test individual after culturing. Such an algorithm with a relatively small computational load may be adopted. Note that the MCU 30 may switch a plurality of algorithms according to a user instruction. As a result, the user can adopt an algorithm with a better count result.

[Viewpoint C20]

A control method of a colony counting device may include:

capturing an image of a test individual before culturing to acquire a reference image 103*b* for reducing an influence of residues of the test individual;

capturing an image of the test individual after culturing to acquire a test image 103*a* for counting colonies;

identifying two or more common characteristic portions from the reference image 103*b* and the test image 103*a*; and identifying the two or more common characteristic portions from the reference image 103*b* and the test image 103*a*, aligning a position and a rotation angle of the reference image 103*b* and a position and a rotation angle of the test image 103*a* based on the identified two or more common characteristic portions, and counting the number of colonies while excluding at least one residue of the residues and the colonies included in the test image 103*a* based on the test image 103*a* after the alignment and positions of the residues included in the reference image 103*b*.

Alternatively, a control method of a colony counting device may include: capturing an image of a test individual to acquire a reference image for reducing an influence of a residue of the test individual;

capturing an image of the test individual after culturing to acquire a test image for counting colonies;

identifying the residue included in the reference image;

identifying a position of the residue in the test image corresponding to the residue included in the reference image based on a displacement of each of two or more common characteristic portions between the reference image and the test image; and counting a number of colonies included in the test image while excluding the residue from a count as a colony based on the identified position of the residue.

[Viewpoint C21]

The application program 39 and the control program 27 are examples of a program executed by a computer that controls a colony counting device. The program may cause the computer (for example, the MCU 20 or 30) to execute:

capturing an image of test individual before culturing to acquire the reference image 103*b* for reducing an influence of residues of the test individual;

capturing an image of the test individual after culturing to acquire the test image 103*a* for counting colonies;

identifying two or more common characteristic portions from the reference image 103*b* and the test image 103*a;* aligning a position and a rotation angle of the reference image 103*b* and a position and a rotation angle of the test image 103*a* based on the two or more identified common characteristic portions; and counting the number of colonies while excluding at least one residue of the residues and the colonies included in the test image 103*a* based on the test image 103*a* after the alignment and positions of the residues included in the reference image 103*b*.

Alternatively, the program executed by the computer that controls the colony counting device may cause the computer to execute the control method in Viewpoint C20.

The invention is not limited to the above embodiment, and various modifications and changes can be made within a scope of a gist of the invention.

What is claimed is:

1. A colony counting device comprising:

an imaging section that captures a test individual and generates an image of the test individual;

an illumination section that illuminates the test individual;

a setting section that sets a test condition in at least one of the imaging section and the illumination section, the test condition including at least one of an imaging condition of the imaging section and an illumination condition of the illumination section;

a registration section that registers the image of the test individual in an initial state generated by the imaging section as a reference image;

a storage section that stores, in association with identification information of the test individual, (i) the reference image and (ii) the test condition applied to the at least one of the imaging section and the illumination section when the test individual in the initial state was captured when the reference image is registered by the registration section;

a receiving section that receives an input of the identification information of the test individual for reading the reference image registered by the registration section and for reading the test condition associated with the reference image, wherein the setting section is configured to read, from the storage section, the test condition associated with the identification information of the test individual received by the receiving section after culturing of the test individual, and set the read test condition in the at least one of the imaging section and the illumination section;

a residue identifying section that identifies a residue included in the reference image registered by the registration section and associated with the identification information of the test individual received by the receiving section, and identifies a position of the residue in a test image being captured by the imaging section according to the test condition set by the setting section, corresponding to the residue included in the reference image based on a displacement of each of two or more common characteristic portions between the reference image and the test image that is generated by the imaging section and is an image of the test individual after culturing; and a counting section that counts a number of colonies included in the test image while excluding image data at the identified position of the residue from a count as a colony based on the position of the residue identified by the residue identifying section.

2. The colony counting device according to claim 1, wherein the setting section is configured to set the illumination condition of the illumination section, the registration section is configured to cause the storage section to store the illumination condition set in the illumination section in association with identification information of the test individual when the test individual before culturing is captured, the setting section is configured to read, from the storage section, the illumination condition associated with the identification information of the test individual received again by the receiving section after culturing the test individual, and set the illumination condition of the illumination section, and the imaging section is configured to capture the test individual in a state in which the test individual after culturing is illuminated according to the illumination condition set by the setting section and acquire the test image for counting the colonies.

3. The colony counting device according to claim 1, wherein the residue identifying section recognizes a marker given on a peripheral edge portion of an upper surface or a lower surface of a cylindrical transparent container accommodating the test individual as at least one characteristic portion of the two or more common characteristic portions.

4. The colony counting device according to claim 3, wherein the residue identifying section recognizes the marker having a linear shape as the at least one characteristic portion.

5. The colony counting device according to claim 3, wherein the cylindrical transparent container includes an inner transparent container which has a bottomed cylindrical shape and in which a culture medium is formed, and a cylindrical outer transparent container serving as a lid of the inner transparent container, and the residue identifying section recognizes a marker given on a peripheral edge portion of a bottom surface of the inner transparent container as the at least one characteristic portion of the two or more common characteristic portions.

6. The colony counting device according to claim 1, wherein the residue identifying section recognizes a container accommodating the test individual, a residue adhering to the test individual, or a part of the test individual as at least one characteristic portion of the two or more common characteristic portions.

7. The colony counting device according to claim 1, further comprising a display section that displays the reference image acquired from the test individual before culturing and a moving image of the test individual after culturing acquired by the imaging section in a superimposed manner.

8. The colony counting device according to claim 7, further comprising:

a stage on which the test individual is placed; and an alignment member that is provided on the stage and assists manual alignment by a user with respect to the test individual placed on the stage, wherein the alignment member has a shape formed to come into contact with a container accommodating the test individual at at least two points to support the container.

9. The colony counting device according to claim 1, further comprising:

a table management section that creates a count table including a cell to which a count result of each of a plurality of the test individuals is input and stores the count table in a storage section;

a display section that displays the count table created by the table management section; and a cell identifying section that identifies a target cell from among a plurality of the cells included in the count table displayed on the display section, wherein the registration section that registers identification information of the test individual and the reference image in association with the target cell, and the counting section is configured to read the reference image associated with the target cell from the storage section when the target cell is identified, count the number of colonies included in the test image while reducing the residue included in the reference image, and input or associate the counted number of colonies to or with the target cell.

10. The colony counting device according to claim 9, wherein the count table includes a first cell and a second cell for each of the test individuals, the first cell indicates whether or not the reference image has been acquired, the second cell is associated with the first cell and indicates the number of colonies, and the target cell is the second cell.

11. The colony counting device according to claim 10, wherein the imaging section captures an image of the test individual before culturing to acquire the reference image when the first cell is clicked, and captures an image of the test individual after culturing using an imaging condition associated with the first cell to acquire the test image when the second cell is clicked.

12. The colony counting device according to claim 1, wherein the counting section has a first mode in which an influence of the residue is mitigated and a second mode in which the influence of the residue is not mitigated, the colony counting device further comprising a display section that displays an icon for selecting the first mode or the second mode.

13. The colony counting device according to claim 1, further comprising:

a designation section that designates the reference image from among a plurality of candidate images stored in the storage section; and a display control section that reads at least one piece of information of a type of a culture medium, a dilution factor, a name of the test individual, and the identification information of the test individual associated with the reference image designated by the designation section from the storage section, and causes a display section to display the at least one piece of information.

14. The colony counting device according to claim 13, wherein the identification information of the test individual is identification information of a container accommodating the test individual.

15. The colony counting device according to claim 1, wherein the residue identifying section identifies a position of the residue in the reference image, and obtains relative displacements between a position and a rotation angle of the test image and a position and a rotation angle of the reference image based on the two or more common characteristic portions, and the counting section is configured to set a mask area in the test image based on the position of the residue and the relative displacements, and count the number of colonies from the test image in which the mask area is set.

16. A colony counting device comprising:

an illumination section that illuminates a test individual;

an imaging section that captures an image of the test individual to acquire a reference image for reducing an influence of a residue of the test individual, and captures an image of the test individual after culturing by the imaging section according to a test condition set by a setting section, which is applied to at least one of the imaging section and the illumination section, to acquire a test image for counting colonies;

the setting section that sets the test condition in the at least one of the imaging section and the illumination section, the test condition including at least one of an imaging condition of the imaging section and an illumination condition of the illumination section;

a storage section that stores, in association with identification information of the test individual, (i) the reference image and (ii) the test condition applied to the at least one of the imaging section and the illumination section when the test individual was captured;

a receiving section that receives an input of the identification information of the test individual for reading the reference image and for reading the test condition associated with the reference image, wherein the setting section is configured to read, from the storage section, the test condition associated with the identification information of the test individual received by the receiving section after culturing of the test individual, and set the read test condition in the at least one of the imaging section and the illumination section; and a counting section that counts a number of colonies in the reference image and a number of colonies in the test image being captured according to the test condition associated with the reference image, and subtracts the number of colonies in the reference image from the number of colonies in the test image to obtain a number of colonies in the test individual after culturing.

17. A control method of a colony counting device, comprising:

capturing an image of a test individual to acquire a reference image for reducing an influence of a residue of the test individual;

storing, in association with identification information of the test individual, the reference image and a test condition applied to at least one of an imaging section and an illumination section when the test individual was captured, the test condition including at least one of an imaging condition of the imaging section and an illumination condition of the illumination section;

receiving the identification information of the test individual;

reading, based on the received identification information, the test condition associated with the reference image from a storage section and setting the read test condition in the at least one of the imaging section and the illumination section;

capturing an image of the test individual after culturing by the imaging section according to the set test condition to acquire a test image for counting colonies;

identifying the residue included in the reference image which is associated with the received identification information of the test individual;

identifying a position of the residue in the test image corresponding to the residue included in the reference image based on a displacement of each of two or more common characteristic portions between the reference image and the test image; and counting a number of colonies included in the test image while excluding the residue from a count as a colony based on the identified position of the residue.

* * * * *